US008787274B2

(12) United States Patent
Togashi et al.

(10) Patent No.: US 8,787,274 B2
(45) Date of Patent: Jul. 22, 2014

(54) COMMUNICATION SYSTEM

(75) Inventors: Tsuyoshi Togashi, Tokyo (JP); Tooru Nakamura, Tokyo (JP)

(73) Assignee: Renesas Electronics Corporation, Kanagawa (JP)

(*) Notice: Subject to any disclaimer, the term of this patent is extended or adjusted under 35 U.S.C. 154(b) by 667 days.

(21) Appl. No.: 13/077,354

(22) Filed: Mar. 31, 2011

(65) Prior Publication Data

US 2011/0243011 A1 Oct. 6, 2011

(30) Foreign Application Priority Data

Mar. 31, 2010 (JP) ................................. 2010-082889

(51) Int. Cl.
*H04W 72/12* (2009.01)

(52) U.S. Cl.
USPC .......................................... 370/329; 455/450

(58) Field of Classification Search
None
See application file for complete search history.

(56) References Cited

U.S. PATENT DOCUMENTS

| 5,995,515 | A  | * | 11/1999 | Suzuki .......................... 370/465 |
| 6,023,477 | A  | * | 2/2000 | Dent .............................. 370/509 |
| 6,223,038 | B1 | * | 4/2001 | Iseyama et al. ............. 455/435.3 |
| 7,009,941 | B1 |   | 3/2006 | Uchino |
| 7,647,060 | B2 | * | 1/2010 | Kawamura et al. ........... 455/502 |
| 8,144,670 | B2 | * | 3/2012 | Shin et al. ..................... 370/336 |
| 2005/0221827 | A1 | * | 10/2005 | Natsume ....................... 455/437 |
| 2008/0086744 | A1 | * | 4/2008 | Bae et al. ......................... 725/38 |
| 2011/0151840 | A1 | * | 6/2011 | Gong et al. ................. 455/414.1 |

FOREIGN PATENT DOCUMENTS

| JP | 2000-134235 |   | 5/2000 |
| JP | 2000-353143 |   | 12/2000 |
| JP | 2006-526371 | A | 11/2006 |
| JP | 2009-539301 | A | 11/2009 |
| JP | 2010-068200 | A | 3/2010 |

OTHER PUBLICATIONS

Japanese Office Action issued in Japanese Applicaiton No. 2010-082889 dated May 28, 2013 with English translation.
IEEE Std. 802.15.4-2003, IEEE Standard for Information Technology.

* cited by examiner

*Primary Examiner* — Hassan Kizou
*Assistant Examiner* — Roberta A Shand
(74) *Attorney, Agent, or Firm* — McDermott Will & Emery LLP

(57) ABSTRACT

A communication system which can automatically construct a network, as well as reducing power consumption of each node in the network is provided.

A child node calculates a timing of next receiving broadcast information based on timing information included in broadcast information. It then accepts input of broadcast information transmitted from a management node and transmits a registration request. It further accepts input of broadcast information transmitted from the management node and determines whether or not it is registered in the network based on slot assignment information included in the broadcast information. If the child node determines that it is registered in the network, it calculates a timing for receiving a reply request transmitted from the management node.

5 Claims, 29 Drawing Sheets

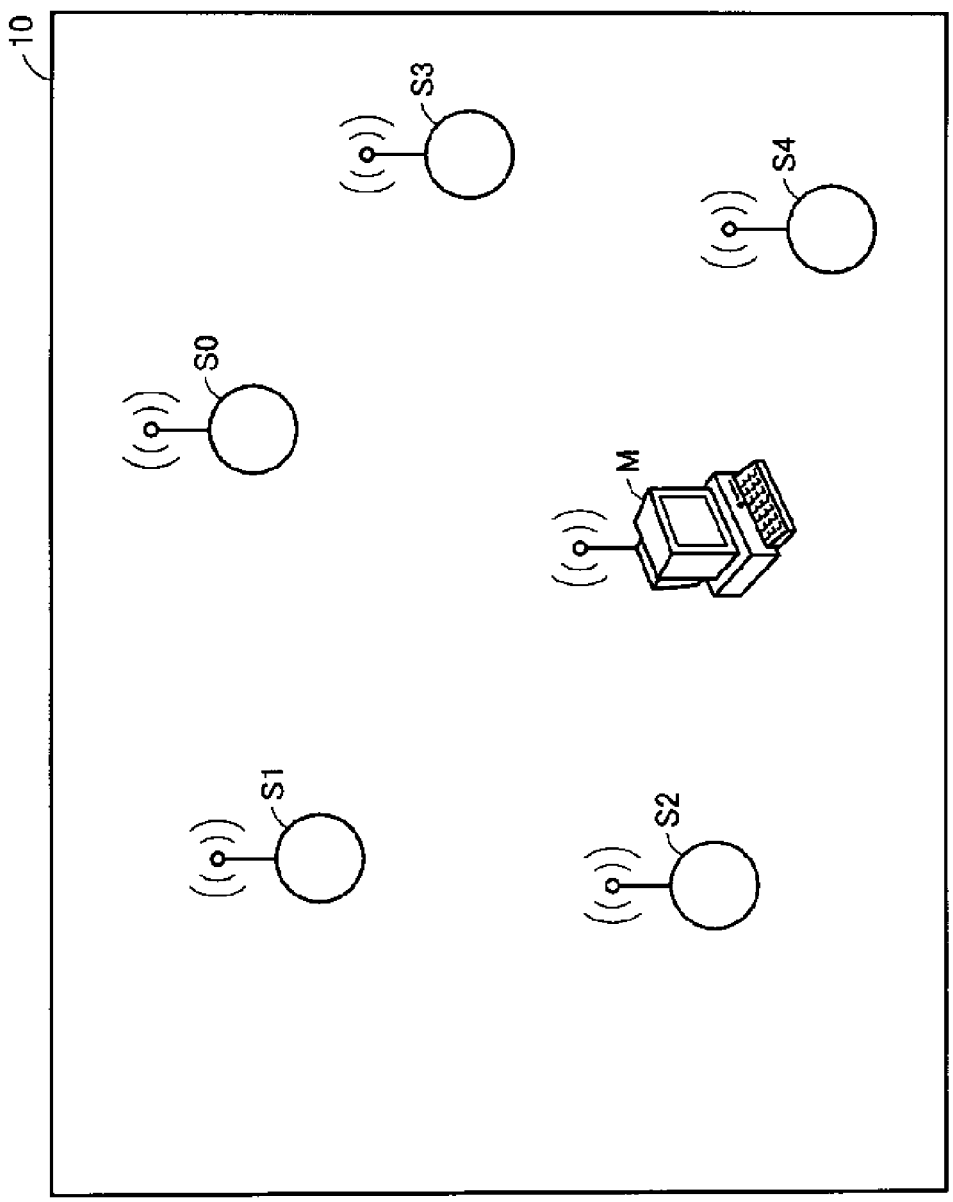
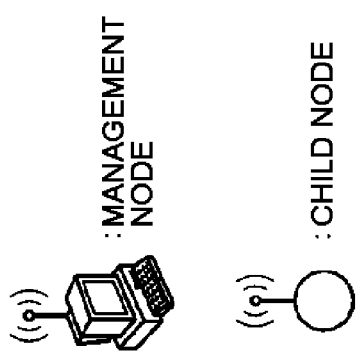
FIG. 1

*FIG. 30A*

| SLOT 1 OF MANAGEMENT NODE M | SLOT 2 OF MANAGEMENT NODE M | SLOT 3 OF MANAGEMENT NODE M | SLOT 4 OF MANAGEMENT NODE M |
|---|---|---|---|
| ID001(S) | ID002(R) | ID003(S) | ID004(S) |
|  | SLOT 1 OF RELAY NODE R ID005(S) |  |  |
|  | SLOT 2 OF RELAY NODE R ID006(S) |  |  |
|  | SLOT 3 OF RELAY NODE R ID007(S) |  |  |

*FIG. 30B*

| SLOT 1 OF RELAY NODE R | SLOT 2 OF RELAY NODE R | SLOT 3 OF RELAY NODE R |
|---|---|---|
| ID005(S) | ID006(S) | ID007(S) |

COMMUNICATION SYSTEM

CROSS-REFERENCE TO RELATED APPLICATION

The disclosure of Japanese Patent Application No. 2010-82889 filed on Mar. 31, 2010 including the specification, drawings and abstract is incorporated herein by reference in its entirety.

BACKGROUND OF THE INVENTION

The present invention relates to a communication system, and particularly to a communication system for establishing, maintaining, and managing a network.

Recently, there is an increasing demand for a short distance radio communication network. As an example of a low cost and low power consuming short distance wireless communication standard which realizes the short distance wireless communication network (also simply referred to as a network, hereinafter), ZigBee (registered trademark) has been devised (see Non-patent Document 1; IEEE Std. 802.15.4-2003, IEEE Standard for Information Technology).

Generally, in order to couple a plurality of nodes in a network when establishing a network, it is necessary to search for the nodes because it is required to constantly keep track of the location of all the nodes.

In order to search for the nodes, broadcast communication (multicast communication) is performed, for which various types of methods have been proposed (see Patent Document 1 (Japanese Patent Laid-Open No. 2000-134235) and Patent Document 2 (Japanese Patent Laid-Open No. 2000-353143)).

SUMMARY OF THE INVENTION

When establishing a conventional network, however, a communication unit of a management node at the receiving side must be in a state with electric power constantly supplied because each node in the network transmits a response frame asynchronously to the broadcast communication, and thus the communication unit cannot transition to a low power consumption state.

In addition, preliminarily setting the number of nodes in a network as a parameter is required and therefore it has been difficult to dynamically change the network.

The present invention has been made in view of the above circumstances and provides a communication system which can automatically establish a network as well as reducing power consumption of each node in the network.

A communication system according to an embodiment of the invention comprises a plurality of terminals, and a management node which manages states of the terminals. The management node includes a communication unit which performs data transmission and reception with the terminals according to a structure of one superframe defining one cycle of data communication, and a control unit which controls the entire management node. One superframe includes at least one broadcast period for broadcasting a broadcast information frame indicating a structure of one superframe. Each of the terminals outputs a response signal to the broadcast information frame according to the content of the broadcast information frame. Upon receiving a response signal to the broadcast information frame transmitted via the communication unit, the control unit adds, to the structure of one superframe, a data communication period assigned for transmitting and receiving data to and from the terminal which received the response signal to the broadcast information frame. According to the addition of the data communication period, the broadcast information frame indicating the structure of one superframe is updated. At least one of the terminals which received the updated broadcast information frame transmits and receives data to and from the management node in synchronization with the data communication period assigned for its own sake, according to the updated broadcast information frame.

According to an embodiment of the invention, a communication system adds a data communication period assigned for transmitting and receiving data to and from a terminal which received a response signal to a broadcast information frame, and updates the broadcast information frame. Because a terminal transmits and receives data to and from a management node in synchronization with a data communication period assigned for its own sake, according to the updated broadcast information frame, it is possible to reduce power consumption by turning data communication periods other than that assigned to itself into a sleep state, and automatically establish a network. In addition, it is also possible, for a management node, to reduce power consumption by turning it into a sleep state for periods other than the data communication period with any of the terminals.

BRIEF DESCRIPTION OF THE DRAWINGS

FIG. 1 is an explanatory diagram of an outline of nodes forming a network according to an embodiment 1 of the present invention;

FIGS. 30A and 30B are explanatory diagrams of ID information of a child node managed by the management node M and the relay node R.

DETAILED DESCRIPTION OF THE PREFERRED EMBODIMENTS

Embodiment 1

FIG. 1 is an explanatory diagram of an outline of nodes forming a network according to the embodiment 1 of the present invention.

Referring to FIG. 1, a case is shown in this example where a management node M and a plurality of child nodes S0 to S4 (collectively referred to as child node S, hereinafter) are provided in a certain region 10. For example, a certain indoor room is assumed to be the region 10. Specifically, it is assumed to be a region in which broadcast communication is possible.

The management node M according to the embodiment 1 of the present invention is assumed to establish a network and manage each child node S. Here, it is assumed that the management node M and each child node S have a unique ID (Identification) information which identifies each of them.

Figure 2:
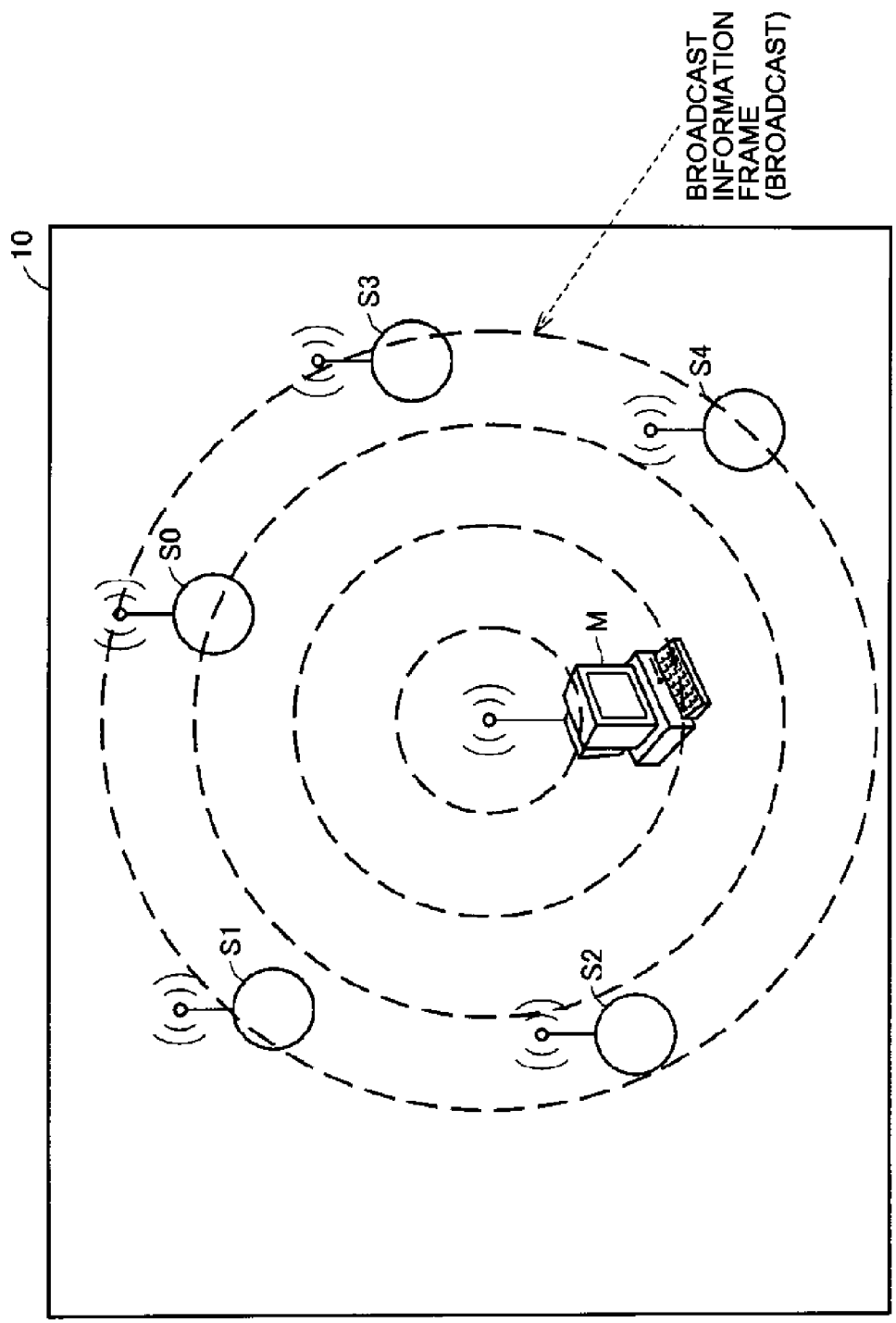
FIG. 2 is an explanatory diagram of a case where a broadcast information frame (also simply referred to as a broadcast information frame, hereinafter) is transmitted from a management node according to the embodiment 1 of the present invention.

FIG. 2 is an explanatory diagram which describes a case where a broadcast information frame from the management node according to the embodiment 1 of the present invention (also simply referred to as a broadcast information frame, hereinafter) is transmitted.

Referring to FIG. 2, a broadcast information frame is transmitted from the management node M to each child node S as the broadcast communication.

Each child node S receives the broadcast information frame transmitted from the management node M as broadcast communication and transmits, as a response frame, a registration request frame for participating in a network connection (simply referred to as a registration request frame, hereinafter).

Figure 3:
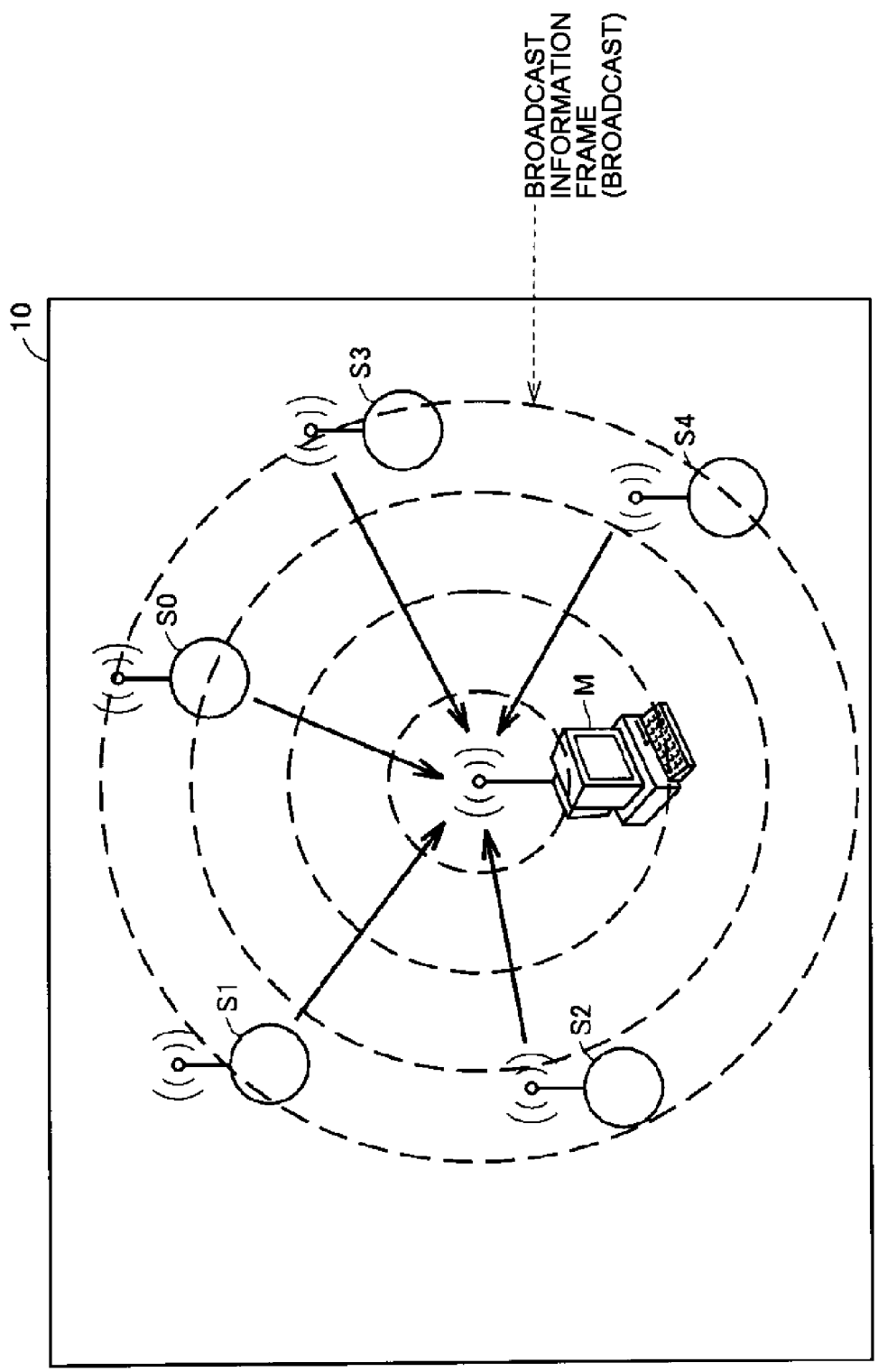
FIG. 3 is an explanatory diagram of a case of transmitting a response frame from each of child nodes S, respectively.

FIG. 3 is an explanatory diagram of a case of transmitting a response frame from each of the child nodes S, respectively. Upon receiving a broadcast information frame from the management node M, as shown in FIG. 3, each of the child nodes S0 to S4 transmits a registration request frame respectively.

Although, as will be described below, congestion may occur if registration request frames are transmitted from each of the child nodes S0 to S4 at once, it is assumed that in such an occasion the management node M receives only the registration request frame which is receivable and transmitted from one of the child nodes S and registers it in the network.

The management node M repeatedly transmits a broadcast information frame and registers each child node S in the network one by one according to the registration request frame in response to the broadcast information frame.

In addition, each child node S recognizes whether or not it is registered in the network based on the broadcast information frame transmitted from the management node M and does not transmit a registration request frame when determining that it is registered. Therefore, along with establishing the network, the number of child nodes S causing congestion gradually decreases and the problem of congestion will be dissolved.

FIGS. 4A and 4B illustrate a configuration of the management node M according to the embodiment 1 of the present invention. Referring to FIG. 4A, the management node M according to the embodiment 1 of the present invention includes a CPU 41, a RAM (Random Access Memory) 42, a ROM (Read Only Memory) 43, an HDD (Hard Disk Drive) 44, an internal bus 45 coupling respective parts, a keyboard 47, a display 48, a communication unit 49, a power supply management unit 46, an electric field intensity measurement unit 46#, and a timer 45#.

In FIG. 4A, which illustrates a configuration of a case using a PC as the management node M, it is also possible to provide a nonvolatile memory in place of the HDD 44 as an information storage medium, and substitute a display and a keyboard of a remotely coupled PC, for the display 48 and the keyboard 47 connected to the housing. It becomes easy for the management node M to transit into a sleep state by using a nonvolatile memory in place of the HDD 44, and a display and a keyboard remotely coupled as necessary.

As well as controlling the entire management node M, the CPU 41 of the management node M performs data communication with the child node S via the communication unit 49 by reading a software program stored in the ROM 43. Details of the data communication will be described below. In addition, it is assumed that unique ID information of the management node M is preliminarily stored in the ROM 43.

The RAM 42 is used as a work memory of the CPU 41. In addition, the HDD 44 is used as a memory area for accumulating data transmitted from the child node S.

In addition, it is assumed that the status of data communication with the child node S with which the network is established via the communication unit 49 can be displayed on the display 48.

In addition, the power supply management unit 46, which manages electric power supplied to each unit, enables the management node M to transition to a so-called sleep state, that is, a low power consumption state in which all the power supply is shut off except for the power supply required to return to the normal power state following the instruction from the CPU 41.

The electric field intensity measurement unit 46# measures the electric field intensity of the external environment upon data communication. The timer 45# counts up until a time set according to an instruction from the CPU 41 is reached. When the set time is reached, it notifies the power supply management unit 46. When the low power consumption state has been entered, the power supply management unit 46 returns to the normal power state from the low power consumption state, according to the notification from the timer 45#.

Referring to FIG. 4B, a functional block diagram in software of the management node M is illustrated.

Specifically, a functional block realized by software includes a channel setting unit 144, a superframe setting unit 146, and a data transmission/reception control unit 148.

The channel setting unit 144 sets a channel (frequency band) which is most suitable for data communication assumed to have the least interference, according to the electric field intensity measured in the electric field intensity measurement unit 46#.

The superframe setting unit 146 defines the content of each process in one cycle of data communication with the child node S via the communication unit 49. In this example, data communication period of each processing is also referred to as a slot.

The data transmission/reception control unit 148 performs data communication with the child node S via the communication unit 49 according to the superframe set by the superframe setting unit 146.

Figure 5:
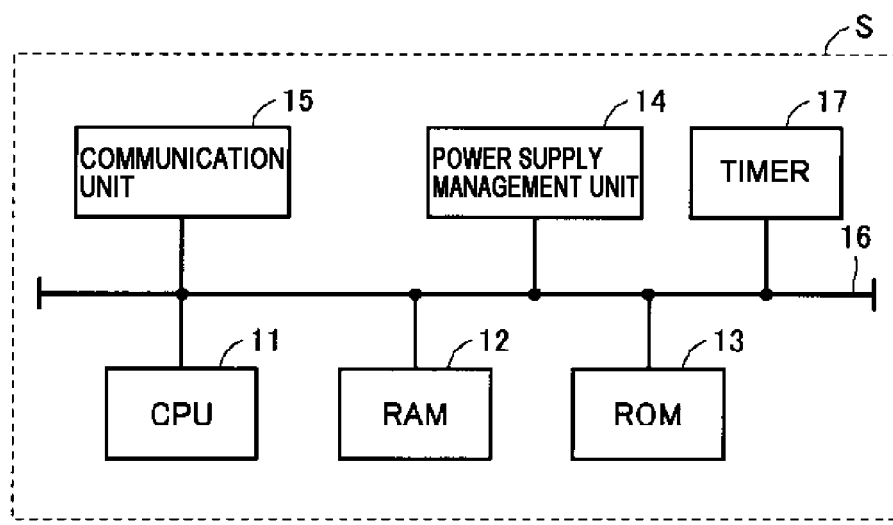
FIG. 5 is an explanatory diagram of a hardware configuration of a child node S according to the embodiment 1 of the present invention.

FIG. 5 is an explanatory diagram of a hardware configuration of the child node S according to the embodiment 1 of the present invention.

Referring to FIG. 5, the child node S includes a CPU 11, a RAM (Random Access Memory) 12, a ROM (Read Only Memory) 13, an internal bus 16 coupling each part, a communication unit 15, a power supply management unit 14, and a timer 17.

As well as controlling the entire child node S, the CPU 11 of the child node S performs data communication with the management node M via the communication unit 15 by reading a software program stored in the ROM 13. It is assumed that unique ID (Identification) information is preliminarily stored in the ROM 13. Details of the data communication will be described below.

The power supply management unit 14, which manages electric power supplied to each unit, shuts off power supply to the communication unit 15 in order to reduce power consumption or, on the contrary, supplies power to the communication unit 15 when performing data communication, according to an instruction from the CPU 11, for example. Although not shown, it is assumed that the child node S is battery-driven for example, and the power supply management unit 14 supplies electric power to each unit using the battery.

Figure 6:
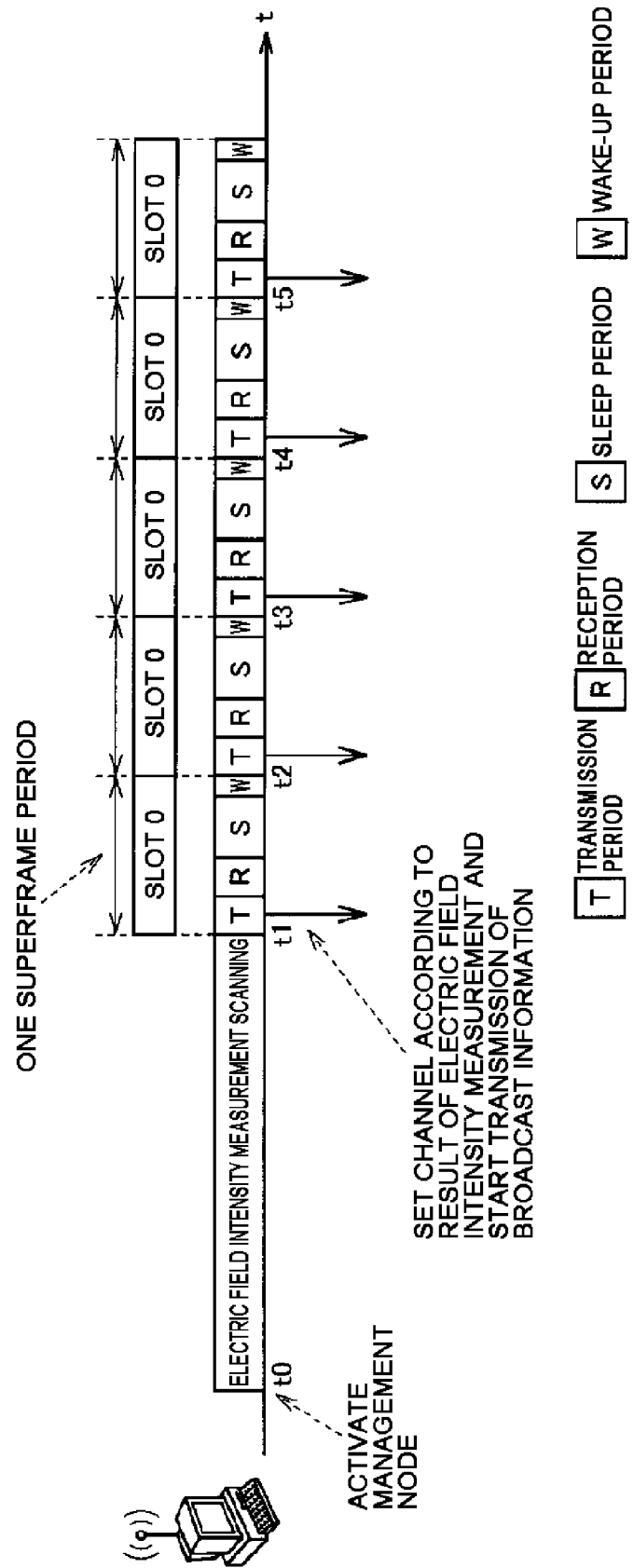
FIG. 6 is an explanatory diagram of a transmission of a broadcast information frame when the management node M is activated.

The timer 17 outputs timing information to the CPU 11 as necessary. FIG. 6 is an explanatory diagram of transmission of broadcast information frame when the management node M is activated.

Referring to FIG. 6, when the communication unit 49 of the management node M is activated at time t0, electric field intensity measurement scanning is first performed. Electric field intensity measurement scanning measures the electric field intensity in each of a plurality of frequency bands (channels) when performing data communication.

Specifically, the electric field intensity measurement unit 46# in the communication unit 49 measures electric field intensity in each of the channels. The channel setting unit 144 then sets the channel having the lowest electric field intensity (the channel with the least interference) as the channel of data communication, according to the measured electric field intensity.

The channel setting unit 144 then starts transmitting a broadcast information frame via the channel set at time t1. The communication unit 49 performs data communication according to a slot 0 set as one superframe period in the initial state.

The slot 0 in this example includes a transmission period (T) for transmitting a broadcast information frame, a reception period (R) for accepting reception of a connection request in response to the broadcast information frame, a sleep period (S) in which processing in the communication unit 49 is not performed, and a wakeup period (W) for returning from a sleep state (low power consumption state) to a state capable of data transmission and reception (normal power state).

Although described below, the one superframe period will be dynamically changed by registering the child node S in the network.

In this example, a case is described where the communication unit 49 repeatedly performs the process of transmitting a broadcast information frame according to the slot 0 set as one superframe period, which is one cycle of data communication as the initial state (time t1, t2, t3, t4 and t5).

Figure 7:
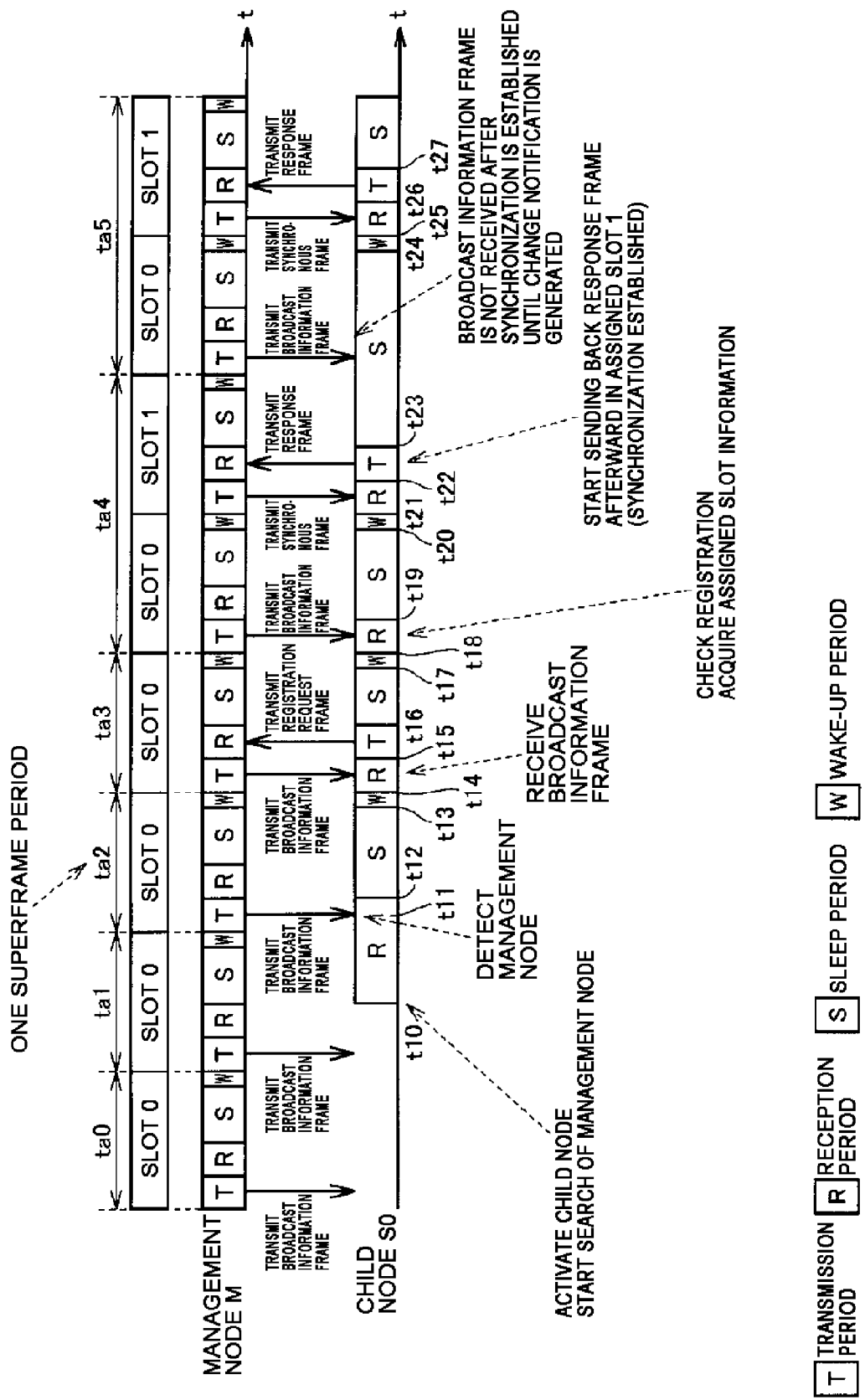
FIG. 7 is an explanatory diagram of a process flow of registering a child node S0 in a network (also referred to as a registering to the management node M) in a state where a child node S is unregistered in the management node M according to the embodiment 1 of the present invention.

FIG. 7 is an explanatory diagram of a process flow of the case when registering the child node S0 in the network in a state where the child node S is unregistered in the management node M (also referred to as registering to the management node M), according to the embodiment 1 of the present invention.

Referring to FIG. 7, a broadcast information frame is first transmitted from the management node M using the slot 0 in one superframe period. In this case, because the child node S is unregistered in the management node M, the number of slots in one superframe period of superframe structure information is one, with no ID of the child node S stored in the slot assignment information.

In this example, a case is described where a broadcast information frame is transmitted from the management node M in the slot 0 of superframe periods ta0 to ta5. Subsequently, at time t10, the communication unit 15 of the child node S0 which is unregistered in the management node M is activated, and a reception period for searching the management node M is started.

After starting the reception period (R) at time t10, the child node S0 continues the reception period (R) until the broadcast information frame is received from the management node M.

If broadcast information frames cannot be received even after a predetermined period has elapsed, a channel change process is performed, as will be described below.

At time t11, the child node S0 receives a broadcast information frame from the management node M transmitted in the slot 0 of a superframe period ta2. In other words, the child node S0 determines that the management node M is detected at time t11.

The child node S0 calculates, based on the superframe structure information and timing information included in the broadcast information frame received from the management node M, a wakeup period start time t13 for receiving a broadcast information frame in the next superframe period ta3.

As an example, specifically, the child node S0 calculates a wakeup period start time t13 as "number of slots (number of slots in one superframe period)*length of the period of one slot−wakeup time−length of the reception period" with time t12 as the reference point, based on the number of slots in one superframe period, and the length of a period of one slot, the length of the reception period, and the wakeup time in the timing information, which are the superframe structure information. The child node S0 then counts up until time t13 calculated using the timer 17 is reached. In addition, the child node S0 starts the sleep period (S) from time t12 and transitions to the low power consumption state. Although in the above description a case will be described where the wakeup period start time with time t12 as the reference point is calculated, this is merely an example and it may be calculated with time t11 as the reference point, or may be calculated in any manner provided that the next broadcast information frame can be received.

After the sleep period (S) started from time t12 using timer 17 expires, the child node S0 returns to the normal power state (a state in which data transmission and reception of a frame is possible) from the low power consumption state at time t13 and starts, from time t14, the reception period (R) for starting reception of broadcast information frames transmitted from the management node M.

The child node S0 receives the broadcast information frame transmitted from the management node M in the reception period (R) started from time t14 and determines whether or not it is registered in the management node M according to whether or not its own ID is stored in the slot assignment information included in the received broadcast information frame.

The child node S0, when determining that it is unregistered in the management node M, calculates a wakeup period start time t17 for receiving a broadcast information frame in the next superframe period ta4, based on the superframe structure information and the timing information included in the broadcast information frame received from the management node M. Calculation of the wakeup period start time t17 is similar to that of time t13.

The child node S0 then counts up until time t17 calculated using the timer 17 is reached. In addition, the child node S0 starts transmitting a registration request frame storing its own ID to the management node M at time t15. Subsequently, after completing transmission of the registration request frame, the child node S0 starts the sleep period (S) from time t16 and transitions to the low power consumption state.

The management node M adds the number of slots in the superframe structure information of the broadcast information frame if its own ID stored in the registration request frame received from the child node S0 has not been stored in the slot assignment information. Specifically, a process of adding a slot for use in data communication with the child node S0 to one superframe period is performed. In addition, a process of storing, in the slot assignment information, the ID of the child node S0 which has been stored in the registration request frame is performed.

When the time counted using the timer 17 reaches t17, the child node S0 terminates the sleep period (S) started from time t16. In other words, the child node S0 starts the wakeup period (W) for returning to the normal power state from the low power consumption state. The child node S0 then starts, at time t18 which is a period of the slot 0 of a superframe of the superframe period ta4, the reception period (R) for starting reception of a broadcast information frame transmitted from the management node M.

The child node S0 determines, in the reception period (R) started from time t18, whether or not it is registered in the network according to whether or not its own ID is stored in the slot assignment information included in the received broadcast information frame.

The child node S0, when determining that it is registered in the network, does not transmit a registration request frame.

The child node S0, when determining that it is registered in the network, in order to perform data communication using a slot assigned to itself from the management node M, calculates a wakeup period start time t20 as a timing for receiving a synchronous frame corresponding to the slot assigned to itself in the same superframe period (slot 1 in this case), based on the timing information and the slot assignment information included in the broadcast information frame received from the management node M.

Specifically, the child node S0 calculates the wakeup period start time t20 as "number of slots (assigned slot number)*length of the period of one slot−wakeup time−length of the reception period" with time t19 as the reference point, based on the slot number assigned to itself (slot 1 in this example) included in the slot assignment information, the length of a period of one slot, the length of reception period, and the wakeup time included in the timing information.

It is assumed in the following that each time the child node S receives a broadcast information frame, it similarly calculates a timing of performing data communication using a slot assigned to itself from the management node M.

The child node S0 then counts up until time t20 calculated using the timer 17 is reached. In addition, the child node S0 starts the sleep period (S) and transitions to the low power consumption state at time t19.

When the time counted using the timer 17 reaches t20, the child node S0 terminates the sleep period (S) started from time t19. In other words, the child node S0 starts the wakeup period (W) for returning to the normal power state from the low power consumption state. The child node S0 then starts, at time t21, which is a period of the slot 1 of a superframe of the superframe period ta4, the reception period (R) for starting reception of a synchronous frame transmitted from the management node M using a slot assigned to itself (slot 1 in this example).

The child node S0 receives the synchronous frame transmitted from the management node M in the reception period (R) started from time t21 and determines whether or not the slot is assigned to itself, according to whether or not its own ID is stored in the received synchronous frame. It is assumed in this example that its own ID is stored.

The child node S0, when determining that its own ID is stored in the received synchronous frame, calculates a wakeup period start time t24 as a timing for receiving a synchronous frame transmitted from the management node M using a slot assigned to itself in the next superframe period, based on the superframe structure information and the timing information included in the broadcast information frame already received from the management node M. Specifically, the wakeup period start time t24 is calculated as "number of slots (number of slots in one superframe period)*length of the period of one slot−wakeup time−length of the reception period" with time t22 as the reference point, based on the number of slots in one superframe period included in the superframe structure information, and the length of a period of one slot, the length of the reception period, and the wakeup time included in the timing information. The above calculation results in the same value hereinafter unless the superframe structure is changed.

It is assumed in the following that each time the child node S receives a synchronous frame in the slot assigned to itself, it similarly calculates a timing of performing data communication using a slot assigned to itself from the management node M.

The child node S0 then counts up until time t24 calculated using the timer 17 is reached.

In addition, the child node S0 starts transmitting a response frame storing its own ID to the management node M at time t22. Subsequently, after completing transmission of the response frame, the child node S0 starts the sleep period (S) from time t23 and transitions to the low power consumption state. In other words, data communication with the management node M is performed using only a slot assigned to itself (slot 1 in this example) from that time point, without having to receive a broadcast information frame until a change of the superframe structure is notified.

If the ID of the child node S0 stored in the response frame received from the child node S0 matches the assigned ID of the child node S0 stored in the synchronous frame which has been already transmitted in the same slot, the management node M determines that the child node S0 is normally operating in the network.

The management node M makes a similar determination each time it receives a response frame in the following.

When the time counted using the timer 17 reaches t24, the child node S0 terminates the sleep period (S) started from time t23. In other words, the child node S0 starts the wakeup period (W) for returning to the normal power state from the low power consumption state. The child node S0 then starts, at time t25, which is a period of the slot 1 of a superframe of the superframe period ta5, the reception period (R) for starting reception of a synchronous frame transmitted from the management node M using a slot assigned to itself (slot 1 in this example).

The child node S0 receives the synchronous frame transmitted from the management node M in the reception period (R) started from time t25 and determines whether or not the slot is assigned to itself, according to whether or not its own ID is stored in the received synchronous frame. It is assumed in this example that its own ID is stored.

The child node S0, when determining that its own ID is stored in the received synchronous frame, calculates a wakeup period start time as a timing for receiving a synchronous frame transmitted from the management node M using a slot assigned to itself in the next superframe period, based on the superframe structure information and the timing information included in the broadcast information frame already received from the management node M. The child node S0 then counts up until the time calculated using the timer 17 is reached.

The child node S0, when determining that its own ID is stored in the received synchronous frame, starts transmitting a response frame storing its own ID to the management node M at time t26. Subsequently, after completing transmission of the response frame, the child node S0 starts the sleep period (S) from time t27 and transitions to the low power consumption state. From that time point, a similar operation is repeatedly performed unless the superframe structure is changed.

In the method according to the embodiment 1 of the present invention, the child node S0 can search the management node M (node to be connected) by only receiving frames transmitted from the management node M, the child nodes S do not need to transmit asynchronously frames for searching a node to be connected, and it is possible to search for the node to be connected by receiving frames transmitted from the management node M at a constant interval, thereby reducing traffic of the entire network.

In addition, the child node S can perform data communication occupying a time zone assigned to itself by receiving the superframe structure information transmitted from the management node M.

After synchronization has been established between the child node S0 and the management node M, data communication with the management node M is performed using the period of the slot assigned to the child node S0. Therefore, it becomes possible to reduce power consumption in the child node S0 because periods other than the assigned slot and periods other than the frame transmission and reception period within the period of a slot being used enter the sleep period, and retransmission of frames due to interference caused by frame transmission by a plurality of nodes is not necessary because other child nodes S do not perform data communication in the assigned slot.

Figure 8:
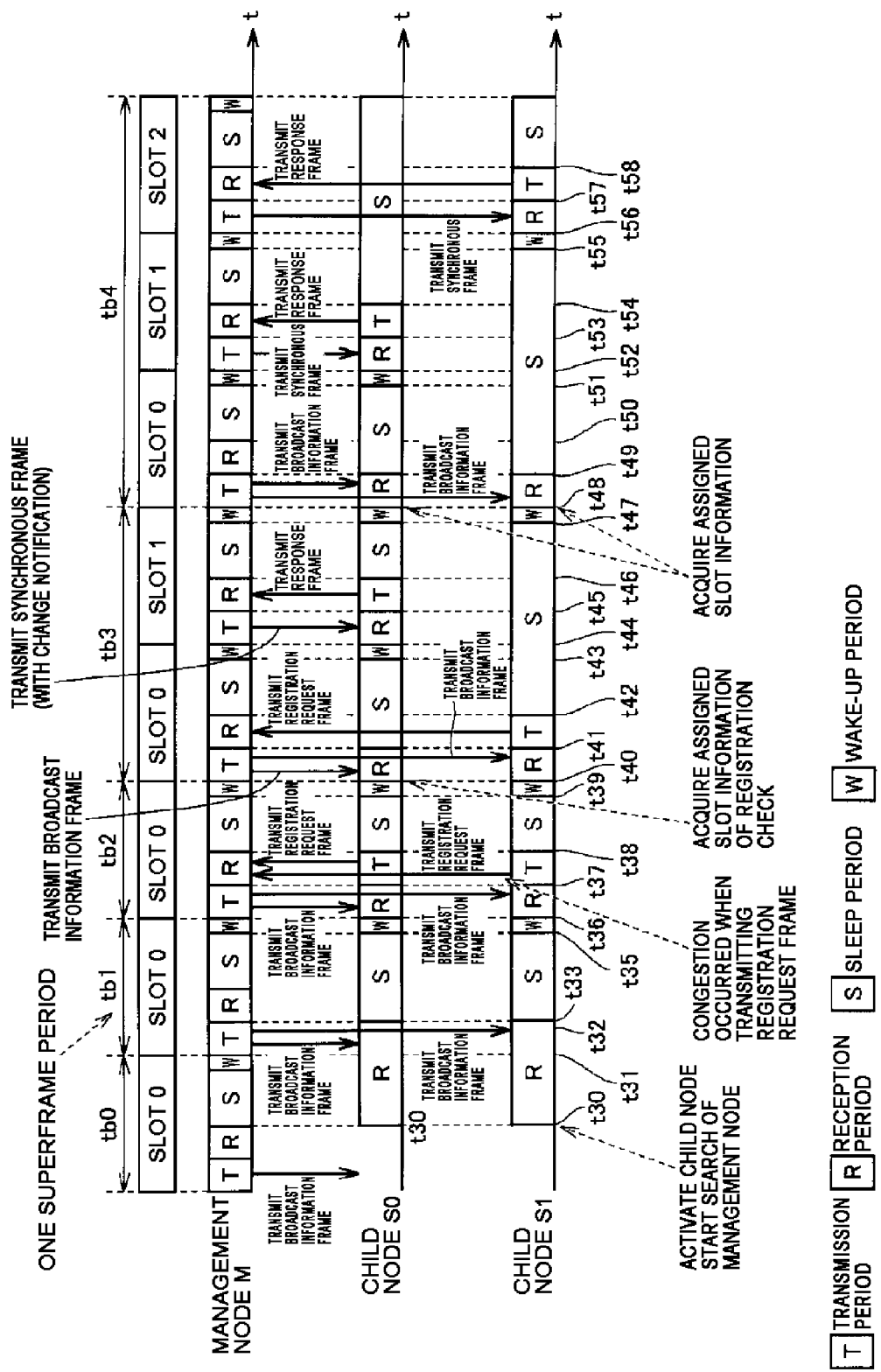
FIG. 8 is an explanatory diagram of a process flow of registering child nodes S0 and S1 to the management node M in a state where the child node S is unregistered in the management node M according to the embodiment 1 of the present invention.

FIG. 8 is an explanatory diagram of a process flow when registering the child nodes S0 and S1 to the management node M in a state where the child node S is unregistered in the management node M, according to the embodiment 1 of the present invention.

Referring to FIG. 8, a superframe period tb0 will be described. The management node M transmits a broadcast information frame using the slot 0 in the superframe period tb0. In this case, because the child node S is unregistered in the management node M, there is one slot in one superframe period of the superframe structure information, and the ID of the child node S is not stored in the slot assignment information.

On the other hand, at time t30, the communication unit 15 of the child nodes S0 and S1 which are unregistered in the management node M is activated and the reception period (R) for searching the management node M is started.

After staring the reception period (R) at time t30, the child nodes S0 and S1 continue the reception period (R) until a broadcast information frame using the slot 0 of a superframe period tb1 is received from the management node M. The child nodes S0 and S1 perform the channel change process if broadcast information frames cannot be received even after a predetermined period of time has elapsed, as will be described below.

The superframe period tb1 will be described. The management node M starts transmitting a broadcast information frame using the slot 0 in the superframe period tb1 at time t31.

The child nodes S0 and S1 receive the broadcast information frame from the management node M at time t32 after the reception period (R) is started from time t30. In other words, it is determined that the management node M is detected at time t32.

The child nodes S0 and S1 calculate a wakeup period start time t35 for receiving a broadcast information frame in the next superframe period, based on the superframe structure information and the timing information included in the broadcast information frame received from the management node M.

Specifically, the wakeup period start time t35 is calculated as "number of slots (number of slots in one superframe period)*length of the period of one slot−wakeup time−length of the reception period" with time t33 as the reference point, based on length of a period of one slot in the superframe structure information, the number of slots in one superframe period, the wakeup time and the length of the reception period in the timing information.

The child nodes S0 and S1 then count until time t35 calculated using the timer 17 is reached.

In addition, the child nodes S0 and S1 start the sleep period (S) from time t33 and transition to the low power consumption state.

When the time counted using the timer 17 reaches t35, the child nodes S0 and S1 terminate the sleep period (S) started from time t33. In other words, the child nodes S0 and S1 start the wakeup period (W) for returning to the normal power state from the low power consumption state. The child nodes S0 and S1 then start, from time t36 which is a period of the slot 0 of a superframe of the superframe period tb2, the reception period (R) for starting reception of a broadcast information frame transmitted from the management node M.

Next, the superframe period tb2 will be described. The management node M starts transmitting the broadcast information frame using the slot 0 in the superframe period at time t36.

The child nodes S0 and S1 receive a broadcast information frame transmitted from the management node M in the reception period (R) started from time t36, and determine whether or not they are registered in the management node M according to whether or not their own IDs are stored in the slot assignment information included in the received broadcast information frame.

The child nodes S0 and S1, when determining that they are unregistered in the management node M, calculate a wakeup period start time t39 for receiving a broadcast information frame in the next superframe period tb3, based on the superframe structure information and the timing information included in the broadcast information frame received from the management node M.

The child nodes S0 and S1 then count until time t39 calculated using the timer 17 is reached. In addition, the child nodes S0 and S1 start transmitting a registration request frame storing their own IDs to the management node M at time t37. Subsequently, after completing transmission of the registration request frame, the child nodes S0 and S1 start the sleep period (S) from time t38 and transition to the low power consumption state.

If the ID stored in the registration request frame received from the child node S0 or S1 has not been stored in the slot assignment information, the management node M adds the number of slots in the superframe structure information of the broadcast information frame. Specifically, a process of adding a slot for use in data communication with the child node S0 or S1 to one superframe period is performed. In addition, a process of storing, in the slot assignment information, the ID of the child node S0 or S1 which has been stored in the registration request frame is performed.

Here, congestion has occurred in the registration request frame from the child nodes S0 and S1, and it is assumed that the management node M received the registration request frame from the child node S0 to a degree that it can be identified as a registration request frame from the child node S0 whereas it has not received the registration request frame from the child node S1 to a degree that it can be identified as a registration request frame from the child node S1.

Accordingly, the management node M adds the number of slots in the superframe structure information of the broadcast information frame according to the registration request frame received from the child node S0. Specifically, a process of adding a slot for use in data communication with the child node S0 to one superframe period is performed. In addition, a process of storing, in the slot assignment information, the ID of the child node S0 which has been stored in the registration request frame is performed (it is assumed that the ID of the child node S0 is stored in this example).

The superframe period tb3 will be described. When the time calculated using the timer 17 reaches time t39, the child nodes S0 and S1 respectively terminate the sleep period (S) started from time t38. In other words, the child nodes S0 and S1 start the wakeup period (W) for returning to the normal power state from the low power consumption state. The child nodes S0 and S1 then start, at time t40 which is a period of the slot 0 of a superframe of the superframe period tb3, the reception period (R) for starting reception of a broadcast information frame transmitted from the management node M.

The child nodes S0 and S1 determine whether or not they are registered in the network based on whether or not their own IDs are stored in the slot assignment information included in the broadcast information frame received in the reception period (R) started from time t40.

The child node S0, when determining that it is registered in the network, does not transmit a registration request frame. Here, it is assumed that the child node S0 has been registered. On the other hand, it is assumed that the child node S1 is unregistered.

The child node S0, when determining that it is registered in the network, calculates a wakeup period start time t43 as a timing for receiving a synchronous frame corresponding to the slot assigned to itself in the same superframe period (slot 1 in this case), based on the timing information and the slot assignment information included in the broadcast information frame received from the management node M, in order to perform data communication using a slot assigned to itself from the management node M.

Specifically, the wakeup period start time t43 is calculated as "number of slots (assigned slot number)*length of the period of one slot−wakeup time−length of the reception period" with time t41 as the reference point, based on the slot number assigned to itself (slot 1 in this example) included in the slot assignment information, the length of a period of one slot, the length of reception period, and the wakeup time included in the timing information.

It is assumed in the following that each time the child node S receives a broadcast information frame, it similarly calculates a timing of performing data communication using a slot assigned to itself from the management node M.

The child node S0 then counts up until time t43 calculated using the timer 17 is reached. In addition, the child node S0 starts the sleep period (S) from time t41 and transitions to the low power consumption state.

Additionally, the child node S0, when determining that it is registered in the network, does not transmit a registration request frame after the superframe period tb3.

If, on the other hand, the child node S1 determines that it is unregistered in the network, it calculates a wakeup period start time t47 for receiving a broadcast information frame in the next superframe period tb4, based on the superframe structure information and the timing information included in the broadcast information frame received from the management node M. Calculation of the wakeup period start time t47 is similar to that of time t43.

The child node S1 then counts up until time t47 calculated using the timer 17 is reached. In addition, the child node S1 starts transmitting a registration request frame storing its own ID to the management node M at time t41. Subsequently, after completing transmission of the registration request frame, the child node S1 starts the sleep period (S) from time t42 and transitions to the low power consumption state.

If the ID stored in the registration request frame received from the child node S1 has not been stored in the slot assignment information, the management node M adds the number of slots in the superframe structure information of the broadcast information frame. Specifically, a process of adding a slot for use in data communication with the child node S1 to one superframe period is performed. In addition, a process of storing, in the slot assignment information, the ID of the child node S1 which has been stored in the registration request frame is performed.

At this time point, the child node S1 is newly registered in the network and the configuration of the network is changed.

Therefore, a timing of data communication of the child node S which had been registered in the network until then is changed by the number of slots due to occurrence of a change of one superframe period.

Consequently, the management node M notifies the child node S0 registered in the network that the configuration of the network has been changed.

It is assumed that the child node S0 which received the change notification in turn receives a broadcast information frame transmitted in a period of the slot 0 of the next superframe period.

When the time counted using the timer 17 reaches t43, the child node S0 terminates the sleep period (S) started from time t41. In other words, the child node S0 starts the wakeup period (W) for returning to the normal power state from the low power consumption state. The child node S0 then starts, at time t44 which is a period of the slot 1 of a superframe of the superframe period tb3, the reception period (R) for starting reception of a synchronous frame transmitted from the management node M using a slot assigned to itself (slot 1 in this example).

The child node S0 receives the synchronous frame transmitted from the management node M in the reception period (R) started from time t44 and determines whether or not the slot is assigned to itself, according to whether or not its own ID is stored in the received synchronous frame. It is assumed in this example that its own ID is stored.

The child node S0, when determining that its own ID is stored in the received synchronous frame, calculates a timing for receiving a frame transmitted from the management node M, as described above. In this case, a change notification notifying that the configuration of the network has been changed is issued as described above.

The child node S0, when determining that a change notification is included in the synchronous frame transmitted from the management node M, calculates a wakeup period start time t47 for receiving a broadcast information frame in the next superframe period tb4, based on the superframe structure information, the timing information, and the slot assignment information included in the broadcast information frame already received from the management node M.

Specifically, for example, the child node S0 calculates a wakeup period start time t47 as "number of slots (number of slots including itself remaining in one superframe period) *length of the period of one slot−wakeup time−length of the reception period" with time t45 as the reference point, based on the number of slots remaining in one superframe period which is the superframe structure information, the length of a period of one slot, the length of the reception period, and the wakeup time in the timing information. The child node S0 then counts up until time t47 calculated using the timer 17 is reached.

In addition, the child node S0 starts transmitting a response frame storing its own ID to the management node M at time t25. Subsequently, after completing transmission of the response frame, the child node S0 starts the sleep period (S) from time t46 and transitions to the low power consumption state.

If the ID of the child node S0 stored in the response frame received from the child node S0 matches the assigned ID of the child node S0 stored in the synchronous frame which has been already transmitted in the same slot, the management node M determines that the child node S0 is normally operating in the network.

The superframe period tb4 will be described. When the time calculated using the timer 17 reaches time t47, the child nodes S0 and S1 respectively terminate the sleep period (S). In other words, the child nodes S0 and S1 start the wakeup period (W) for returning to the normal power state from the low power consumption state. The child nodes S0 and S1 then start, at time t48 which is a period of the slot 0 of a superframe of the superframe period tb4, the reception period (R) for starting reception of a broadcast information frame transmitted from the management node M.

The child nodes S0 and S1 determine whether or not they are registered in the network based on whether or not their own IDs are stored in the slot assignment information included in the broadcast information frame received in the reception period (R) started from time t48.

The child nodes S0 and S1, when determining that they are registered in the network, do not transmit a registration request frame. It is assumed here that the child nodes S0 and S1 are both registered.

The child node S0, when determining that it is registered in the network, calculates a wakeup period start time t51 as a timing for receiving a synchronous frame corresponding to the slot assigned to itself in the same superframe period (slot 1 in this case), based on the timing information and the slot assignment information included in the broadcast information frame received from the management node M, in order to perform data communication using a slot assigned to itself from the management node M.

Calculation of the wakeup period start time t51 is similar to that of time t43.

The child node S0 then counts up until time t51 calculated using the timer 17 is reached. In addition, the child node S0 starts the sleep period (S) from time t49 and transitions to the low power consumption state.

If, on the other hand, the child node S1, when determining that it is registered in the network, calculates a wakeup period start time t55 as a timing for receiving asynchronous frame corresponding to the slot assigned to itself in the same superframe period (slot 2 in this case), based on the timing information and the slot assignment information included in the broadcast information frame received from the management node M, in order to perform data communication using a slot assigned to itself from the management node M.

Calculation of the wakeup period start time t55 is similar to that of time t43.

The child node S1 then counts up until time t55 calculated using the timer 17 is reached. In addition, the child node S1 starts the sleep period (S) from time t49 and transitions to the low power consumption state.

When the time counted using the timer 17 reaches t51, the child node S0 terminates the sleep period (S) started from time t49. In other words, the child node S0 starts the wakeup period (W) for returning to the normal power state from the low power consumption state. The child node S0 then starts, at time t52 which is a period of the slot 1 of a superframe of the superframe period tb4, the reception period (R) for starting reception of a synchronous frame transmitted from the management node M using a slot assigned to itself (slot 1 in this example).

The child node S0 receives the synchronous frame transmitted from the management node M in the reception period (R) started from time t52 and determines whether or not the slot is assigned to itself, according to whether or not its own ID is stored in the received synchronous frame. It is assumed in this example that its own ID is stored.

The child node S0, when determining that its own ID is stored in the received synchronous frame, calculates a wakeup period start time which is the timing for receiving a synchronous frame transmitted from the management node M using a slot assigned to itself in the next superframe period, based on the superframe structure information and the timing information included in the broadcast information frame already received from the management node M. The child node S0 then counts up until the time calculated using the timer 17 is reached, as described above.

The child node S0, when determining that its own ID is stored in the received synchronous frame, starts transmitting a response frame storing its own ID to the management node M at time t53. Subsequently, after completing transmission of the response frame, the child node S0 starts the sleep period (S) from time t54 and transitions to the low power consumption state. From that time point, data communication with the management node M is performed using a slot assigned to itself (only slot 1 in this example), without having to receive a broadcast information frame until a change of the superframe structure is notified again.

On the other hand, when the time counted using the timer 17 reaches t55, the child node S1 terminates the sleep period (S) started from time t49. In other words, the child node S1 starts the wakeup period (W) for returning to the normal power state from the low power consumption state. The child node S1 then starts, at time t56 which is a period of the slot 2 of a superframe of the superframe period tb4, the reception period (R) for starting reception of a synchronous frame transmitted from the management node M using a slot assigned to itself (slot 2 in this example).

The child node S1 receives the synchronous frame transmitted from the management node M in the reception period (R) started from time t56 and determines whether or not the slot is assigned to itself, according to whether or not its own ID is stored in the received synchronous frame. It is assumed in this example that its own ID is stored.

If the child node S1 determines that its own ID is stored in the received synchronous frame, it calculates a wakeup period start time which is the timing for receiving a synchronous frame transmitted from the management node M using a slot assigned to itself in the next superframe period, based on the superframe structure information and the timing information included in the broadcast information frame already received from the management node M. The child node S1 then counts up until the time calculated using the timer 17 is reached, as described above.

If the child node S1 determines that its own ID is stored in the received synchronous frame, it starts transmitting a response frame storing its own ID to the management node M at time t57. Subsequently, after completing transmission of the response frame, the child node S1 starts the sleep period (S) from time t58 and transitions to the low power consumption state. From that time point, data communication with the management node M is performed using a slot assigned to itself (only slot 2 in this example), without having to receive a broadcast information frame until a change of the superframe structure is notified again.

If the ID of the child node S stored in the response frame received from the child nodes S0 and S1 matches the assigned ID of the child node S stored in the synchronous frame which has been already transmitted in the same slot, the management node M determines that the child node S is normally operating in the network. The management node M performs similar determination each time it receives a response frame.

Accordingly, it becomes possible for the child node S0 to establish synchronization and continuously perform data communication with the management node M using a period of a slot assigned to the child node S0 again, even if the child node S1 is newly registered in the network and the number of slots constituting one superframe period is changed.

Figure 9:
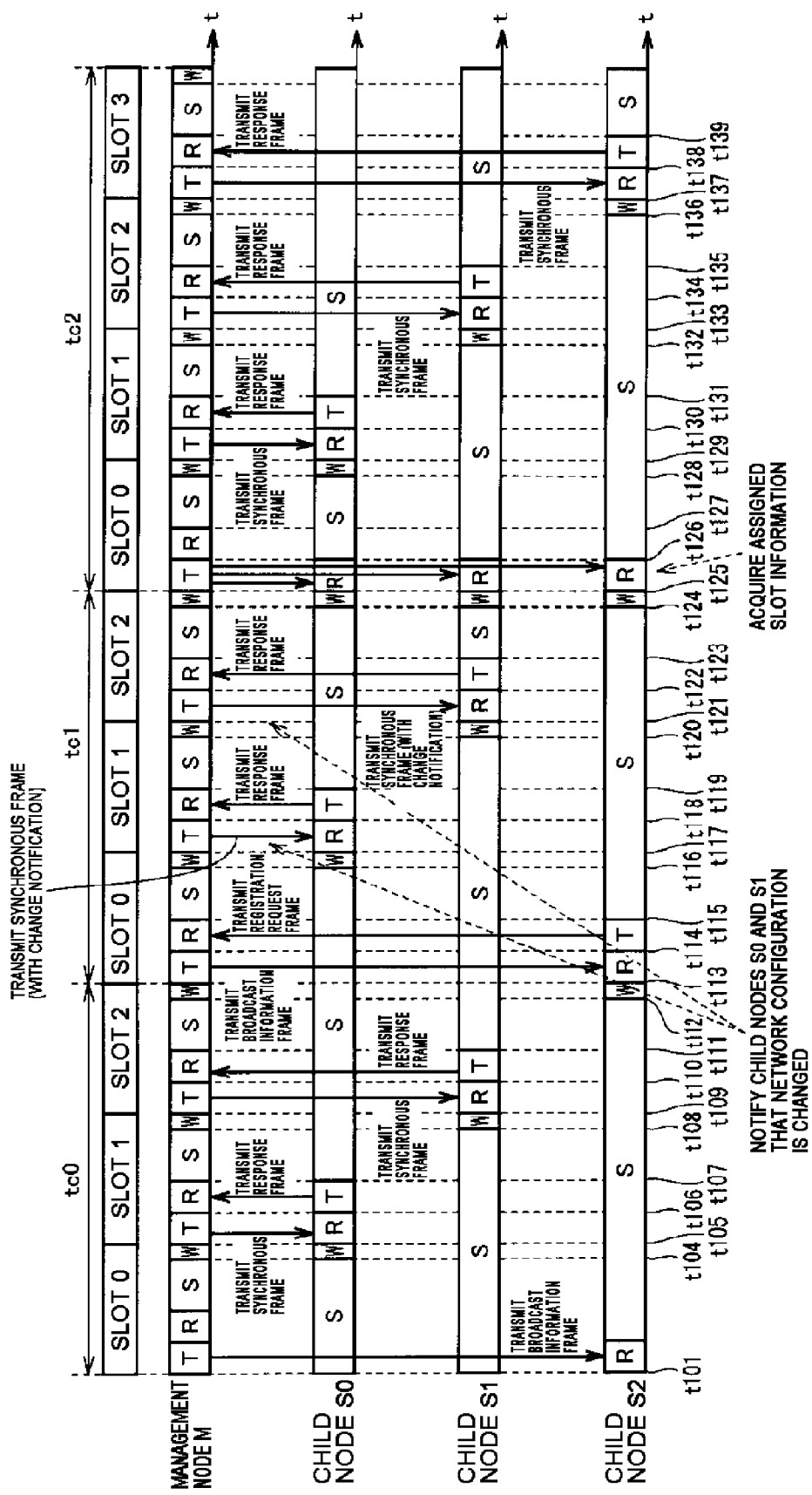
FIG. 9 is an explanatory diagram of a process flow of newly registering a child node S2 to the management node M in a state where the child nodes S0 and S1 are already registered in the management node M according to the embodiment 1 of the present invention.

FIG. 9 is an explanatory diagram of a process flow of newly registering the child node S2 to the management node M in a state where the child nodes S0 and S1 are already registered in the management node M, according to the embodiment 1 of the present invention.

Referring to FIG. 9, a superframe period tc0 will be described. The management node M transmits a broadcast information frame using the slot 0 in the superframe period tc0. In this case, because the child nodes S0 and S1 are already registered in the management node M, there are three slots in one superframe period of the superframe structure information included in the broadcast information frame, and the IDs of the child nodes S0 and S1 are already stored in the slot assignment information. Specifically, it is assumed that the slot 1 and slot 2 are assigned to the child node S0 and the child node S2, respectively, by the management node M.

Here, it is assumed that the communication unit 15 of the child node S2 which is unregistered in the management node M at a time before time t101 is activated, and a reception period for searching the management node M is started.

After the reception period (R) is started at a time before time t101, the child node S2 continues the reception period (R) until it receives the next broadcast information frame from the management node M. The child node S2 performs the channel change process if broadcast information frames cannot be received even after a predetermined period has elapsed, as will be described below.

After starting the reception period (R), the child node S2 receives a broadcast information frame from the management node M at time t101. In other words, it determines that the management node M is detected at time t101.

The child node S2 calculates a wakeup period start time t112 for receiving a broadcast information frame in the next superframe period tc1, based on the superframe structure information and the timing information included in the broadcast information frame received from the management node M.

Specifically, the wakeup period start time is calculated as "number of slots (number of slots in one superframe period) *length of the period of one slot−wakeup time−length of the reception period", based on length of a period of one slot of the superframe structure information, the number of slots in one superframe period, and the wakeup time and the length of the reception period in the timing information.

The child node S2 then counts up until time t112 calculated using the timer 17 is reached.

In addition, the child node S2 starts the sleep period (S) from time t102 and transitions to the low power consumption state.

The child node S0, when determining that it is registered in the network as described above, calculates a wakeup period start time t104 as a timing for receiving asynchronous frame corresponding to the slot assigned to itself in the same superframe period (slot 1 in this case), based on the timing information and the slot assignment information included in the broadcast information frame received from the management node M, in order to perform data communication using a slot assigned to itself from the management node M.

When the time counted using the timer 17 reaches t104, the child node S0 terminates the sleep period (S). In other words, the child node S0 starts the wakeup period (W) for returning to the normal power state from the low power consumption state. The child node S0 then starts, at time t105 which is a period of the slot 1 of a superframe of the superframe period tc0, the reception period (R) for starting reception of a synchronous frame transmitted from the management node M using a slot assigned to itself (slot 1 in this example).

The child node S0 receives the synchronous frame transmitted from the management node M in the reception period (R) started from time t105 and determines whether or not the slot is assigned to itself, according to whether or not its own ID is stored in the received synchronous frame. It is assumed in this example that its own ID is stored.

The child node S0, when determining that its own ID is stored in the received synchronous frame, calculates a wakeup period start time t116 as a timing for receiving a synchronous frame transmitted from the management node M using a slot assigned to itself in the next superframe period, based on the superframe structure information and the timing information included in the broadcast information frame already received from the management node M. The child node S0 then counts up until the time calculated using the timer 17 is reached, as described above.

Additionally, the child node S0, when determining that its own ID is stored in the received synchronous frame, starts transmitting a response frame storing its own ID to the management node M at time t106. Subsequently, after completing transmission of the response frame, the child node S0 starts the sleep period (S) from time t107 and transitions to the low power consumption state.

Additionally, the child node S1, when determining that it is registered in the network as described above, calculates a wakeup period start time t108 as a timing for receiving a synchronous frame corresponding to the slot assigned to itself in the same superframe period (slot 2 in this case), based on the timing information and the slot assignment information included in the broadcast information frame received from the management node M, in order to perform data communication using a slot assigned to itself from the management node M.

When the time counted using the timer 17 reaches t108, the child node S1 terminates the sleep period (S). In other words, the child node S1 starts the wakeup period (W) for returning to the normal power state from the low power consumption state. The child node S1 then starts, at time t109 which is a period of the slot 2 of a superframe of the superframe period tc0, the reception period (R) for starting reception of a synchronous frame transmitted from the management node M using a slot assigned to itself (slot 2 in this example).

The child node S1 receives the synchronous frame transmitted from the management node M in the reception period (R) started from time t109 and determines whether or not the slot is assigned to itself, according to whether or not its own ID is stored in the received synchronous frame. It is assumed in this example that its own ID is stored.

The child node S1, when determining that its own ID is stored in the received synchronous frame, calculates a wakeup period start time t120 as a timing for receiving a synchronous frame transmitted from the management node M using a slot assigned to itself in the next superframe period, based on the superframe structure information and the timing information included in the broadcast information frame already received from the management node M. The child node S0 then counts up until the time calculated using the timer 17 is reached, as described above.

Additionally, the child node S1, when determining that its own ID is stored in the received synchronous frame, starts transmitting a response frame storing its own ID to the management node M at time t110. Subsequently, after completing transmission of the response frame, the child node S1 starts the sleep period (S) from time t11 and transitions to the low power consumption state.

A superframe period tc1 will be described. When the time counted using the timer 17 reaches t112, the child node S2 terminates the sleep period (S). In other words, the child node S2 starts the wakeup period (W) for returning to the normal power state from the low power consumption state. The child node S2 then starts, at time t113 which is a period of the slot 0 of a superframe of the superframe period tc1, the reception period (R) for starting reception of a broadcast information frame transmitted from the management node M.

The child node S2 determines, in the reception period (R) started from time t113, whether or not it is registered in the network according to whether or not its own ID is stored in the slot assignment information included in the received broadcast information frame.

The child node S2, when determining that it is unregistered in the network, calculates a wakeup period start time t124 for receiving a broadcast information frame in the next superframe period tc2, based on the superframe structure information and the timing information included in the broadcast information frame received from the management node M.

Calculation of the wakeup period start time t124 is similar to that described above.

The child node S2 then counts up until time t124 calculated using the timer 17 is reached.

In addition, the child node S2 starts transmitting a registration request frame storing its own ID to the management node M at time t114. Subsequently, after completing transmission of the registration request frame, the child node S2 starts the sleep period (S) from time t115 and transitions to the low power consumption state.

If the ID stored in the registration request frame received from the child node S2 has not been stored in the slot assignment information, the management node M adds the number of slots in the superframe structure information of the broadcast information frame. Specifically, a process of adding a slot for use in data communication with the child node S2 to one superframe period is performed. In addition, a process of storing, in the slot assignment information, the ID of the child node S2 which has been stored in the registration request frame is performed.

At this time point, the child node S2 is newly registered in the network and the configuration of the network is changed.

Therefore, a timing of data communication of the child node S (child nodes S0 and S1 in this example) which had been registered in the network until then is changed by the number of slots due to occurrence of a change in one superframe period.

Consequently, the management node M notifies the child node S (child nodes S0 and S1 in this example) registered in the network that the configuration of the network is changed.

It is assumed that the child node S which received the change notification in turn receives a broadcast information frame transmitted in a period of the slot 0 of the next superframe period tc2.

When the time counted using the timer 17 reaches t116, the child node S0 terminates the sleep period (S) started from time t107. In other words, the child node S0 starts the wakeup period (W) for returning to the normal power state from the low power consumption state. The child node S0 then starts, at time t117 which is a period of the slot 0 of a superframe of the superframe period tc1, the reception period (R) for starting reception of a synchronous frame transmitted from the management node M using a slot assigned to itself (slot 1 in this example).

The child node S0 receives the synchronous frame transmitted from the management node M in the reception period (R) started from time t117 and determines whether or not the slot is assigned to itself, according to whether or not its own ID is stored in the received synchronous frame. It is assumed in this example that its own ID is stored.

The child node S0, when determining that its own ID is stored in the received synchronous frame, calculates a timing for receiving a frame transmitted from the management node M, as described above. On the other hand, in this case, a change notification notifying that the configuration of the network has been changed is issued as described above.

The child node S0, when determining that a change notification is included in the synchronous frame transmitted from the management node M, calculates a wakeup period start time t124 for receiving a broadcast information frame in the next superframe period tc2, based on the superframe structure information, the timing information, and the slot assignment information included in the broadcast information frame already received from the management node M.

Specifically, for example, the child node S0 calculates the wakeup period start time t124 as "number of slots (number of slots including itself remaining in one superframe period) *length of the period of one slot−wakeup time−length of the reception period" with time t118 as the reference point, based on the number of slots remaining in one superframe period which is the superframe structure information, the length of a period of one slot, the length of the reception period, and the wakeup time in the timing information. The child node S0 then counts up until time t124 calculated using the timer 17 is reached.

In addition, the child node S0 starts transmitting a response frame storing its own ID to the management node M at time t118. Subsequently, after completing transmission of the response frame, the child node S0 starts the sleep period (S) from time t119 and transitions to the low power consumption state.

If the ID of the child node S0 stored in the response frame received from the child node S0 matches the assigned ID of the child node S0 stored in the synchronous frame which has been already transmitted in the same slot, the management node M determines that the child node S0 is normally operating in the network.

When the time counted using the timer 17 reaches t120, the child node S1 terminates the sleep period (S) started from time t111. In other words, the child node S1 starts the wakeup period (W) for returning to the normal power state from the low power consumption state. The child node S1 then starts, at time t121 which is a period of the slot 2 of a superframe of the superframe period tc1, the reception period (R) for starting reception of a synchronous frame transmitted from the management node M using a slot assigned to itself (slot 2 in this example).

The child node S1 receives the synchronous frame transmitted from the management node M in the reception period (R) started from time t121 and determines whether or not the slot is assigned to itself, according to whether or not its own ID is stored in the received synchronous frame. It is assumed in this example that its own ID is stored.

The child node S1, when determining that its own ID is stored in the received synchronous frame, calculates a timing for receiving a next frame transmitted from the management node M, as described above. In this case, a change notification notifying that the configuration of the network has been changed is issued as described above.

The child node S1, when determining that the change notification is included in the synchronous frame transmitted from the management node M, calculates a wakeup period start time t124 for receiving a broadcast information frame in the next superframe period tc2, based on the superframe structure information, the timing information, and the slot assignment information included in the broadcast information frame already received from the management node M.

Specifically, for example, the child node S1 calculates the wakeup period start time t124 as "number of slots (number of slots including itself remaining in one superframe period) *length of the period of one slot−wakeup time−length of the reception period" with time t122 as the reference point, based on the number of slots remaining in one superframe period which is the superframe structure information, the length of a period of one slot, the length of the reception period, and the wakeup time in the timing information. The child node S1 then counts up until time t124 calculated using the timer 17 is reached.

In addition, the child node S1 starts transmitting a response frame storing its own ID to the management node M at time t122. Subsequently, after completing transmission of the response frame, the child node S1 starts the sleep period (S) from time t123 and transitions to the low power consumption state.

If the ID of the child node S1 stored in the response frame received from the child node S1 matches the assigned ID of the child node S1 stored in the synchronous frame which has been already transmitted in the same slot, the management node M determines that the child node S1 is normally operating in the network.

The superframe period tc2 will be described. When the time calculated using the timer 17 reaches time t124, the child nodes S0, S1 and S2 respectively terminate the sleep period (S). In other words, the child nodes S0, S1 and S2 start the wakeup period (W) for returning to the normal power state from the low power consumption state. The child nodes S0, S1 and S2 then start, at time t125 which is a period of the slot 0 of a superframe of the superframe period tc2, the reception period (R) for starting reception of a broadcast information frame transmitted from the management node M.

The child nodes S0, S1 and S2 determine whether or not they are registered in the network based on whether or not their own IDs are stored in the slot assignment information included in the broadcast information frame received in the reception period (R) started from time t125.

The child nodes S0, S1 and S2, when determining that they are registered in the network, do not transmit a registration request frame. It is assumed here that the child nodes S0, S1 and S2 are all registered.

The child node S0, when determining that it is registered in the network, calculates a wakeup period start time t128 as a timing for receiving a synchronous frame corresponding to the slot assigned to itself in the same superframe period (slot 1 in this case), based on the timing information and the slot assignment information included in the broadcast information frame received from the management node M, in order to perform data communication using a slot assigned to itself from the management node M.

Calculation of the wakeup period start time t126 is similar to that described above. The child node S0 then counts up until time t128 calculated using the timer 17 is reached. In addition, the child node S0 starts the sleep period (S) from time t126 and transitions to the low power consumption state.

On the other hand, the child node S1, when determining that it is registered in the network, calculates a wakeup period start time t132 as a timing for receiving a synchronous frame corresponding to the slot assigned to itself in the same superframe period (slot 2 in this case), based on the timing information and the slot assignment information included in the broadcast information frame received from the management node M, in order to perform data communication using a slot assigned to itself from the management node M.

Calculation of the wakeup period start time t132 is similar to that described above. The child node S1 then counts up until time t132 calculated using the timer 17 is reached. In addition, the child node S1 starts the sleep period (S) from time t126 and transitions to the low power consumption state.

Additionally, the child node S2, when determining that it is registered in the network, calculates a wakeup period start time t136 as a timing for receiving asynchronous frame corresponding to the slot assigned to itself in the same superframe period (slot 3 in this case), based on the timing information and the slot assignment information included in the broadcast information frame received from the management node M, in order to perform data communication using a slot assigned to itself from the management node M.

Calculation of the wakeup period start time t136 is similar to that described above. The child node S2 then counts up until time t136 calculated using the timer 17 is reached. In addition, the child node S2 starts the sleep period (S) from time t126 and transitions to the low power consumption state.

When the time counted using the timer 17 reaches t128, the child node S0 terminates the sleep period (S) started from time t126. In other words, the child node S0 starts the wakeup period (W) for returning to the normal power state from the low power consumption state. The child node S0 then starts, at time t129 which is a period of the slot 1 of a superframe of the superframe period tc2, the reception period (R) for starting reception of a synchronous frame transmitted from the management node M using a slot assigned to itself (slot 1 in this example).

The child node S0 receives the synchronous frame transmitted from the management node M in the reception period (R) started from time t129 and determines whether or not the slot is assigned to itself, according to whether or not its own ID is stored in the received synchronous frame. It is assumed in this example that its own ID is stored.

The child node S0, when determining that its own ID is stored in the received synchronous frame, calculates a wakeup period start time which is the timing for receiving a synchronous frame transmitted from the management node M using a slot assigned to itself in the next superframe period, based on the superframe structure information and the timing information included in the broadcast information frame already received from the management node M. The child node S0 then counts up until the time calculated using the timer 17 is reached, as described above.

The child node S0, when determining that its own ID is stored in the received synchronous frame, starts transmitting a response frame storing its own ID to the management node M at time t130. Subsequently, after completing transmission of the response frame, the child node S0 starts the sleep period (S) from time t131 and transitions to the low power consumption state. From that time point, data communication with the management node M is performed using a slot assigned to itself (only slot 1 in this example), without having to receive a broadcast information frame until a change of the superframe structure is notified again.

On the other hand, when the time counted using the timer 17 reaches t132, the child node S1 terminates the sleep period (S) started from time t126. In other words, the child node S1 starts the wakeup period (W) for returning to the normal power state from the low power consumption state. The child node S1 then starts, at time t133 which is a period of the slot 2 of a superframe of the superframe period tc2, the reception period (R) for starting reception of a synchronous frame transmitted from the management node M using a slot assigned to itself (slot 2 in this example).

The child node S1 receives the synchronous frame transmitted from the management node M in the reception period (R) started from time t133 and determines whether or not the slot is assigned to itself, according to whether or not its own ID is stored in the received synchronous frame. It is assumed in this example that its own ID is stored.

The child node S1, when determining that its own ID is stored in the received synchronous frame, calculates a wakeup period start time which is the timing for receiving a synchronous frame transmitted from the management node M using a slot assigned to itself in the next superframe period, based on the superframe structure information and the timing information included in the broadcast information frame already received from the management node M. The child node S1 then counts up until the time calculated using the timer 17 is reached, as described above.

The child node S1, when determining that its own ID is stored in the received synchronous frame, starts transmitting a response frame storing its own ID to the management node M at time t134. Subsequently, after completing transmission of the response frame, the child node S1 starts the sleep period (S) from time t135 and transitions to the low power consumption state. From that time point, data communication with the management node M is performed using a slot assigned to itself (only slot 2 in this example), without having to receive a broadcast information frame until a change of the superframe structure is notified again.

On the other hand, when the time counted using the timer 17 reaches t136, the child node S2 terminates the sleep period (S) started from time t126. In other words, the child node S2 starts the wakeup period (W) for returning to the normal power state from the low power consumption state. The child node S2 then starts, at time t137 which is a period of the slot 3 of a superframe of the superframe period tc2, the reception period (R) for starting reception of a synchronous frame transmitted from the management node M using a slot assigned to itself (slot 2 in this example).

The child node S2 receives the synchronous frame transmitted from the management node M in the reception period (R) started from time t137 and determines whether or not the slot is assigned to itself, according to whether or not its own ID is stored in the received synchronous frame. It is assumed in this example that its own ID is stored.

The child node S2, when determining that its own ID is stored in the received synchronous frame, calculates a wakeup period start time which is the timing for receiving a synchronous frame transmitted from the management node M using a slot assigned to itself in the next superframe period, based on the superframe structure information and the timing information included in the broadcast information frame already received from the management node M. The child node S2 then counts up until the time calculated using the timer 17 is reached, as described above.

The child node S2, when determining that its own ID is stored in the received synchronous frame, starts transmitting a response frame storing its own ID to the management node M at time t138. Subsequently, after completing transmission of the response frame, the child node S2 starts the sleep period (S) from time t139 and transitions to the low power consumption state. From that time point, data communication with the management node M is performed using a slot assigned to itself (only slot 3 in this example), without having to receive a broadcast information frame until a change of the superframe structure is notified again.

If the ID of the child node S stored in the response frame received from the child nodes S0, S1 and S2 matches the assigned ID of the child node S stored in the synchronous frame which has been already transmitted in the same slot, the management node M determines that the child node S is normally operating in the network. The management node M performs similar determination each time it receives a response frame.

Accordingly, it becomes possible for the child nodes S0 and S1 to establish synchronization and continuously perform data communication with the management node M using a period of a slot assigned to the child nodes S0 and S1 again, even if the child node S2 is newly registered in the network and the number of slots constituting one superframe period is changed.

Figure 10A:
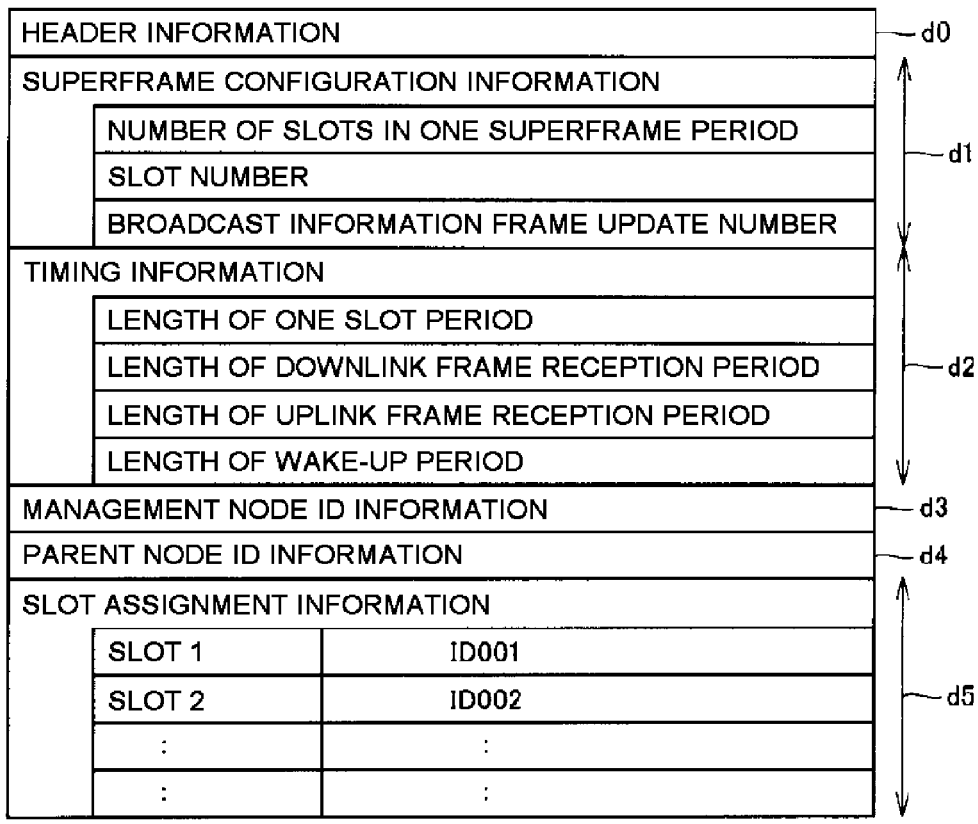
FIGS. 10A and 10B are explanatory diagrams of a structure of a radio frame transmitted to a child node from a management node (including a relay node R described below)
Figure 10B:
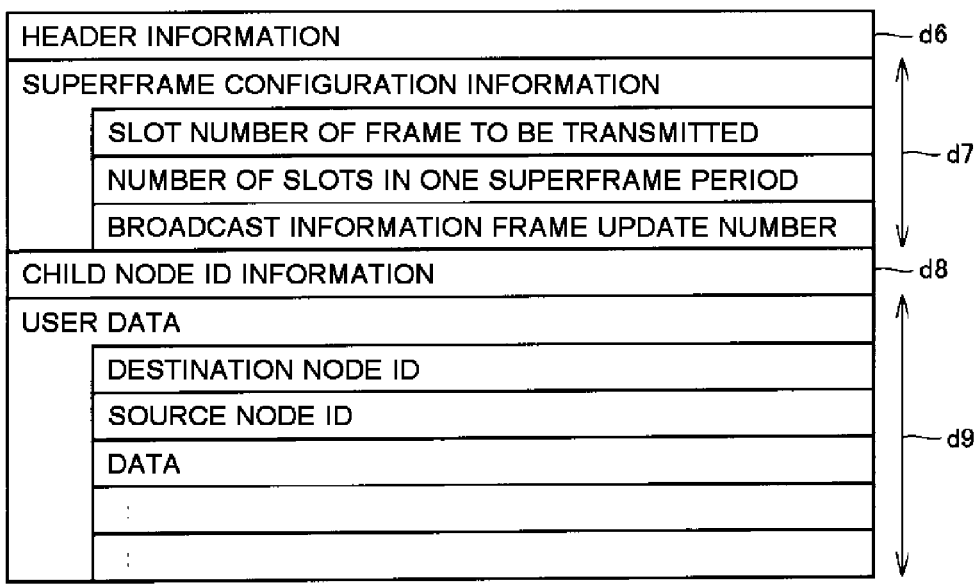

FIGS. 10A and 10B are explanatory diagrams of a structure of a radio frame for transmission to a child node from a management node (including a relay node R described below). As for identical information included in each radio frame, duplicate description is omitted.

Referring to FIG. 10A, a case is described where the broadcast information frame includes header information d0, superframe structure information d1, timing information d2, ID information d3 and d4 of a management node and a relay node, and slot assignment information d5.

The header information d0 includes data indicating that the radio frame is a broadcast information frame.

The superframe structure information d1 includes data such as the number of slots in one superframe period, slot numbers of frames to be transmitted, or the like. If there is no data in the slot assignment information, the number of slots is one, i.e., only the slot 0. In addition, when ID information of a plurality of child nodes S is included in the slot assignment information, the number of slots is given by adding one, i.e., the number of slot 0, to the number in the ID information. The number of slots is used, together with length of a period of a slot, when setting a timing of receiving the broadcast information frame. In addition, in the slot number, information of the slot number used for transmitting the frame is stored. Specifically, zero is set for the broadcast information frame because the slot 0 is used.

A broadcast information frame update number, which is a number of a broadcast information frame currently being broadcasted, is updated (added) when a change occurs in the information stored in the broadcast information frame.

The timing information d2 includes various parameters for setting a timing of performing data communication with the management node M. Specifically, the length of a period of a slot, the length of a period for transmitting data from the communication unit 49 (downlink frame reception period), the length of a period for the communication unit 49 to receive data (uplink frame reception period), the length of the wakeup period, and the like are included. Length of the sleep period which is the low power consumption state can also be included. It is possible to calculate the length of the sleep period (S) by subtracting the length of a period for transmitting data, the length of a period for receiving data, and the length of the wakeup period from the length of a period of a slot.

The reception period (R) for the communication unit 15 of the child node S to receive data is set according to the length of a period transmitting data from the communication unit 49 of the management node M (downlink frame reception period). The length of the transmission period (T) for the communication unit 15 of the child node S to transmit data is set according to the length of a period for the communication unit 49 of the management node M to receive data (uplink frame reception period). It is assumed that a parameter defining, prior to the period for the child node S to receive data, the wakeup period (W) for setting a state capable of receiving data is also included in the timing information.

By providing the wakeup period (W), it becomes possible to reliably set the receiving side in a state capable of receiving data when the transmitting side transmits data.

It is assumed that the wakeup period (W) is set as appropriate according to the characteristic of the node. The parameters of these periods need not be preliminarily fixed and can be adjusted by a user's input, for example. Also in this case, it is possible to simply adjust the timing of data communication in the network so that data communication between the management node M and the child node S is performed based on the timing information of the broadcast information frame. In other words, it is not necessary to memorize the information in each ROM of the child nodes.

The management node ID information d3 is assumed to be ID information of the management node M, which is ID000 in this example. It is used when performing transmission to the management node M from the child node S as described below.

The parent node ID information d4 is ID information of the parent node which received the registration request frame, or is ID information of the management node M when the management node M is the parent node. In addition, it is ID information of the relay node R when the relay node R is the parent node. By checking the ID information, the child node S can determine whether its parent node is the management node M or the relay node R.

In addition, in the slot assignment information d5, ID (Identification) information of the child nodes S is set which is registered in the network and respectively corresponds to the slots added in one superframe period. A case is shown where an ID003 of the child node S0 is registered corresponding to the slot 1. In addition, a case is shown where an ID004 of the child node S1 is registered corresponding to the slot 2. In the initial state, there is no data in the slot assignment information d5 because no child node S is registered in the network.

Each child node checks whether or not it is registered in the network according to the ID information of the child node assigned to the slot. At the same time, each child node checks the order of the slot assigned to itself by counting from the start of one superframe period, according to the slot number provided in sequence.

Referring to FIG. 10B, a case is described where the synchronous frame includes header information d6, superframe structure information d7, child node ID information d8, and user data d9.

The header information d6 includes data indicating that the radio frame is a synchronous frame.

The superframe structure information d7 includes data such as the slot number of the frame to be transmitted, the number of slots in one superframe period, and the broadcast information frame update number. The node which received the synchronous frame determines whether or not it is a synchronous frame of the slot assigned to itself, based on the slot number and the child node ID information.

In addition, the broadcast information frame update number, having stored therein the number of the broadcast information frame being broadcasted in the network by the management node M at the time when the synchronous frame is transmitted, is updated when a change occurs in the information stored in the broadcast information frame. The node which received the synchronous frame compares it with the broadcast information frame number stored in the broadcast information frame or the synchronous frame previously received by the node, determines that the broadcast information frame has been updated if a different number is stored, and performs timing setting such as the sleep period setting for receiving a broadcast information frame in the slot 0 of the next superframe period.

In other words, updating the number of the broadcast information frame corresponds to a change notification. The child node ID information d8 has stored therein ID information of the node assigned to the slot that transmits the radio frame.

Figure 11A:
FIGS. 11A and 11B are explanatory diagrams of a structure of a radio frame for transmission to a management node (including the relay node R) from a child node.
Figure 11B:
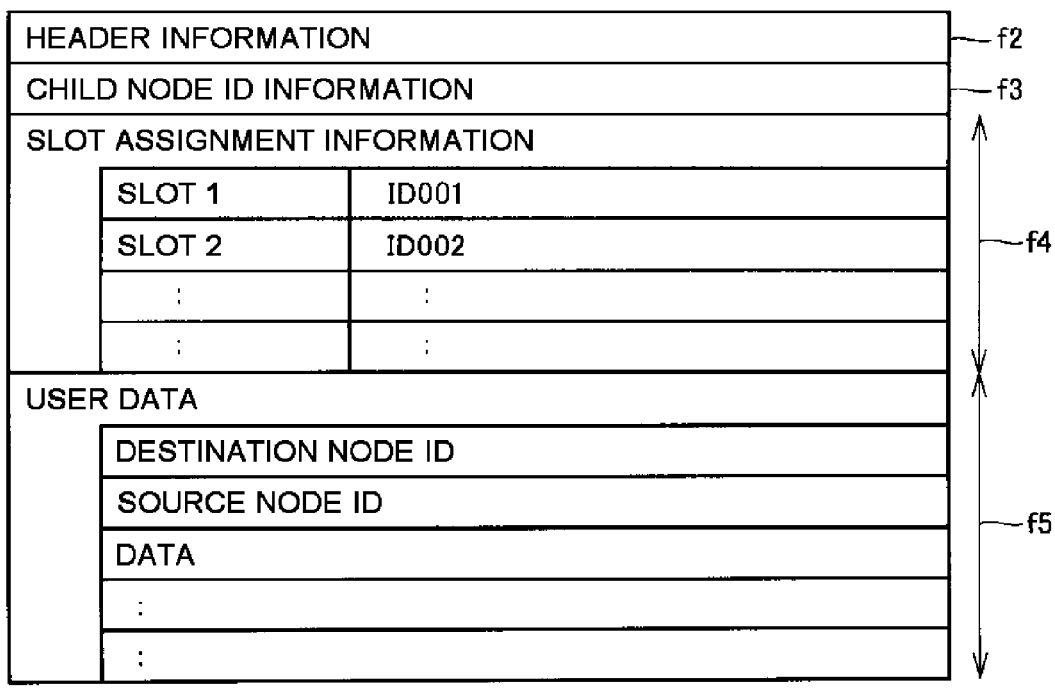

The user data d9 will be described below. FIGS. 11A and 11B are explanatory diagrams of a structure of a radio frame for transmission to a management node (including the relay node R) from a child node. As for identical information included in each radio frame, duplicate description is omitted.

Referring to FIG. 11A, a case is described where the registration request frame includes header information f0 and registration node ID information f1.

The header information f0 includes data indicating that the radio frame is a registration request frame.

The registration node ID information f1 has stored therein a node ID of the node (child node) requesting participation in the network.

The management node M which received the registration request frame determines whether or not to allow participation in the network and, if it allows participation, updates the broadcast information frame number to be stored in the broadcast information frame or the synchronous frame which will be subsequently transmitted to the management node M. In addition, change (addition of a slot) of the superframe structure is performed from the next superframe period. These processes are not performed if participation in the network is not allowed, and whereby security of the network can also be enhanced.

Referring to FIG. 11B, a case is described where the response frame includes header information f2, child node ID information f3, slot assignment information f4, and user data f5.

The header information f2 includes data indicating that the radio frame is a response frame.

The child node ID information f3 has stored therein ID information of a child node that transmits the radio frame. Referring to the information, the management node M that receives the radio frame checks whether or not the child node which has transmitted the radio frame according to the slot assignment information held by itself is a node allowed to participate in the network. If it is a radio frame from a child node which is not allowed to participate in the network, the radio frame is ignored. Accordingly, access from an unauthorized node is prohibited, and whereby security of the network can be enhanced.

The slot assignment information f4 is stored if the child node that has transmitted the radio frame is a relay node described below. If a relay node is participating in the network, a further child node is participating in the network via the relay node R. In this case, the ID information of the child node participating in the network via the relay node R is stored.

The management node M that received the response frame from the relay node R assigns a slot in one superframe period for a child node with which the relay node R can communicate, as well as a child node with which the management node itself can directly communicate.

Next, user data d9 and f5 of a synchronous frame and a response frame will be described. User data is a region within a radio frame for transmitting data between nodes participating in the network. There are a region for storing ID information specifying each node of the source and the destination of transmitting user data, and a data region for storing data to be transmitted from the source to the destination of transmission. Data stored in the data region includes operation instruction commands from the source to the destination of transmission.

When requesting transfer of data acquired by the child node S0 from the management node M to the child node S0, for example, ID information of the management node M (ID000) is stored as a source node ID and ID information of the child node S0 (ID001) is stored as the ID of the destination node in a synchronous frame from the management node M to the child node S0. As the data to be transmitted, a data transfer instruction command is transmitted following the source node ID.

The child node S0 checks the ID of the destination node included in the user data and recognizes whether or not the use data is addressed to itself.

The child node S0, when recognizing that the user data is addressed to itself, and transferring the data in response to the data transfer instruction command, stores the ID information (ID001) of the child node S0 as a source node ID, and the ID information (ID000) of the management node M as a destination node ID in the response frame to the management node M from the child node S0, and transmits the data acquired by the child node S0 following the destination node ID.

As another example, the child node S1, when transmitting data to the child node S2, stores ID information of the child node S2 (ID004) as the destination node ID and ID information of the child node S1 (ID003) as the source node ID in the user data region of the response frame transmitted to the management node M. Then, the child node S1 transmits the data to be transmitted following the source node ID.

The management node M which received the response frame from the child node S1 checks the ID of the destination node included in the user data and recognizes whether or not the user data is addressed to itself.

The management node M, if recognizes that the user data is not addressed to itself, and if the ID information is included in a node in the network managed by the management node M, transfers the user data to the child node. Specifically, the management node M stores information in the user data region of the response frame received from the child node S1 in the user data region of a synchronous frame to be transmitted to the child node S2, and transmits the synchronous frame to the child node S2.

The child node S2 which received the synchronous frame checks the ID of the destination node included in the user data and recognizes whether or not it is addressed to the child node S2. It then becomes possible for the child node S2 to determine whether or not the received data is appropriate by checking whether or not the data is addressed to itself according to the destination node ID, and further checking the data transmission source according to the source node ID. Therefore, transferring data from the child node S1 to the child node S2, for example, is also possible.

In addition, if there is a large amount of data to be transferred, the sleep period (S) in a slot assigned to each of the child node S1 and the child node S2 is also available for data transfer. Furthermore, if data transfer cannot be completed in one slot, transfer of data is performed using a plurality of superframe periods.

Figure 12:
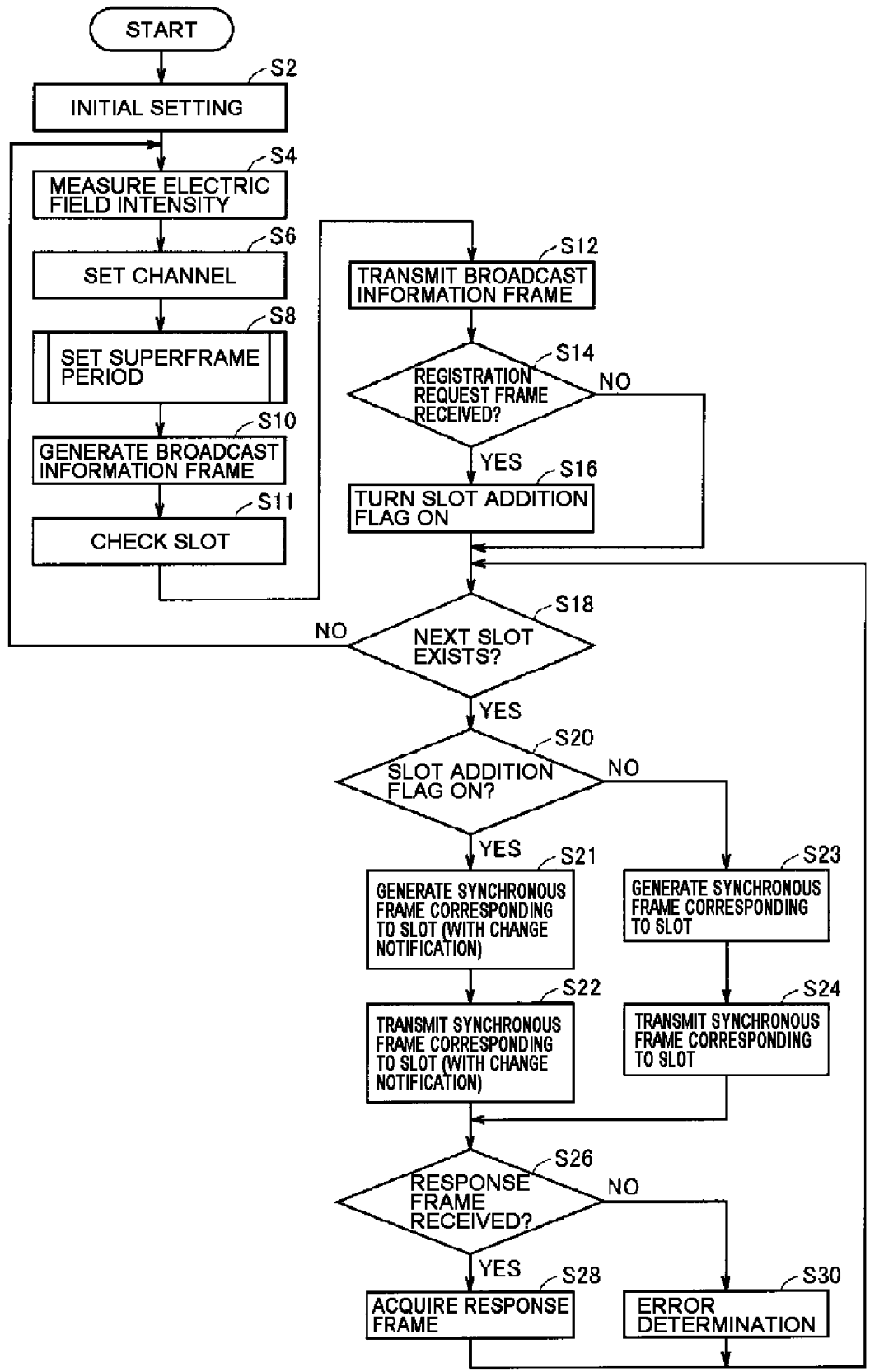
FIG. 12 is a flow chart illustrating a process flow of data communication in the management node M according to the embodiment 1 of the present invention.

FIG. 12 is a flow chart illustrating a process flow of data communication in the management node M according to the embodiment 1 of the present invention.

Referring to FIG. 12, the CPU 41 first starts, when powered-on, data communication in the flow by reading a software program stored in the ROM 43.

The data transmission/reception control unit 148 of the CPU 41 first performs initial setting of the communication unit 49 for data communication (step S2).

Next, the channel setting unit 144 instructs the electric field intensity measurement unit 46# to measure the electric field intensity in the external environment (step S4).

When performing data communication according to the measurement of electric field intensity by the electric field intensity measurement unit 46#, the channel setting unit 144 sets for the communication unit 49 an appropriate channel for data transmission and reception (step S6). Specifically, a channel having the lowest external electric field intensity and thereby expected to have the least congestion with communication in other networks is preferentially used.

Next, the superframe setting unit 146 performs a process of setting a superframe period (step S8). The superframe period setting process will be described below.

In the initial setting, one superframe period includes only the slot 0. Therefore, the process of step S8 can be skipped in the first one cycle.

Next, the data transmission/reception control unit 148 generates a broadcast information frame based on the superframe period set by the superframe setting unit 146 (step S10). Specifically, the broadcast information frame described in FIG. 10A is generated.

Next, the data transmission/reception control unit 148 checks the slot in one superframe period set by the superframe setting unit 146 (step S11).

The data transmission/reception control unit 148 then transmits, via the communication unit 49, the broadcast information frame in the transmission period (T) of the slot 0 set in one superframe period (step S12).

Subsequently, the data transmission/reception control unit 148 determines whether or not it received, via the communication unit 49, a registration request frame in the reception period (R) of the slot 0 set in one superframe period (step S14). Specifically, it is determined whether or not a registration request frame described in FIG. 11A is received.

If the data transmission/reception control unit 148 determines that the registration request frame is received at step S14 (YES at step S14), it turns a slot addition flag on (step S16).

If, on the other hand, the data transmission/reception control unit 148 determines at step S14 that no registration request frame is received (No at step S14), the process flow proceeds to the next step S18.

When the reception period R via the communication unit 49 is completed, the data transmission/reception control unit 148 instructs transition to the low power consumption state that instructs the power supply management unit 46 to terminate power supply to each unit. Accordingly, the management node M transitions to the sleep period (S). Before the transition to the sleep period (S), the data transmission/reception control unit 148 calculates the wakeup period start time to start the next slot. Subsequently, the calculated time is set in the timer 45#. The timer 45# counts up until the calculated time is reached and, when the calculated time is reached, notifies it to the power supply management unit 46. Accordingly, the power supply management unit 46 resumes the normal power state from the low power consumption state according to the notification from the timer 45#. After returning from the low power consumption state to the normal power state, the data transmission/reception control unit 148 starts the next slot. The above process is repeatedly performed for each slot. This process allows the management node M to transition to the low power consumption state in which power supply is stopped by operating it intermittently as the sleep period (S) except for the transmission period (T), the reception period (R), and the wakeup period (W), suppressing power consumption thereby.

Next, at step S18, the data transmission/reception control unit 148 determines whether or not there exists a next slot in one superframe period (step S18).

If the data transmission/reception control unit 148 determines at step S18 that there exists a next slot in one superframe period (YES at step S18), the process flow proceeds to the next step S20.

If, on the other hand, the data transmission/reception control unit 148 determines at step S18 that there exists no next slot in one superframe period, the process flow returns to step S4 (No at step S18). In other words, the data transmission/reception control unit 148 completes one cycle of data communication in one superframe period and transitions to the next cycle. In this occasion, the channel setting unit 144 measures again at step S4 the electric field intensity using the electric field intensity measurement unit 46#, and sets an appropriate channel for the communication unit 49 according to the measurement of electric field intensity. Therefore, it can be changed to an appropriate channel if the radio wave condition turns bad. When the channel is changed to another channel by the channel setting unit 144, although data communication with the child node S which has been performing data communication with the previous channel cannot be performed temporarily, it is possible to quickly reestablish the network by preserving the slot assignment information and the like.

The data transmission/reception control unit 148, when determining at step S18 that there exists a next slot in one superframe period (YES at step S18), next determines whether or not a slot addition flag has been turned on (step S20).

The data transmission/reception control unit 148, when determining at step S20 that the slot addition flag has been turned on (YES at step S20), generates a synchronous frame (with change notification) corresponding to the slot (step S21). Specifically, a broadcast information frame is generated with the broadcast information frame update number described in FIG. 10B updated.

Next, the data transmission/reception control unit 148 transmits, via the communication unit 49, a synchronous frame (with change notification) corresponding to the slot (step S22). By receiving the synchronous frame, a child node can determine that there is a change in one superframe period.

The data transmission/reception control unit 148, when determining at step S20 that the slot addition flag is not turned on (No at step S20), generates a synchronous frame corresponding to the slot (step S21). Specifically, a broadcast information frame is generated with the broadcast information frame update number described in FIG. 10B not updated.

Next, the data transmission/reception control unit 148 transmits, via the communication unit 49, a synchronous frame corresponding to the slot (step S24).

Next, the data transmission/reception control unit 148 determines whether or not a response frame to the synchronous frame corresponding to the slot is received via the communication unit 49 (step S26). Specifically, it is determined whether or not a response frame described in FIG. 11B is received.

The data transmission/reception control unit 148, when determining at step S26 that a response frame is received (YES at step S26), acquires the response frame (step S28). The acquired response frame is assumed to be stored in a memory area such as the RAM 42, for example, according to the instruction of the data transmission/reception control unit 148.

The response frame stored in the memory area and corresponding to each slot can be used, for example, to check the existence of a child node. In addition, the management node M can acquire sensor data of each child node constituting the network and grasp the peripheral situation by providing a sensor to a child node and including data of the sensor provided at the child node in the user data of the response frame.

On the other hand, the data transmission/reception control unit 148, when determining at step S26 that no response frame is received (NO at step S26), performs an error determination (step S30). For example, occurrence of failure of the child node S or demand for battery exchange can be considered as a cause of error determination.

The result of error determination is assumed to be stored in a memory area such as the RAM 42, for example, following the instruction of the data transmission/reception control unit 148. The result of error determination is used in a process of setting the superframe period described below.

The process flow returns to step S18 again. When the reception period R in each slot via the communication unit is completed as described above, the data transmission/reception control unit 148 instructs transition to the low power consumption state that instructs the power supply management unit 46 to terminate power supply to each unit. Accordingly, the management node M transitions to the sleep period (S).

At step S18, the data transmission/reception control unit 148 determines (step S18) whether or not there exists a next slot in one superframe period and repeats a process similar to that described above. In other words, if there exists a slot, the data transmission/reception control unit 148 generates a synchronous frame corresponding to the slot and transmits it via the communication unit 49.

After processing of all the slots is completed, the process flow returns to step S4 to measure the electric field intensity, and after setting the channel, performs the superframe period setting process.

In this example, a case is described where the process flow returns to step S4 to measure the electric field intensity and set the channel when one cycle of data communication in one superframe period is completed. On the other hand, measurement of the electric field intensity and channel setting may be performed not for each cycle but when a plurality of cycles is completed.

Figure 13:
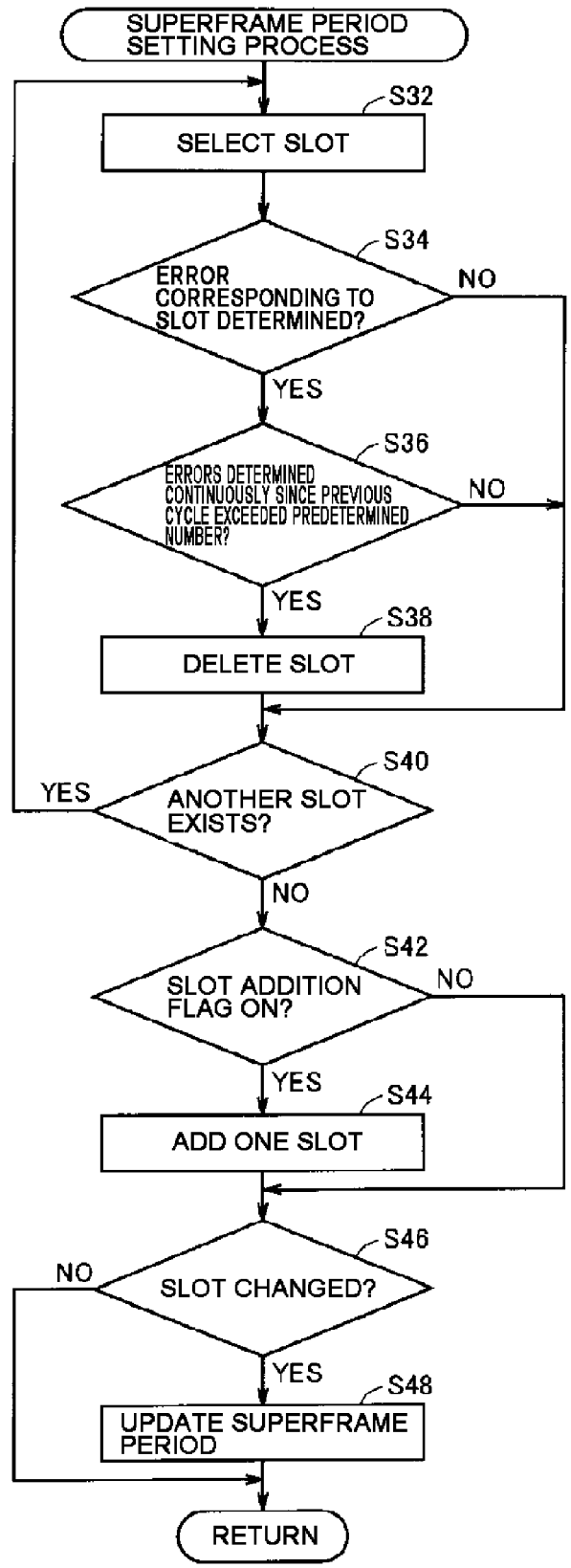
FIG. 13 is a flow chart illustrating a setting process of one superframe period according to the embodiment 1 of the present invention.

FIG. 13 is a flow chart illustrating a setting process of a superframe period according to the embodiment 1 of the present invention.

The process is performed by the superframe setting unit 146 and realized when the CPU 41 reads a software program stored in the ROM 43.

Referring to FIG. 13, the superframe setting unit 146 first selects a slot set in one superframe period. In this case, it is assumed that the slot to be selected is other than the slot 0.

Next, the superframe setting unit 146 determines whether or not there is an error determination corresponding to the selected slot (step S34). Specifically, the superframe setting unit 146 determines whether or not there is an error determination corresponding to the selected slot based on the error determination result stored in a memory area such as RAM 42.

If it is determined at step S34 that there is an error determination corresponding to the selected slot, the process flow proceeds to the next step S36. If, on the other hand, it is determined at step S34 that there is no error determination corresponding to the selected slot, the process flow proceeds to step S40.

Next, the superframe setting unit 146 determines whether or not error determination continues a predetermined number of times or more since the previous cycle (step S36).

If it is determined at step S36 that error determination continues a predetermined number of times or more since the previous cycle (YES at step S36), the superframe setting unit 146 deletes the slot (step S38). The process flow then proceeds to step S40. In other words, it is possible to delete unnecessary slots and reduce communication load in the network by deleting slots in a state incapable of continuing data communication.

If, on the other hand, the superframe setting unit 146 determines at step S36 that error determination does not continue a predetermined number of times or more since the previous cycle, the process flow proceeds to step S40 (No at step S36).

Next, at step S40, the superframe setting unit 146 determines whether or not there exists another slot (step S40). Specifically, the superframe setting unit 146 determines whether or not there exists another slot set in one superframe period. If it is determined that there exists another slot (YES at step S40), the process flow returns to step S32 where the slot is selected and the process is repeated.

If it is determined at step S40 that there exists no other slot (NO at step S4), the superframe setting unit 146 determines whether or not the slot addition flag is turned on (step S42).

If it is determined at step S42 that the slot addition flag is turned on (YES at step S42), the superframe setting unit 146 adds one slot (step S44).

If, on the other hand, it is determined that the slot addition flag is not turned on (NO at step S42), the superframe setting unit 146 skips step S44 and the process flow proceeds to step S46.

Next, the superframe setting unit 146 determines whether or not there is a change in the number of slots (step S46).

If it is determined at step S46 that there is a change in the number of slots (YES at step S46), the superframe setting unit 146 updates the superframe period (step S48).

If, for example, one slot has been deleted, the superframe period is updated to the one in which the slot has been deleted. If one slot has been added, the superframe period is updated to the one in which the slot has been added. The superframe structure information d1 described in FIG. 10A is updated when a broadcast information frame according to the update of the superframe period is generated. For example, the number of slots, the slot number of one superframe period, the broadcast information frame update number are updated. According to the addition of one slot, the slot assignment information d5 is updated. For example, the slot and the ID information of the child node which transmitted the registration request frame with the slot addition flag turned on are stored in an associated manner. Assignment of a slot can be changed dynamically, not in the order of registration, and the relation of assignment between a slot constituting a superframe and each child node S can be changed each time a superframe is updated. The process also makes it possible to enhance security in data communication between the management node M and the child node S.

If, on the other hand, it is determined at step S46 that there is no change in the number of slots (NO at step S46), the process skips processing at step S48 to terminate the process (return).

One superframe period is set and updated based on the process. Subsequently, a broadcast information frame is generated, based on the set and updated one superframe period.

In other words, one superframe period is updated based on the process and the configuration of the network will be dynamically changed.

Figure 14:
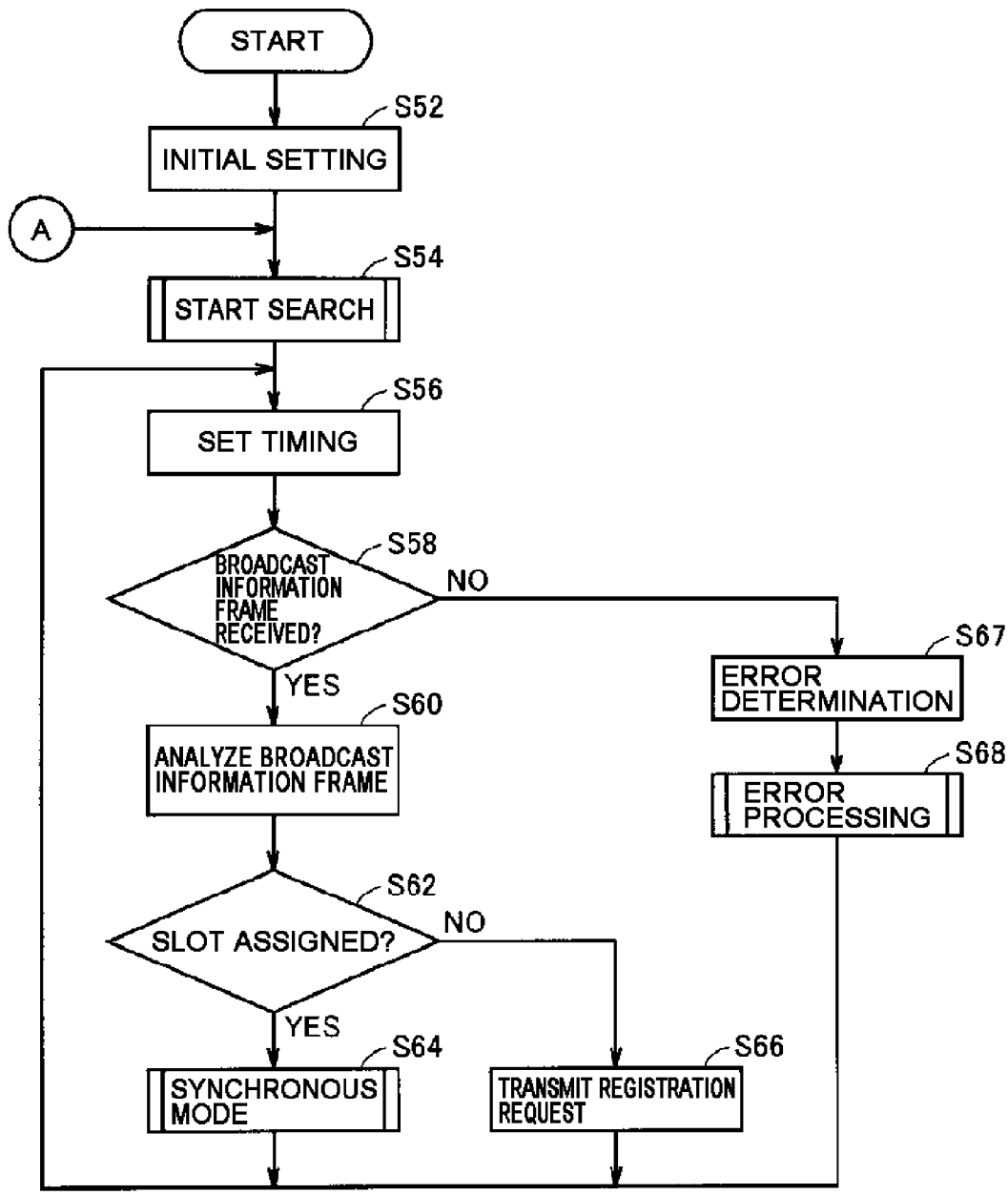
FIG. 14 is a flow chart illustrating a process flow of data communication in the child node S.

Next, data communication of a child node according to the embodiment 1 of the present invention will be described. FIG. 14 is a flow chart illustrating a process flow of data communication in the child node S.

Referring to FIG. 14, when powered-on, the CPU 11 first reads a software program stored in the ROM 13 to start data communication in the flow.

The CPU 11 first performs initial setting of the communication unit 15 for data communication (step S52). It is assumed that the CPU 11 instructs the power supply management unit 14 to supply power to the communication unit 15.

Figure 15:
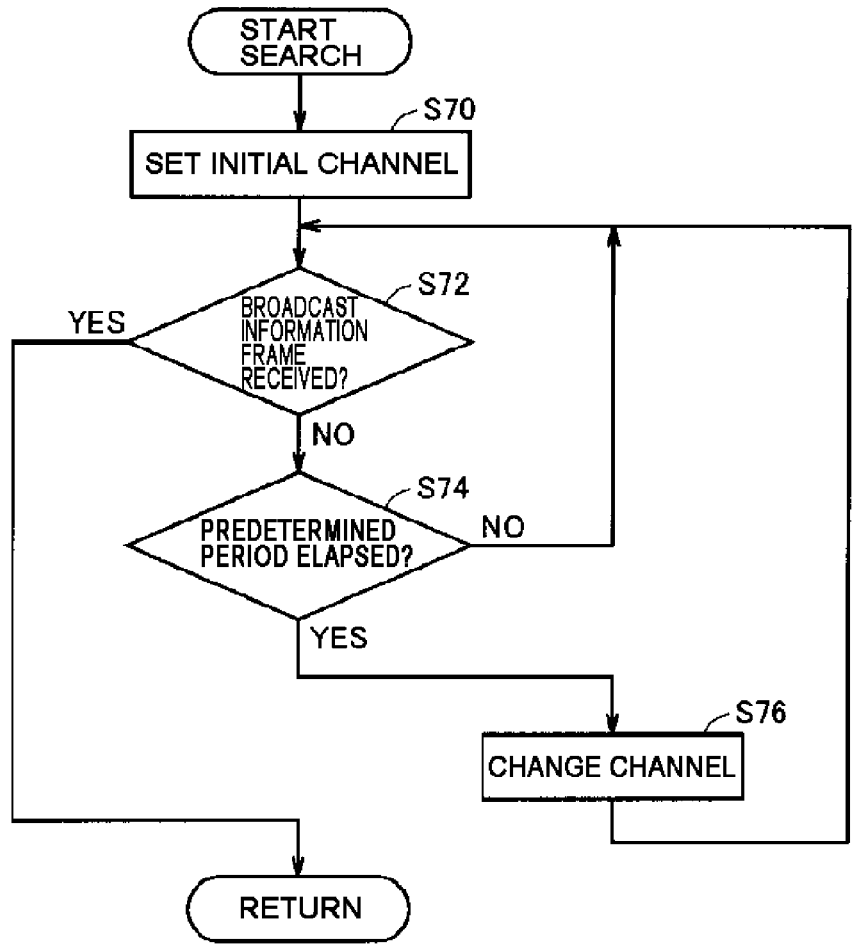
FIG. 15 is a flowchart illustrating a process of starting a search according to the embodiment 1 of the present invention.

The CPU 11 next starts searching for the management node M (step S54). FIG. 15 is a flow chart illustrating a process of starting a search according to the embodiment 1 of the present invention.

The CPU 11 performs the following process by reading a software program stored in the ROM 13.

Referring to FIG. 15, the CPU 11 sets an initial channel in data transmission and reception to the communication unit (step S70).

Next, the CPU 11 determines whether or not a broadcast information frame from the management node M is received via the communication unit 15 (step S72).

If the CPU 11 determines at step S72 that a broadcast information frame from the management node M is received via the communication unit 15 (YES at step S72), the process is terminated (return). In other words, because it is confirmed that data communication with the management node M is possible with the set channel, the process flow proceeds to the next process.

On the other hand, the CPU 11, when determining at step S72 that a broadcast information frame from the management node M cannot be received, next determines whether or not a predetermined period of time has elapsed (step S74).

If the CPU 11 determines at step S74 that a predetermined period of time has not elapsed (No at step S74), the process flow returns to step S72 again and it is determined whether or not a broadcast information frame can be received.

On the other hand, the CPU 11, when determining at step S74 that a predetermined period of time has elapsed (YES at step S74), changes the channel in data transmission and reception (step S76). Then, the process flow returns to step S72 again and the CPU 11 checks whether or not reception of a broadcast information frame is possible with the changed channel. The CPU 11 then changes the channel until reception of a broadcast information frame becomes possible.

Referring to FIG. 14 again, the CPU 11 performs a timing setting process, based on reception of a broadcast information frame (step S56).

Specifically, a wakeup period start time for receiving the next frame is set to the timer 17, according to the number of slots of one superframe period included in the superframe structure information d1, and the length of a period of one slot, the length of the reception period, and the length of the wakeup period included in the timing information d2 of the received broadcast information frame. In addition, timing of reception and transmission period in data communication with the management node M is set.

Figure 16:
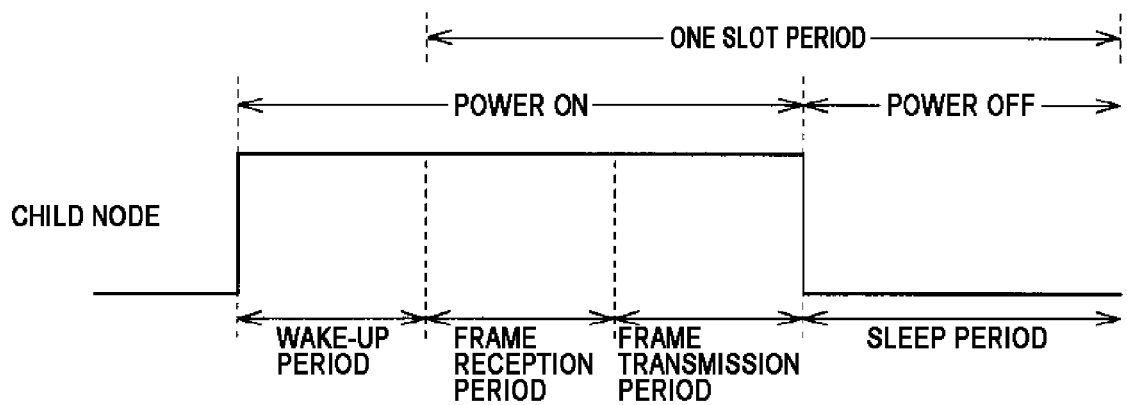
FIG. 16 is an explanatory diagram of setting a reception period and a transmission period in the child node S.

FIG. 16 is an explanatory diagram of setting a reception period and a transmission period in the child node S. Here, referring to FIG. 16, a wakeup period for setting a normal power state which is a receivable state by the time a frame reception period for receiving a frame is started, a frame reception period for receiving a data frame such as a broadcast information frame from the management node M, a frame transmission period for transmitting a response frame, and a sleep period which is the low power consumption state are shown, respectively. The wakeup period, the frame reception period, and the frame transmission period are states in which power is supplied to each unit of the child node S by the power supply management unit 14 (power supply ON), whereas the sleep period is a state in which power supply to each unit is shut off (power supply OFF) except for power supply required to return to the normal power state.

The wakeup period is set according to a parameter included in the timing information d2 described in FIG. 10A for defining the wakeup period.

The frame reception period is set according to the length of a downlink frame reception period included in the timing information d2 described in FIG. 10A.

In addition, the frame transmission period is set according to the length of an uplink frame reception period included in the timing information d2 described in FIG. 10A.

The sleep period is set in the remaining period excluding the frame reception period and the frame transmission period from the length of a period of one slot included in the timing information d2 described in FIG. 10A.

In this example, although a case is described where a frame transmission period is provided as a state in which power is supplied, there are only a wakeup period and a frame reception period when a frame is not transmitted.

Therefore, the child node S, as well as the parent node M does not constantly receive power supply from the power supply management unit 14. Specifically, the period other than the wakeup period, the frame reception period, and the frame transmission period, as the sleep period, does not receive power supply. Therefore, power consumption in the child node S can be suppressed. When a sensor or the like is provided in the child node S, power consumption of the child node S as a whole can be suppressed by supplying power only to a portion requiring power supply whereas shutting off power supply to other units.

Referring to FIG. 14 again, the CPU 11, after performing the timing setting process, determines whether or not it received a broadcast information frame (step S58).

The CPU 11, when determining at step S58 that a broadcast information frame is received (YES at step S58), analyzes the broadcast information frame (step S60).

Specifically, the CPU 11 analyzes the slot assignment information included in the broadcast information frame. The CPU 11 then determines, as the result of analyzing the broadcast information frame, whether or not a slot corresponding to its own ID is assigned in the slot assignment information (step S62).

The CPU 11, when determining at step S62 that a slot corresponding to its own ID is assigned in the slot assignment information (YES at step S62), transitions to a synchronous mode (step S64). The synchronous mode will be described below.

On the other hand, the CPU 11, when determining at step S62 that there is no assignment of a slot corresponding to its own ID in the slot assignment information (NO at step S62), transmits a registration request frame (step S66).

Then, the CPU 11, returning to step S56 again, sets a timing of the next frame to be received based on the broadcast information frame, and repeats the above process.

On the other hand, the CPU 11, when determining at step S58 that there is no reception of a broadcast information frame (NO at step S58), performs error determination (step S67). The result of error determination is assumed to be stored in a memory area such as the RAM 12, for example, according to the instruction of the CPU 11. The result of error determination is used for error processing described below.

The CPU 11 then performs an error processing (step S68). The error processing will be described below.

Figure 17:
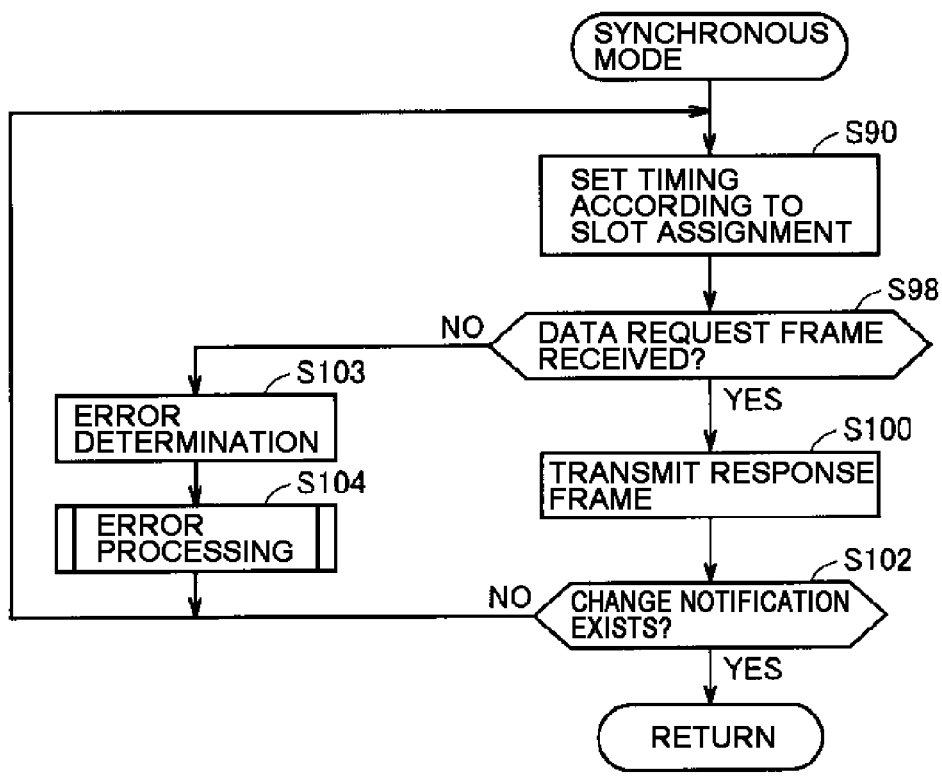
FIG. 17 is a flow chart illustrating a process in a synchronous mode according to the embodiment 1 of the present invention.

Next, a synchronous mode according to the embodiment 1 of the present invention will be described. FIG. 17 is a flow chart illustrating a process in a synchronous mode according to the embodiment 1 of the present invention.

The CPU 11 performs the following process by reading a software program stored in the ROM 13.

Referring to FIG. 17, the CPU 11 sets a timing according to the slot assignment based on the timing information, the superframe structure information, or the slot assignment information included in the broadcast information frame (step S90). Specifically, when the slot 1 is assigned in correspondence with its own ID, for example, the CPU 11 sets a reception timing for receiving a synchronous frame corresponding to the slot assigned to itself (slot 1 in this case) according to the number of slots in one superframe period included in the superframe structure information d1 or the slot number assigned to itself included in the slot assignment information d5, the length of a period of one slot, the length of the reception period, and the length of the wakeup period included in the timing information d2 of the received broadcast information frame. Specifically, a wakeup period start time for receiving a synchronous frame is calculated and a timer is set. It is similar when assignment is performed to other slots.

For example, the wakeup period start time which is the timing for receiving a synchronous frame corresponding to the slot assigned to itself (slot 1 in this case) in the same superframe period which received the broadcast information frame is calculated as "number of slots (assigned slot number)*length of a period of one slot−wakeup time−length of the reception period".

In addition, the wakeup period start time which is the timing for receiving a synchronous frame corresponding to the slot assigned to itself in the next superframe period is calculated as "number of slots (number of slots in one superframe period)*length of the period of one slot−wakeup time−length of the reception period".

The CPU 11 then determines whether or not it received a synchronous frame according to the set timing (step S98).

If the CPU 11 received at step S98 a synchronous frame according to the set timing (YES at step S98), it transmits a response frame (step S100).

Next, the CPU 11 determines whether or not there exists a change notification in the synchronous frame (step S102). Specifically, the determination is performed based on whether or not, as described above, the broadcast information frame update number of the superframe structure information is updated. The CPU 11, if determines that the broadcast information frame update number is updated, determines that there exists a change notification. The CPU 11, if on the other hand, determines that the broadcast information frame update number is not updated, determines that there exists no change notification.

If the CPU 11 determines at step S102 that there exists no change notification in the synchronous frame (NO at step S102), the process flow returns to step S90 again where the CPU 11 transmits a response frame in response to the reception of a synchronous frame according to the timing setting in accordance with the assignment of the slot.

Therefore, data communication is performed between the management node M and the child node S using the assigned slot in the synchronous mode until a change notification is made.

If, on the other hand, the CPU 11 determines at step S102 that there exists a change notification in the synchronous frame (YES at step S102), the process in the synchronous mode is terminated (return). In other words, the synchronous mode is terminated and the process flow returns to step S56 of FIG. 14 again. Therefore, the wakeup period start time which is the timing for receiving a broadcast information frame in the next superframe period is calculated again and the timing is set to the timer, based on the superframe structure information d1, the timing information d2, and the slot assignment information d5 of the previously received broadcast information frame.

For example, the wakeup period start time which is the timing for receiving a broadcast information frame in the next superframe period is calculated as "number of slots (number of slots including itself remaining in one superframe period)*length of the period of one slot−wakeup time−length of the reception period".

Subsequently at step S58, it is determined whether or not a broadcast information frame is received again in the reception period after start of the wakeup period.

If a broadcast information frame is received (YES at step S58), the CPU 11 analyzes the broadcast information frame and performs data communication in the synchronous mode described above in synchronization with the slot to which it is assigned, even when one superframe period is changed.

In this example, each of the child nodes S calculates a timing for simultaneously receiving a broadcast information frame in the next superframe period according to the change notification and receives the broadcast information frame. Each of the child nodes then performs, based on the broadcast information frame, data communication in the synchronous mode described above in synchronization with the slot to which it is assigned, respectively. Therefore, the management node M can change the reception timing for each child node in a simple manner without having to define the reception timing for each child node.

On the other hand, the CPU 11, when determining at step S98 that no synchronous frame is received according to the set reception timing (NO at step S98), performs error determination (step S103). The result of error determination is assumed to be stored in a memory area such as the RAM 12, for example, according to the instruction of the CPU 11. The result of error determination is used for error processing described below.

Subsequently, an error processing is performed (step S104). The error processing will be described below. The process flow returns to step S98. Therefore, it is also possible to reduce power consumption by terminating transmission of response frames in the error processing.

As the error processing, there are step S68 in FIG. 14 and step S104 of FIG. 17, which are similar to each other.

Figure 18:
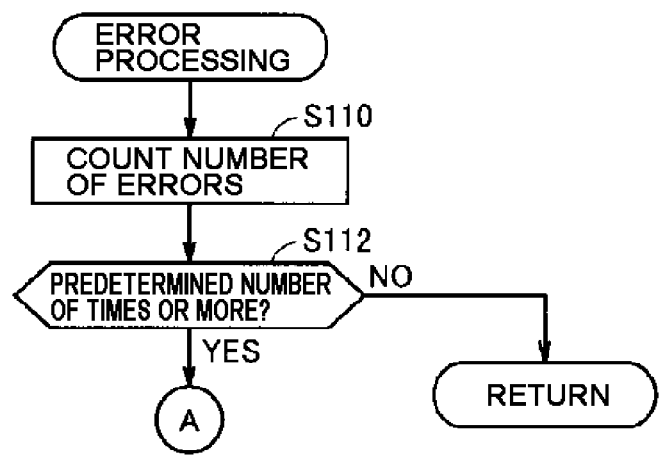
FIG. 18 is a flow chart illustrating an error processing according to the embodiment 1 of the present invention.

FIG. 18 is a flow chart illustrating error processing according to the embodiment 1 of the present invention. The CPU 11 performs the following process by reading a software program stored in the ROM 13.

Referring to FIG. 18, the CPU 11 first counts the number of errors occurred (step S110). Specifically, the number of error determination results stored in the RAM 12 or the like is counted.

Next, the CPU 11 determines whether or not the counted number of errors is equal to or more than a predetermined number (step S112). The predetermined number is set to be three, for example. In other words, the CPU 11 proceeds to "A" if it determines that the counted number of errors is three or more (YES at step S112).

On the other hand, the CPU 11, when determining that the counted number of errors is not the predetermined number of times or more (NO at step S112), terminates the error processing (return). In other words, because the counted number of errors is not yet the predetermined number of times or more in this case, the CPU 11 repeats a similar process again and checks whether or not error determination is made.

If it is determined at step S112 that the counted number of errors is three or more, the search of step S54 of FIG. 14 which is "A" is started. Therefore, the channel setting is performed again until the broadcast information frame is received. As a cause of error determination, a case is assumed where a channel of data communication in the management node M is changed due to communication failure or the like, which prevents broadcast information frames or the like from being received.

Because data communication cannot be performed unless the same channel is set if a channel is changed, it becomes possible to reset an appropriate channel to perform data communication by the process.

Figure 19:
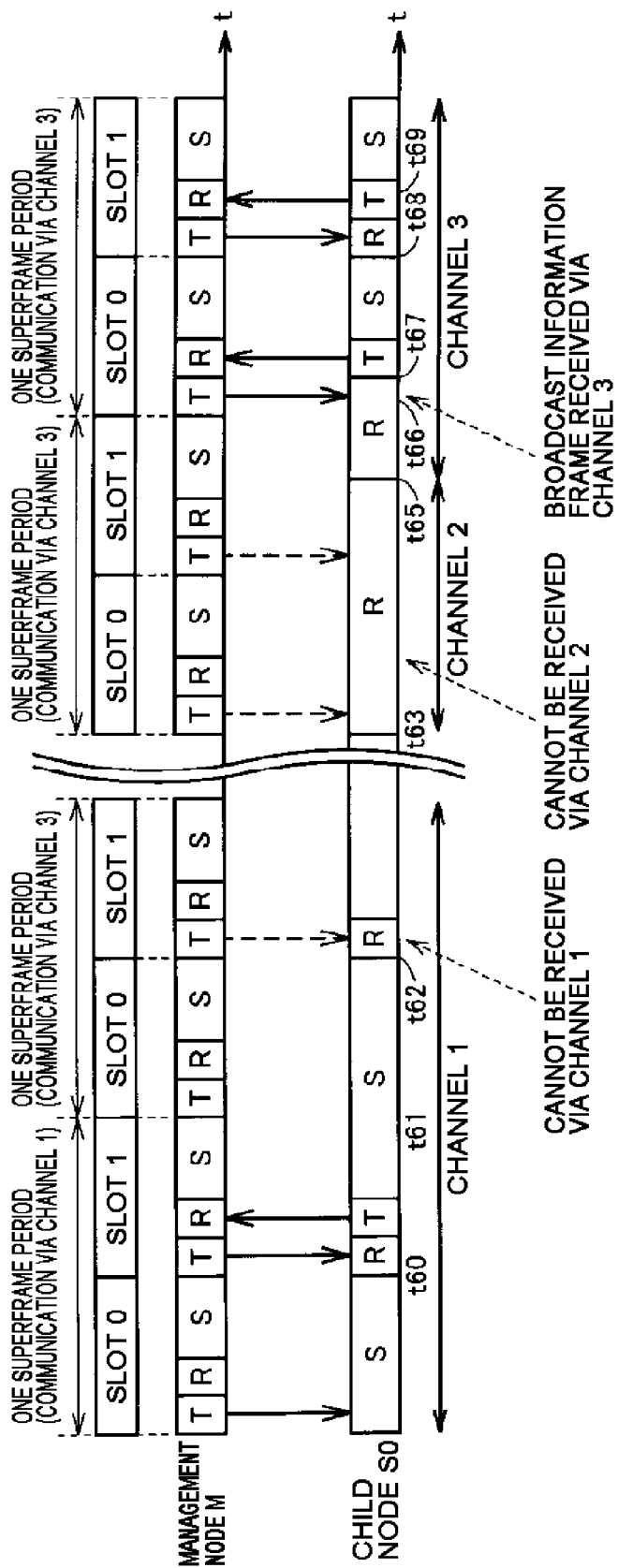
FIG. 19 is an explanatory diagram of changing a channel of the child node S0 when the channel of data communication in the management node M is changed.

FIG. 19 is an explanatory diagram of changing a channel of the child node S0 when a channel of data communication in the management node M is changed. Although illustration is omitted in this and subsequent drawings, the wakeup period is included between the sleep period and the transmission period (or the reception period), and time setting of the timer to return from the sleep period is determined in consideration of the wakeup period, similarly to the description in FIGS. 6 to 9.

Referring to FIG. 19, a case is shown where the child node S0 performs data communication with the management node M in the channel 1 using the slot 1 started from time t60.

A case is shown where the management node M is changed so as to use a channel 3 at time t61 as an appropriate channel according to the measurement of electric field intensity.

A case is shown where the child node S0 cannot receive data from the management node M at time t62 because the management node M is changed so as to perform data communication using the channel 3. Due to repetition of the state, the search of management node described in FIG. 15 is started again, based on the error processing described in FIG. 18.

In this example, a case is shown where the communication unit 15 of the child node S attempts to receive a broadcast information frame at time t63 by changing a channel to the channel 2. A case is shown where data from the management node M cannot be received because the management node M has changed data communication so as to use the channel 3.

Also a case is shown where the communication unit 15 of the child node S further attempts to receive a broadcast information frame in the channel 3 at time t65.

It is assumed that, at time t66, the broadcast information frame is received from the management node M. In other words, it is assumed that the management node M is detected at time t66.

Accordingly, the child node S0 analyzes the broadcast information frame and determines whether or not slot assignment information exists. If it is determined that a slot is assigned (slot 1 in this example), a timing according to the assignment of the slot is set, based on the timing information and the slot assignment information included in the broadcast information frame, as described above. Specifically, if slot 1 is assigned, for example, in correspondence with its own ID, a reception timing for receiving a synchronous frame corresponding to the slot assigned to itself (slot 1 in this case) is set, according to the slot number assigned to itself included in the slot assignment information d5 and the length of a period of one slot, the length of the reception period, and the length of the wakeup period included in the timing information d2 of the received broadcast information frame.

At time t68, a synchronous frame using slot 1 is received from the management node M. Subsequently, at time t69, a response frame is transmitted to the management node M, and data communication using the slot 1 by the channel 3 is resumed from that time on.

Therefore, even if the channel of data communication in the management node M is changed due to communication failure or the like and data communication with the management node M is temporarily shut down, it becomes possible to reconfigure the network by changing the channel. In other words, data communication can be performed again.

As described above, it becomes possible to automatically reconfigure and reestablish the network by a method according to the embodiment 1 of the present invention.

In addition, if the child node S moves outside the region 10, the management node M can manage it such that it is excluded from the network. If, on the other hand, the child node S newly moves in the region 10, it is possible to manage it by newly registering it in the network, and the management node side can easily manage, by attaching the child node S to a part on a production line or the like, the position and state of the part in the region 10 according to the response frame from the child node S.

Embodiment 2

In the embodiment 1, a method of managing the child nodes S (forming a network) within a range in which a broadcast information frame is transmitted only from the management node M to enable broadcast communication from the management node M has been described.

In the embodiment 2, a method which allows management of a child node located in an out-of-service area in which broadcast communication from the management node M is not possible.

Figure 20:
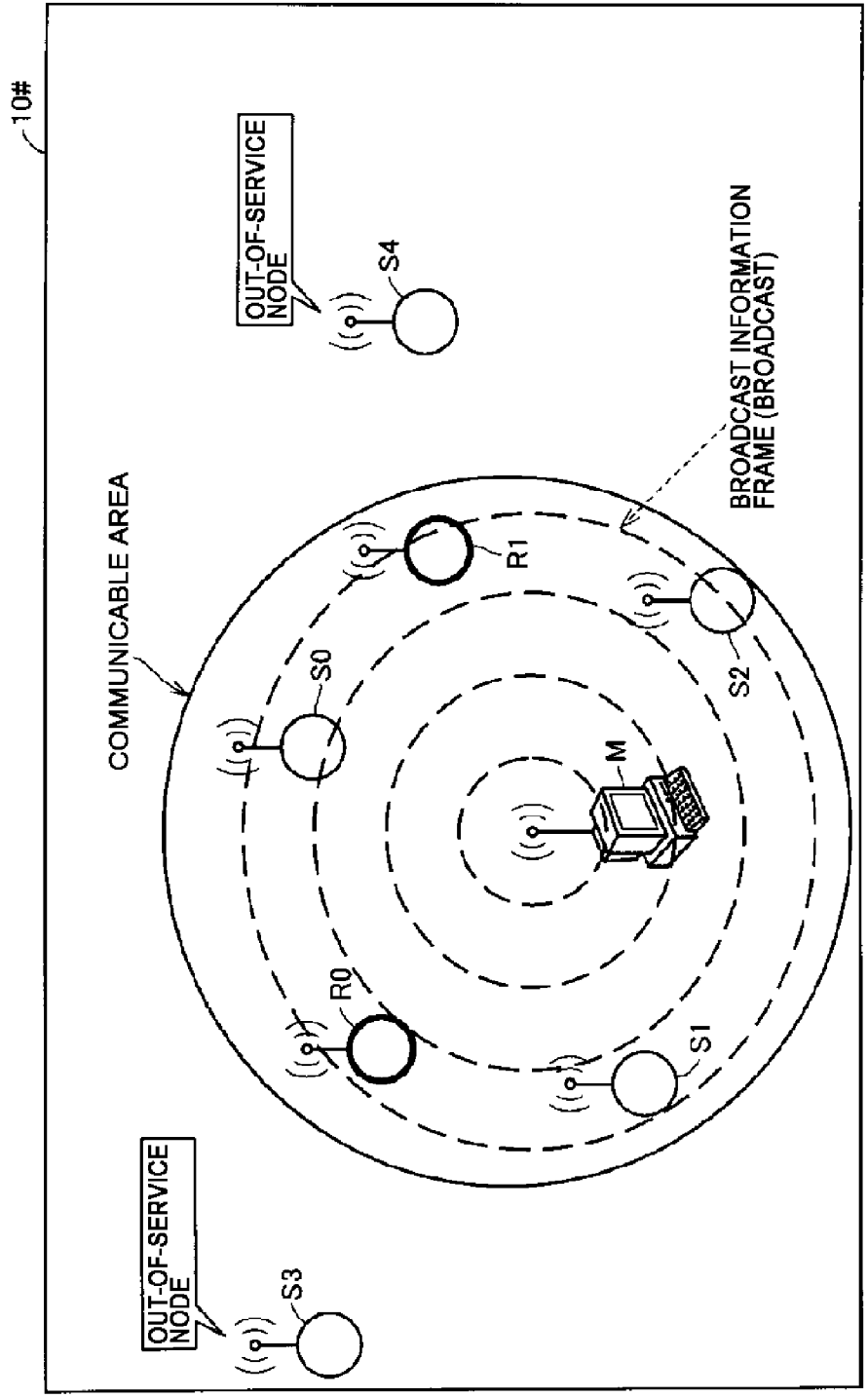
FIG. 20 is an explanatory diagram of an outline of nodes forming a network according to an embodiment 2 of the present invention.

FIG. 20 is an explanatory diagram of an outline of nodes forming a network according to the embodiment 2 of the present invention.

Referring to FIG. 20, in this example, a case is shown where the management node M, a plurality of child nodes S0 to S4 and the relay nodes R0 and R1 are provided in a certain region #10. For example, although a certain indoor room is assumed as the region #10, a region in a range to which broadcast communication from the management node M is unreachable is also assumed, and a region in a range to which the broadcast communication including the relay nodes R0 and R1 can be reached is assumed.

Because the management node M and each child node S according to the embodiment 2 of the present invention have similar configurations to those of the management node M and the child node S described in the embodiment 1, description thereof is omitted.

In the embodiment 2 of the present invention, a case where the relay nodes R0 and R1 (collectively referred to as relay node R) are newly provided will be described. The relay nodes R0 and R1 have a function (also referred to as a relay function) of relaying data communication between the management node M and a child node located in a range to which broadcast communication is unreachable from the management node M (also referred to as an out-of-service node). The relay node R starts the relay function if a predetermined condition is satisfied, whereas it simply operates as a child node if the relay function is not started. It is assumed that the child nodes S and relay nodes R have unique ID (Identification) information identifying each of them.

Figure 21:
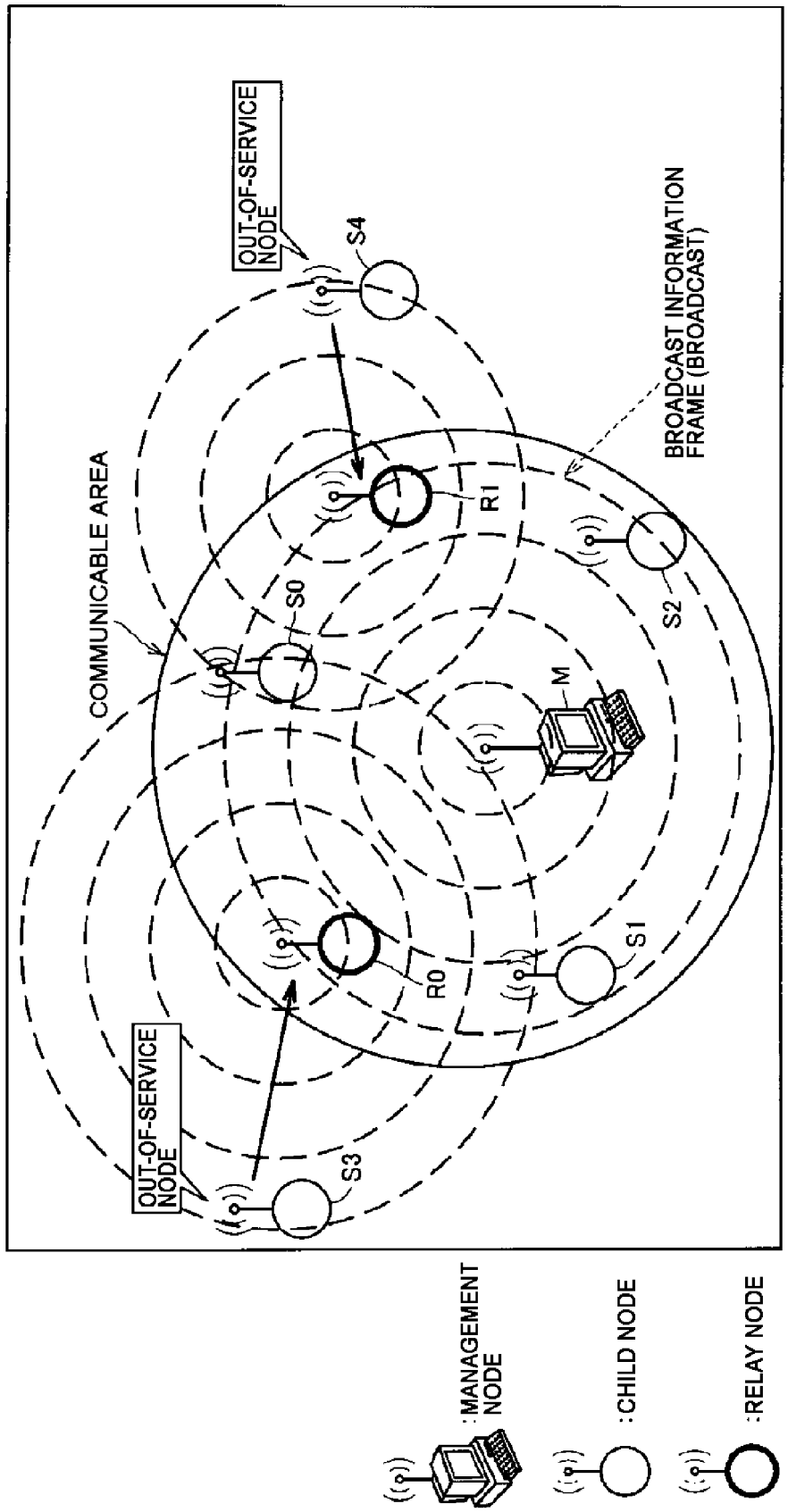
FIG. 21 is an explanatory diagram of a broadcast information frame transmitted from the management node M and the relay node R according to the embodiment 2 of the present invention.

FIG. 21 is an explanatory diagram of a broadcast information frame each transmitted from the management node M and the relay nodes R according to the embodiment 2 of the present invention.

Referring to FIG. 21, a broadcast information frame is transmitted, as broadcast communication, from the management node M and the relay node R to each child node S.

As shown in FIG. 21, the relay nodes R also transmit broadcast information frames, and thereby the region in which the broadcast information frames are transmitted is expanded, and out-of-service nodes also can receive broadcast information frames.

Each child node S receives a broadcast information frame transmitted, as broadcast communication, from the management node M or the relay node R and transmits, as a response frame, a registration request frame to participate in the network connection.

Figure 4:
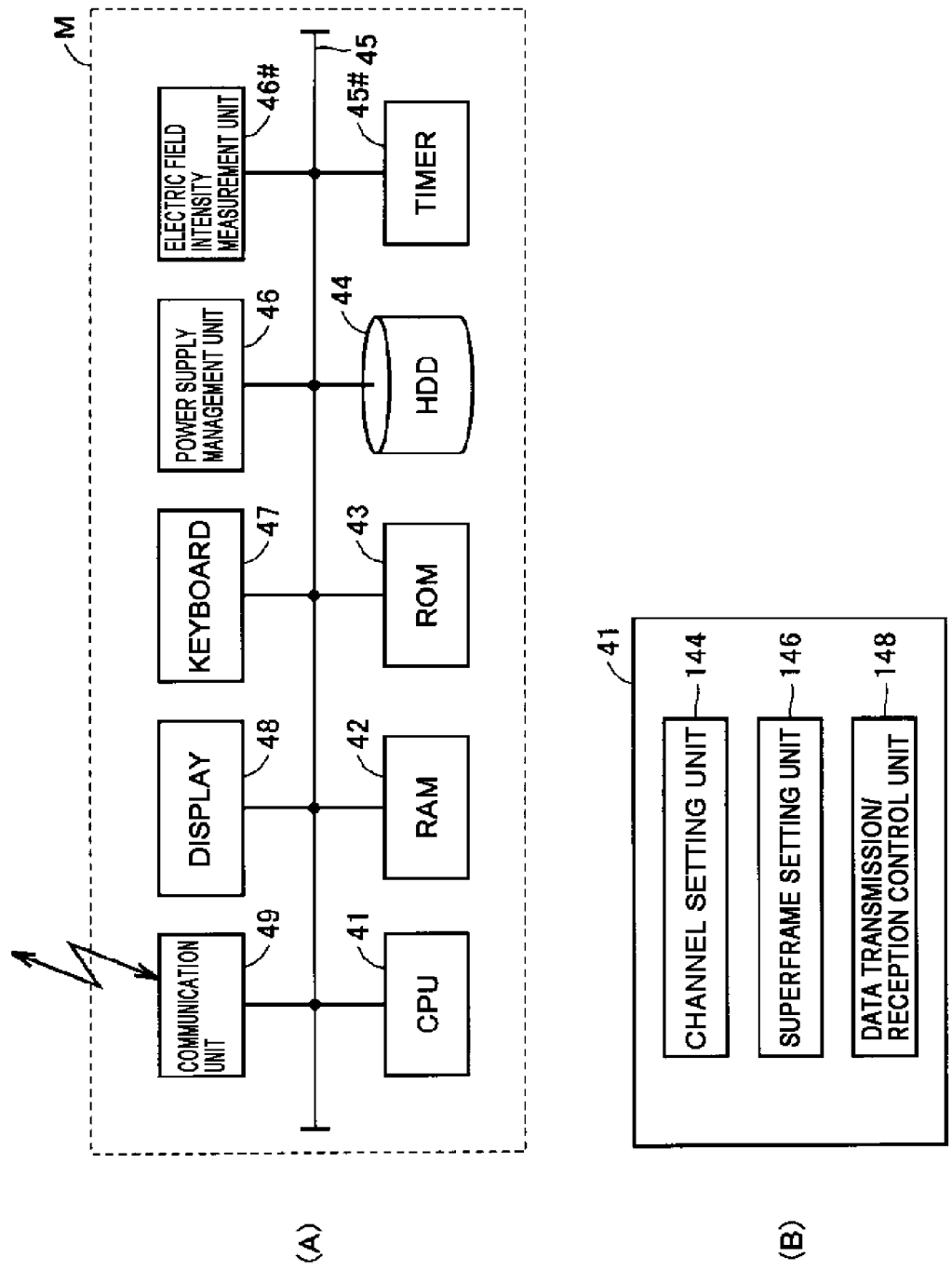
FIGS. 4A and 4B illustrate a configuration of a management node M according to the embodiment 1 of the present invention.

Because the hardware configuration of the management node M is similar to that described in FIG. 4 of the embodiment 1, detailed description thereof is not repeated. In addition, because the hardware configuration of the child node S is similar to that described in FIG. 5 of the embodiment 1, detailed description thereof is not repeated.

Figure 22A:
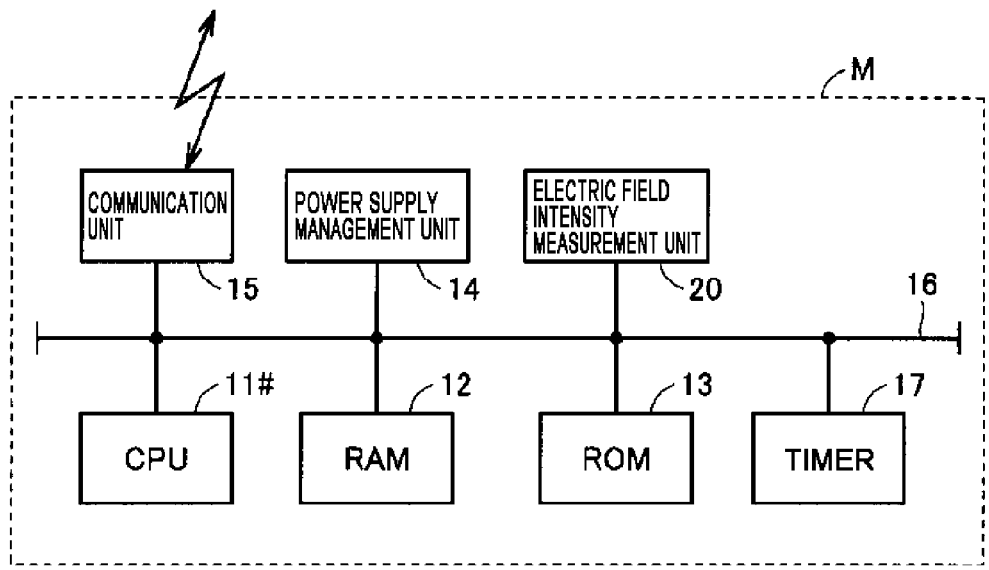
FIGS. 22A and 22B illustrate a configuration of the relay node R according to the embodiment 2 of the present invention.
Figure 22B:
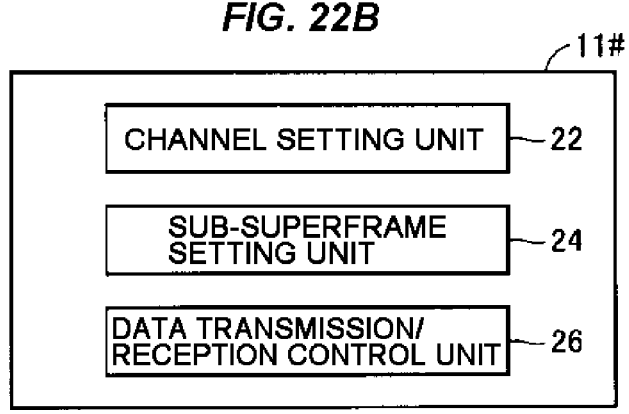

FIGS. 22A and 22B illustrate a configuration of the relay node R according to the embodiment 2 of the present invention. Referring to FIG. 22A, the relay node R according to the embodiment 2 of the present invention differs from the child node S described in FIG. 5 in that the CPU 11 is replaced by a CPU 11# and an electric field intensity measurement unit 20 is further provided. Because other parts are similar, detailed description thereof will not be repeated.

The CPU 11# of the relay node R controls the entire relay node R by reading a software program stored in the ROM 13. The CPU 11# performs, as a child node, data communication with the management node M via the communication unit 15, and becomes a management node itself to perform a relay process of data communication with the child node S via the communication unit 49.

The electric field intensity measurement unit 20 measures the electric field intensity of external environment when performing data communication. Referring to FIG. 22B, functional block diagram is shown here when the unit 20 functions as a management node of the CPU 11#.

Specifically, the CPU 11# includes a channel setting unit 22, a sub-superframe setting unit 24, and a data transmission/reception control unit 26.

The channel setting unit 22 sets the channel (frequency band) most suitable for data communication according to the electric field intensity measured by the electric field intensity measurement unit 20.

The sub-superframe setting unit 24 defines the processing of data communication with the child node (out-of-service node) S in one cycle via the communication unit 15. In this example, each process is also referred to as a slot.

The data transmission/reception control unit 26 performs data communication with the child node S via the communication unit 15 according to the sub-superframe set by the sub-superframe setting unit 24.

Figure 23:
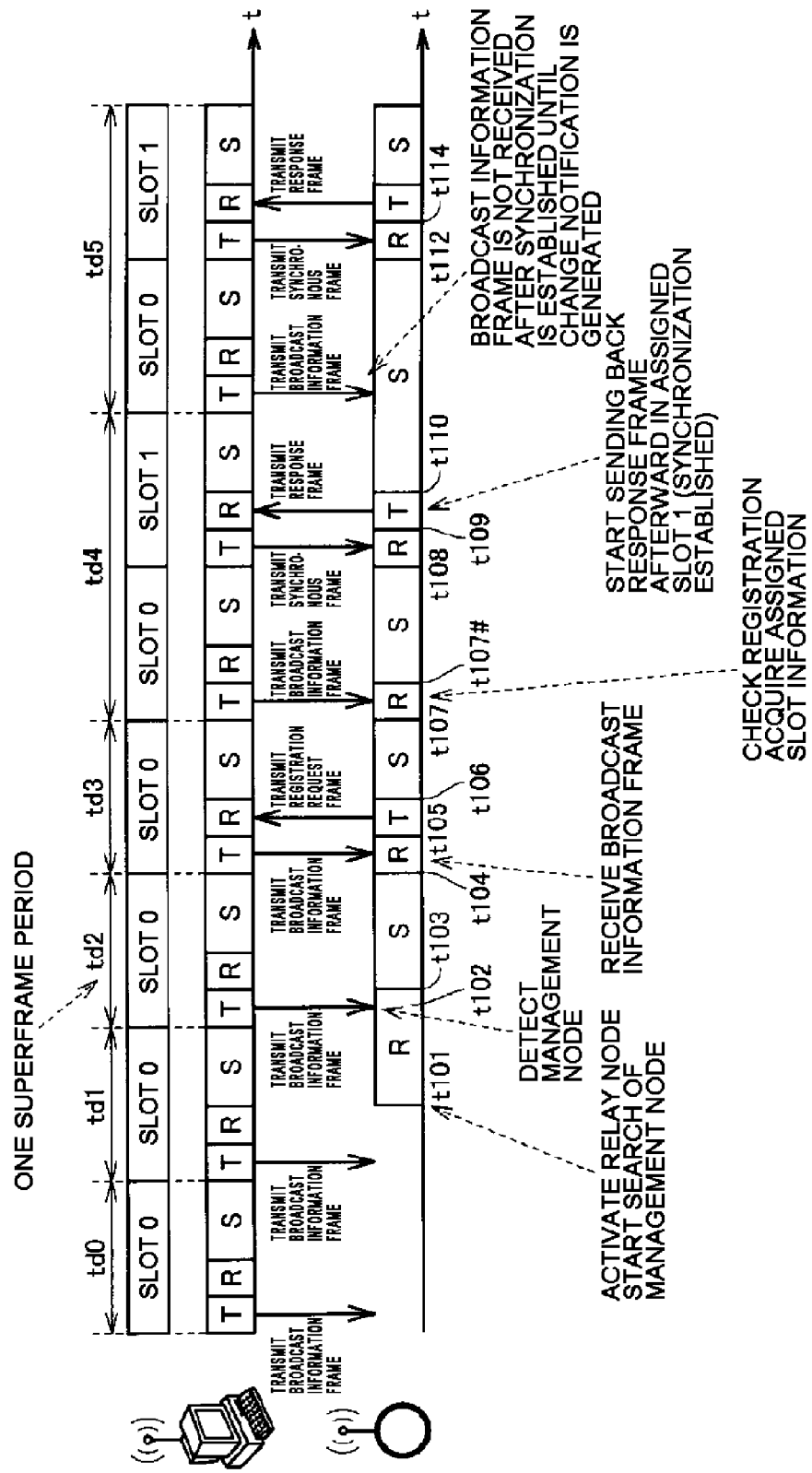
FIG. 23 is an explanatory diagram of a process flow of registering a relay node R0 in a network according to the embodiment 2 of the present invention.

FIG. 23 is an explanatory diagram of a process flow of registering a relay node R0 in a network according to the embodiment 2 of the present invention. The relay node R works similarly to the child node S when the relay function is not started, as described above. Although illustration is omitted as described above, it is assumed that the wakeup period is included between the sleep period and the transmission period (or the reception period). Time setting of the timer to return from the sleep period is determined in consideration of the wakeup period.

Referring to FIG. 23, a broadcast information frame is transmitted from the management node M using the slot 0 in one superframe period. In this case, because the relay node R is unregistered in the management node M, the number of slots in one superframe period of the superframe structure information is one, and ID of the relay node R is not yet stored in the slot assignment information.

In this example, a case is shown where a broadcast information frame is transmitted from the management node M in the slot 0 of superframe periods td0 to td5.

Here, the communication unit 15 of the relay node R0 which is unregistered in the management node M is activated at time t101, for example, and a reception period for searching the management node M is started.

The relay node R0 receives, at time t102, the broadcast information frame transmitted from the management node M in the slot 0 of the superframe period td1. In other words, the relay node R0 determines at time t102 that the management node M is detected.

Based on the superframe structure information and the timing information included in the broadcast information frame received from the management node M, the relay node R0 calculates a timing for receiving a broadcast information frame in the next the superframe period td3 and sets the timer 17, as described above.

In addition, the relay node R0 starts the sleep period (S) from time t103 and transitions to the low power consumption state.

After the sleep period (S) counted using the timer 17 has expired, the relay node R0 returns to the normal power state (the state that data transmission and reception of a frame is possible) from the low power consumption state as described above, and starts, from time t104, the reception period (R) for starting reception of a broadcast information frame transmitted from the management node M.

The relay node R0 receives a broadcast information frame transmitted from the management node M in the reception period (R) started from time t104, and determines whether or not it is registered in the management node M according to whether or not its own ID is stored in the slot assignment information included in the received broadcast information frame.

The relay node R0, when determining that it is unregistered in the management node M, calculates a timing for receiving a broadcast information frame in the next superframe period td4 and sets the timer 17, based on the superframe structure information and the timing information included in the broadcast information frame received from the management node M.

The relay node R0 then starts transmitting a registration request frame storing its own ID to the management node M at time t105. Subsequently, after completing transmission of the registration request frame, the relay node R0 starts the sleep period (S) from time t106 and transitions to the low power consumption state.

If the ID stored in the registration request frame received from the relay node R0 has not been stored in the slot assignment information, the management node M adds the number of slots in the superframe structure information of the broadcast information frame. Specifically, a process of adding a slot for use in data communication with the relay node R0 to one superframe period is performed. In addition, a process of storing, in the slot assignment information, the ID of the relay node R0 which has been stored in the registration request frame is performed.

After the sleep period (S) counted using the timer 17 has expired, the relay node R0 returns to the normal power state from the low power consumption state as described above, and starts, from time t107, the reception period (R) for starting reception of a broadcast information frame transmitted from the management node M.

The relay node R0 determines whether or not it is registered in the network based on whether or not its own ID is stored in the slot assignment information included in the broadcast information frame received in the reception period (R) started from time t107.

If the relay node R0 determines that it is registered in the network, it does not transmit a registration request frame.

Additionally, the relay node R0, when determining that it is registered in the network, calculates a timing for receiving a synchronous frame corresponding to the slot assigned to itself (slot 1 in this case) in the same superframe period and sets the timer 17, based on the timing information and the slot assignment information included in the broadcast information frame received from the management node M, in order to perform data communication using a slot assigned to itself from the management node M.

The relay node R0 then starts the sleep period (S) from time t107# and transitions to the low power consumption state.

After the sleep period (S) counted using the timer 17 has expired, the relay node R0 returns to the normal power state from the low power consumption state as described above, and starts, from time t108, the reception period (R) for starting reception of a synchronous frame transmitted using a slot assigned to itself (slot 1 in this example) by the management node M.

The relay node R0 receives the synchronous frame transmitted from the management node M in the reception period (R) started from time t108, and determines whether or not the slot is assigned to itself, based on whether or not its own ID is stored in the received synchronous frame. It is assumed in this example that its own ID is stored.

If the relay node R0 determines that its own ID is stored in the received synchronous frame, it calculates a timing for receiving a synchronous frame transmitted from the management node M using a slot assigned to itself in the next superframe period and sets the timer 17, based on the superframe structure information and the timing information included in the broadcast information frame already received from the management node M.

The relay node R0 then starts transmitting a response frame storing its own ID to the management node M at time t109. Subsequently, after completing transmission of the response frame, the relay node R0 starts the sleep period (S) from time t110 and transitions to the low power consumption state. In other words, data communication with the management node M is performed using only a slot assigned to itself (slot 1 in this example) from that time on, without having to receive a broadcast information frame until a change of the superframe structure is notified.

If the ID of the relay node R0 stored in a response frame received from the relay node R0 matches the assigned ID of the relay node R0 stored in the synchronous frame which has been already transmitted in the same slot, the management node M determines that the relay node R0 is normally operating in the network.

The management node M, similarly in the following, performs similar determination each time it receives a response frame.

After the sleep period (S) counted using the timer 17 has expired, the relay node R0 returns to the normal power state from the low power consumption state as described above, and starts, from time t112, the reception period (R) for starting reception of a synchronous frame transmitted using a slot assigned to itself (slot 1 in this example) by the management node M.

The relay node R0 receives the synchronous frame transmitted from the management node M in the reception period (R) started from time t112, and determines whether or not the slot is assigned to itself, based on whether or not its own ID is stored in the received synchronous frame. It is assumed in this example that its own ID is stored.

If the relay node R0 determines that its own ID is stored in the received synchronous frame, it calculates a timing for receiving a synchronous frame transmitted from the management node M using a slot assigned to itself in the next superframe period and sets the timer 17, based on the superframe structure information and the timing information included in the broadcast information frame already received from the management node M.

The relay node R0 then starts transmitting a response frame storing its own ID to the management node M at time t114. Subsequently, after completing transmission of the response frame, the relay node R0 starts the sleep period (S) and transitions to the low power consumption state. From that time on, a similar operation is repeatedly performed unless the superframe structure is changed.

Therefore, the relay node R0 also performs synchronized data communication with the management node M registered in the network, similarly to the child node S.

Figure 24:
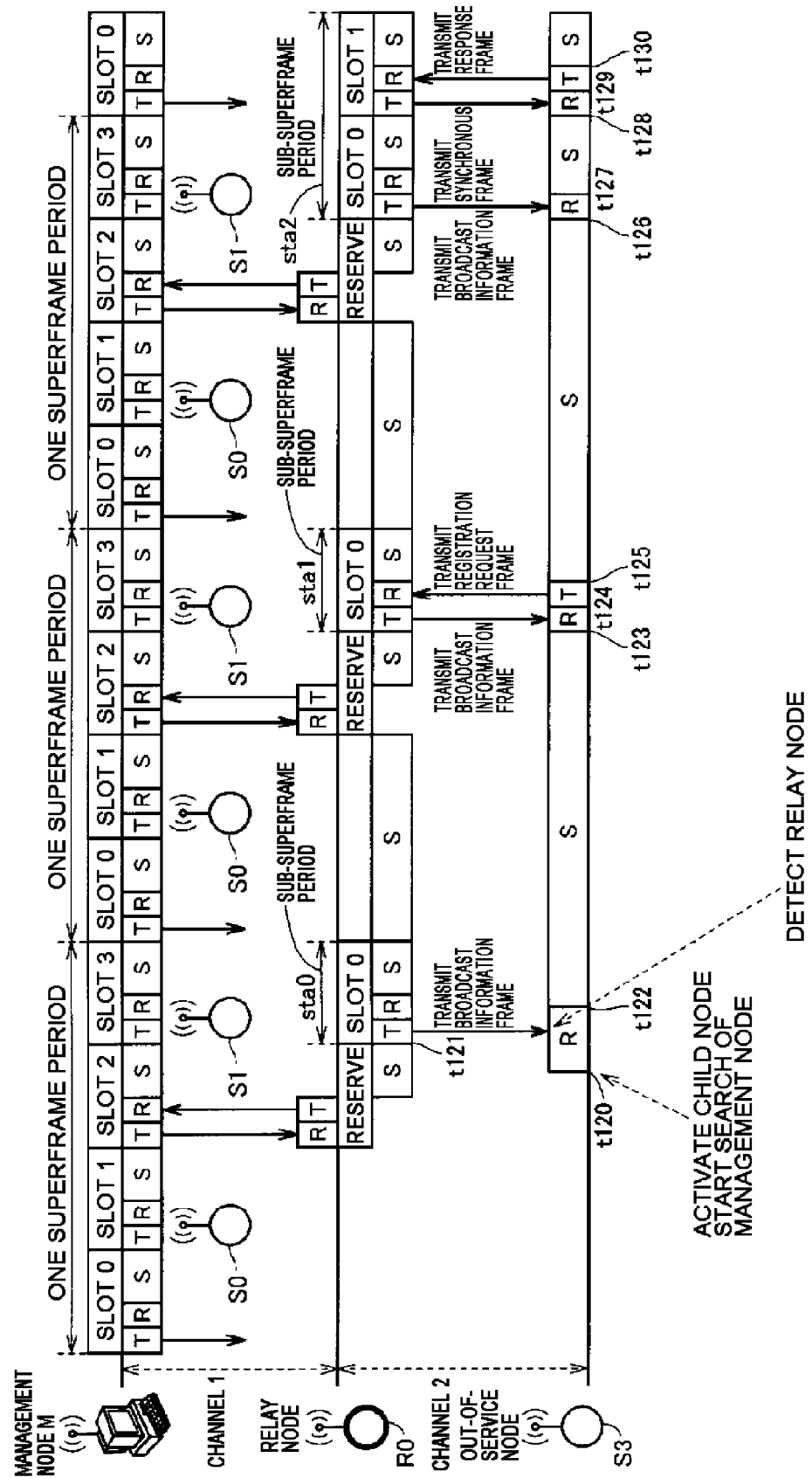
FIG. 24 is an explanatory diagram of a process flow of registering an out-of-service node in a network using the relay node R0 according to the embodiment 2 of the present invention.

FIG. 24 is an explanatory diagram of a process flow of registering an out-of-service node in the network using the relay node R0 according to the embodiment 2 of the present invention. The relay node R operates as the child node S in relation with the management node M. In addition, the relay node R0 operates as a management node for an out-of-service node S3.

Referring to FIG. 24, it is first assumed that the management node M has set slots 0 to 3 as one superframe period.

It is assumed that the slot 1 is assigned to the child node S0. In addition, it is assumed that the slot 2 is assigned to the relay node R0. Additionally, it is assumed that slot 3 is assigned to the child node S1.

It is also assumed that the child nodes S0 and S1, and the relay node R0 perform data communication using the channel 1 which has established synchronization with the management node M using the slots respectively assigned thereto. On the other hand, the relay node R0 performs data communication using the channel 2 as a management node which is different from the channel 1.

It is assumed that the relay node R has started the relay function from time t121. Specifically, the relay node R transmits, as a management node, the broadcast information frame corresponding to the slot 0 constituting one sub-superframe period. If the relay node R has started the relay function, it is necessary that one superframe period is in a fixed state. It is assumed in this example that a state of four slots constituting one superframe period continues, for instance. If, on the other hand, the number of slots in one superframe period is changed, it is assumed that the relay function is interrupted. In addition, although the broadcast information frame according to the sub-superframe period transmitted from the relay node R has a basically similar structure to that of the broadcast information frame according to the superframe period described in FIG. 10A which is transmitted from the management node M, the parent node ID information d4 is different. In this example, because the broadcast information frame is transmitted from the relay node R, the parent node ID information is transmitted with the ID information of the relay node R being stored therein. In addition, the number of slots in one sub-superframe period of the superframe structure information stored in the broadcast information frame transmitted from the relay node R is fixed to four, which is the same number of slots in one superframe period, regardless of the number of slots in one sub-superframe period. Additionally, in the relay node R0, the sub-superframe period can be expanded to include three slots at most. This is because one of the slots in one superframe period must be used for data communication with the management node M. The slot used for data communication with the management node M is denoted as "reserve" in this example.

Next, the communication unit 15 of the out-of-service node S3 is activated from time t120, for example, and a reception period for searching the management node M is started.

After starting the reception period (R) from time t120, the out-of-service node S3 continues the reception period (R) until a broadcast information frame is received from the management node.

The out-of-service node S3 then receives the broadcast information frame transmitted at time t121 from the management node (the relay node R0) in the slot 0 of the sub-superframe period sta0. In other words, the out-of-service node S3 determines that the management node (the relay node R0) is detected at time t121.

The out-of-service node S3 calculates a timing for receiving the broadcast information frame in the next sub-superframe period sta1, based on the superframe structure information and the timing information included in the broadcast information frame received from the management node (the relay node R0).

Specifically, for example, the out-of-service node S3 calculates the wakeup period start time for receiving the broadcast information frame as "number of slots (number of slots in one superframe period (fixed value of four))*length of the period of one slot−wakeup time−length of the reception period", based on the number of slots in one superframe period which is the superframe structure information, and the length of a period of one slot, the length of the reception period, and the wakeup time of the timing information. The out-of-service node S3 then counts up until the time calculated using the timer 17 is reached. In addition, the out-of-service node S3 starts the sleep period (S) from time t122 and transitions to the low power consumption state.

The out-of-service node S3 terminates the sleep period (S) after the time calculated using the timer 17 is reached, and resumes the normal power state from the low power consumption state. Subsequently, at time t123, the out-of-service node S3 starts the reception period (R) for starting reception of a broadcast information frame transmitted from the management node (the relay node R0).

The out-of-service node S3 receives a broadcast information frame transmitted from the management node M in the reception period (R) started from time t123 and determines whether or not it is registered in the management node M according to whether or not its own ID is stored in the slot assignment information included in the received broadcast information frame.

If the out-of-service node S3 determines that it is unregistered in the management node M, it calculates a timing for receiving the broadcast information frame in the next the sub-superframe period sta2, based on the superframe structure information and the timing information included in the broadcast information frame received from the management node (the relay node R0).

Specifically, for example, the out-of-service node S3 calculates the wakeup period start time for receiving the broadcast information frame as "number of slots (number of slots in one superframe period (fixed value of four))*length of the period of one slot−wakeup time−length of the reception period", based on the number of slots in one superframe period which is the superframe structure information, and the length of a period of one slot, the length of the reception period, and the wakeup time of the timing information. The out-of-service node S3 then counts up until the time calculated using the timer 17 is reached.

The out-of-service node S3 then starts transmitting a registration request frame storing its own ID to the management node (the relay node R0) at time t124. Subsequently, after completing transmission of the registration request frame, the out-of-service node S3 starts the sleep period (S) from time t125 and transitions to the low power consumption state.

If the ID stored in the registration request frame received from the child node S3 has not been stored in the slot assignment information, the management node (the relay node R0) performs a process of storing, in the slot assignment information, the ID of the child node S3 which has been stored in the registration request frame.

The out-of-service node S3 then terminates the sleep period (S) after the time calculated using the timer 17 is reached, and resumes the normal power state from the low power consumption state. Subsequently, at time t126, the out-of-service node S3 starts the reception period (R) for starting reception of a broadcast information frame transmitted from the management node (the relay node R0).

The out-of-service node S3 receives a broadcast information frame transmitted from the management node M in the reception period (R) started from time t126 and determines whether or not it is registered in the management node M according to whether or not its own ID is stored in the slot assignment information included in the received broadcast information frame.

If the out-of-service node S0 determines that it is registered in the network, it calculates a timing for receiving a synchronous frame corresponding to the slot assigned to itself (slot 1 in this case) in the same sub-superframe period, based on the timing information and the slot assignment information included in the broadcast information frame received from the management node (the relay node R0), in order to perform data communication using a slot assigned to itself from the management node (the relay node R0).

Specifically, the wakeup period start time for receiving the synchronous frame is calculated as "number of slots (assigned slot number)*length of a period of a slot−wakeup time−length of the reception period", based on the slot number assigned to itself (slot 1 in this example) included in the slot assignment information, and the length of a period of one slot, the length of the reception period, and the wakeup time included in the timing information. The out-of-service node S3 then counts up until the time calculated using the timer 17 is reached.

If the out-of-service node S3 determines that it is registered in the network, it does not transmit a registration request frame.

The out-of-service node S3 then starts the sleep period (S) from time t127 and transitions to the low power consumption state.

The out-of-service node S3 terminates the sleep period (S) after the time calculated using the timer 17 is reached, and resumes the normal power state from the low power consumption state. The out-of-service node S3 then starts, at time t128 which is a period of the slot 1 of a superframe of the sub-superframe period sta2, the reception period (R) for starting reception of a synchronous frame transmitted from the management node (the relay node R0) using a slot assigned to itself (slot 1 in this example).

The out-of-service node S3 receives the synchronous frame transmitted from the management node (the relay node R0) in the reception period (R) started from time t128 and determines whether or not the slot is assigned to itself, based on whether or not its own ID is stored in the received synchronous frame. It is assumed in this example that its own ID is stored.

If the out-of-service node S3 determines that its own ID is stored in the received synchronous frame, it calculates a timing for receiving a synchronous frame transmitted from the management node M using a slot assigned to itself in the next sub-superframe period, based on the superframe structure information and the timing information included in the broadcast information frame already received from the management node (the relay node R0). The out-of-service node S3 then counts up until the time calculated using the timer 17 is reached.

It is assumed in the following that each time the child node S receives a synchronous frame in a slot assigned to itself, it similarly calculates a timing of performing data communication using a slot assigned to itself from the management node M.

In addition, the out-of-service node S3 starts transmitting a response frame storing its own ID to the management node M at time t129. Subsequently, after completing transmission of the response frame, the out-of-service node S3 starts the sleep period (S) from time t130 and transitions to the low power consumption state. In other words, data communication with the management node (the relay node R0) is performed using only a slot assigned to itself (slot 1 in this example) from that time on, without having to receive a broadcast information frame until a change of the superframe structure is notified.

According to the process, an out-of-service node which is not located in a range where a broadcast information frame of the management node M is receivable can also be registered in the network using the relay node R.

Figure 25:
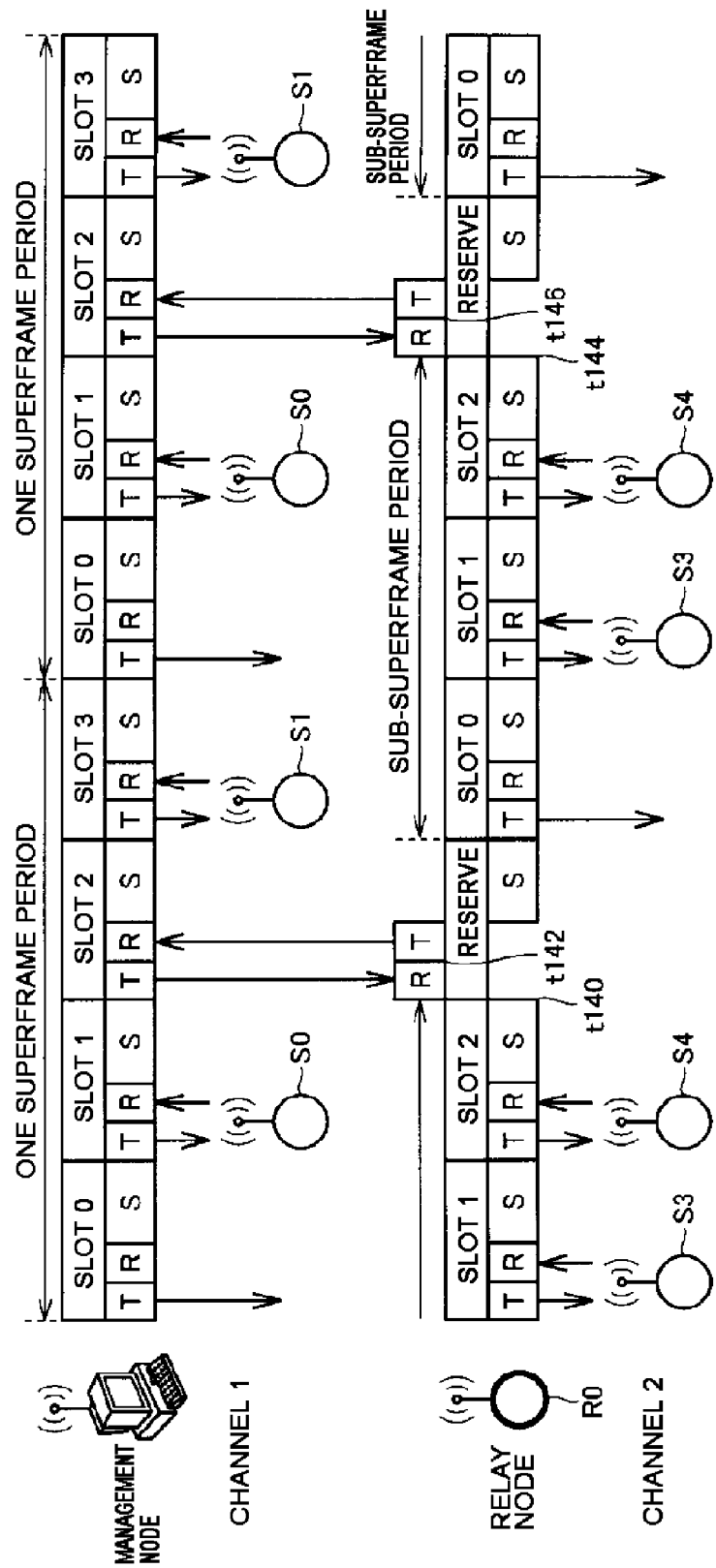
FIG. 25 is an explanatory diagram of data flow between the management node M and a child node using the relay node R0 according to the embodiment 2 of the present invention.

FIG. 25 is an explanatory diagram of data flow between the management node M and a child node using the relay node R0 according to the embodiment 2 of the present invention. The relay node R0 operates as the child node S in relation with the management node M. In addition, the relay node R0 operates as a management node for the child nodes (out-of-service nodes) S3 and S4.

Referring to FIG. 25, it is first assumed that the management node M sets slots 0 to 3 as one superframe period.

It is assumed that the slot 1 in one superframe period is assigned to the child node S0. In addition, it is assumed that the slot 2 is assigned to the relay node R0.

Additionally, it is assumed that slot 3 is assigned to the child node S1.

It is also assumed that the child nodes S0 and S1, and the relay node R0 perform data communication using the channel 1 which has established synchronization with the management node M using the slots respectively assigned thereto.

In addition, according to the above method, it is assumed that the relay node R0 sets slots 0 to 2 as one sub-superframe period.

It is assumed that the slot 1 in one sub-superframe period is assigned to the child node S3. In addition, it is assumed that the slot 2 is assigned to the child node S4.

It is also assumed that the child nodes S0 and S1, and the relay node R0 perform data communication using the channel 2 which has established synchronization with the management node M using the slots respectively assigned thereto. By providing different channels, interference is prevented and good data communication can be secured.

In addition, it is assumed that the child nodes S3 and S4 perform data communication which has established synchronization with the management nodes (the relay nodes R), respectively, using the slots assigned thereto.

In relation with the management node M, the relay node R0 receives a synchronous frame and transmits a response frame at times t142 and t146, with regard to the data communication started at times t140 and t144 using the slot 2 assigned to itself. The response frame includes therein data of its own relay node R0 and information of the child node using the relay node R0 as a management node.

In other words, the response frame of the relay node R0 is transmitted to the management node M as one response frame including data of the relay node R0 and data of the child nodes S3 and S4.

With the above method, the management node M can acquire data of the child nodes S3 and S4 via the relay node R0.

Figure 26:
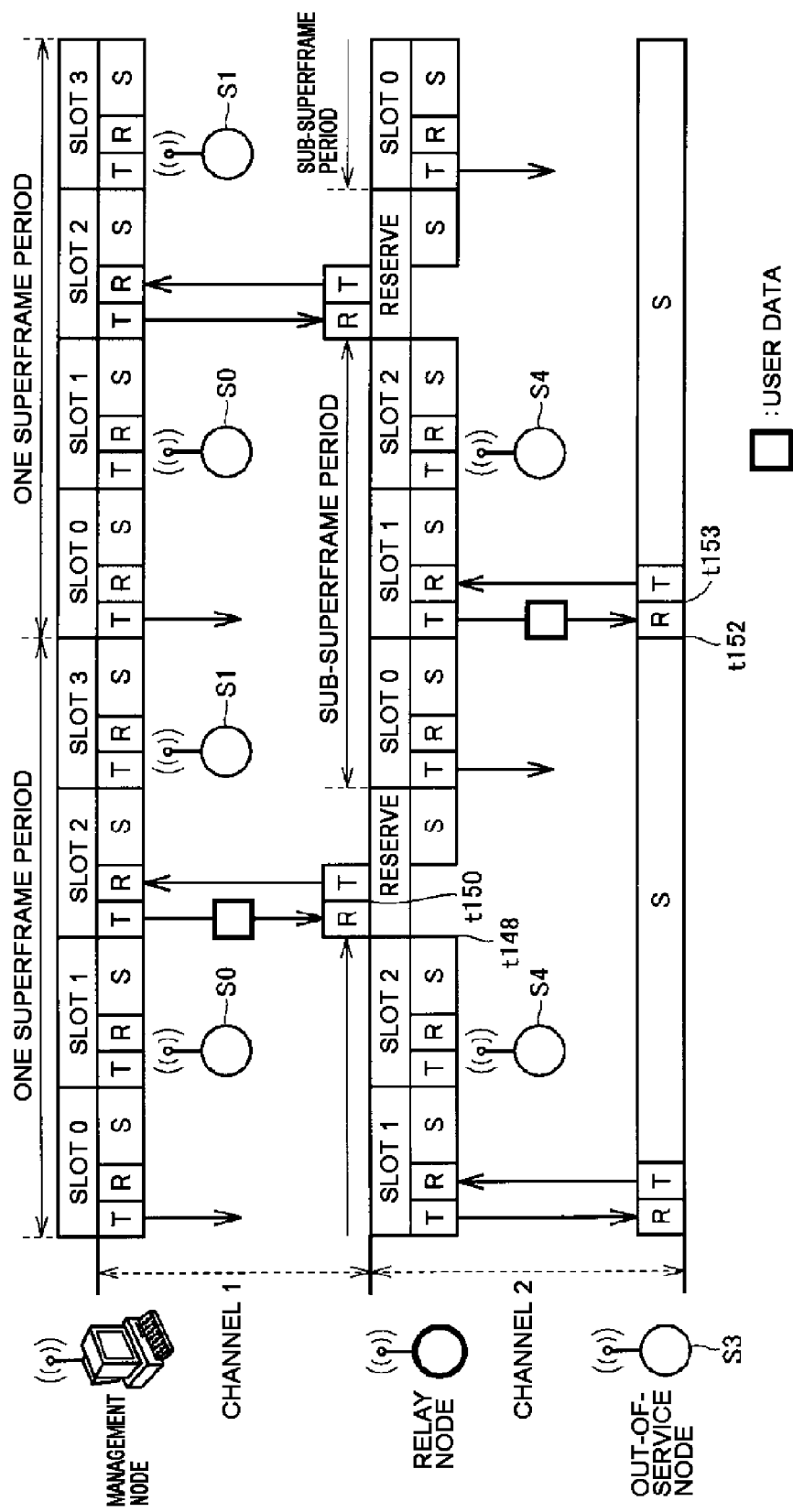
FIG. 26 is an explanatory diagram of another data flow between the management node M and a child node using the relay node R0 according to the embodiment 2 of the present invention.

FIG. 26 is an explanatory diagram of another data flow between the management node M and a child node using the relay node R0 according to the embodiment 2 of the present invention. The relay node R operates as the child node S in relation with the management node M. In addition, the relay node R0 operates as a management node for the child nodes (out-of-service nodes) S3 and S4.

Referring to FIG. 26, it is first assumed that the management node M sets slots 0 to 3 as one superframe period.

It is assumed that the slot 1 in one superframe period is assigned to the child node S0. In addition, it is assumed that the slot 2 is assigned to the relay node R0. Additionally, it is assumed that slot 3 is assigned to the child node S1.

It is also assumed that the child nodes S0 and S1, and the relay node R0 perform data communication which has established synchronization with the management node M using the slots respectively assigned thereto.

In addition, according to the above method, it is assumed that the relay node R0 sets slots 0 to 2 as one sub-superframe period.

It is assumed that the slot 1 in one sub-superframe period is assigned to the child node S3. In addition, it is assumed that the slot 2 is assigned to the child node S4.

It is also assumed that the child nodes S0 and S1, and the relay node R0 perform data communication which has established synchronization with the management node M using the slots respectively assigned thereto.

In addition, it is assumed that the child nodes S3 and S4 perform data communication which has established synchronization with the management node (the relay node R0) using the slots respectively assigned thereto.

In the above description, although only a response frame is transmitted to the synchronous frame to be transmitted from the management node M, the flow of the user data described in FIGS. 10 and 11, which is performed via the relay node R0 will be described below.

When requesting transmission of data acquired from the management node M by the out-of-service node S3, for example, the ID information (ID000) of the management node M is stored at time t148 as the source node ID included in the user data in the synchronous frame and the ID information (e.g., ID005) of the out-of-service node S3 is stored as the ID of the destination node, with regard to the data communication using slot 2 assigned for communication from the management node M to the relay node R0. A data transfer instruction command is transmitted as the data to be transmitted subsequent to the destination node ID. The relay node R0 receives such a synchronous frame and checks the ID of the destination node included in the user data to recognize whether or not the user data is addressed to itself.

The relay node R0 which is the management node, when recognizing that the ID specified as the destination node ID in the synchronous frame is not addressed to itself, next recognizes whether or not the ID is addressed to a child node that the node R0 manages as a management node. Then, the relay node R0, when recognizing that the ID is not addressed to the child node either that the node R0 manages as a management node, transmits the user data to the management node M using a response frame.

On the other hand, the relay node R0, when recognizing that the ID is addressed to a child node that the node R0 manages as a management node, receives a data transfer instruction command and transfers the user data included in the synchronous frame from the management node M at time t152 as the user data of asynchronous frame to the out-of-service node S3, using slot 1 of one sub-superframe period assigned for data communication with the out-of-service node S3.

The out-of-service node S3 receives a synchronous frame from the relay node R0 using slot 1 at time t152. It then recognizes whether or not the user data included in the synchronous frame is addressed to itself. If the out-of-service node S3 recognizes that the user data is addressed to itself, it transmits at time t153 the acquired data, using a response frame to the relay node R0 in response to the data transfer instruction command included in the synchronous frame. Specifically, the ID information (ID005) of the out-of-service node S3 as the source node ID and the ID information (ID000) of the management node M as the destination node ID are stored in the response frame from the out-of-service node S3 to the management node M, and the data acquired by the out-of-service node S3 is transmitted subsequent to the destination node ID.

In response to the fact that the transmission destination ID of the user data included in the response frame from the out-of-service node S3 is the ID information (ID000) of the management node M, the relay node R0 transmits a response frame in slot 2 assigned to the communication from the relay node R0 to the management node M. In other words, the relay node R0 transfers the user data included in the response frame from the out-of-service node S3 as the user data of the response frame to the management node M.

As another example, when transmitting data from the out-of-service node S3 to the out-of-service node S4, the ID information (ID006) of the out-of-service node S4 is stored in the user data region of the response frame transmitted by the out-of-service node S3 to the relay node R as the destination node ID, and the ID information (ID005) of the out-of-service node S3 is stored as the source node ID. The data to be transmitted is transmitted subsequent to the source node ID.

The relay node R which received the response frame from the out-of-service node S3 checks the destination node ID included in the user data and recognizes whether or not the ID is addressed to itself.

Then, the relay node R, when recognizing that the ID is not addressed to itself and if the ID information is included in a node within the network managed by itself, transfers the user data to the child node (out-of-service node) thereof. Specifically, information of the user data region of the response frame received from the out-of-service node S3 is stored in the user data region of a synchronous frame to be transmitted to the out-of-service node S4, and the synchronous frame is transmitted to the out-of-service node S4.

The out-of-service node S4 which received the synchronous frame checks the destination node ID included in the user data and recognizes whether or not the ID is addressed to itself. The out-of-service node S4 then checks whether or not the data is addressed to itself according to the destination node ID and further checks the transmission source of the data according to the source node ID, and whereby it becomes possible to determine whether or not the received data is appropriate. Therefore, it is also possible to transfer data from the out-of-service node S3 to the out-of-service node S4, for example.

In addition, when transferring user data from a plurality of child nodes managed by the relay node R0, data transfer with the response frame from each child node to the relay node R0 is performed in a slot assigned to each child node, whereas data transfer with the response frame from the relay node R0 to the management node M is performed using a slot of a superframe period which is different from the data transfer from each child node.

By sequentially transferring data in such a manner, it becomes possible to transfer user data even between different network hierarchies.

The method described above is merely an example, and for example, a special command may be transmitted to the relay node R0 from the management node M to perform a control based on the special command via the relay node R0.

Because the process flow of data communication in the management node M according to the embodiment 2 of the present invention is similar to the flow charts of FIGS. 12 and 13 described with embodiment 1, detailed description thereof will not be repeated.

Although the process flow of data communication between a child node and a relay node is also similar to the flow chart of FIG. 14, the process is different with regard to the relay node in the synchronous mode.

Figure 27:
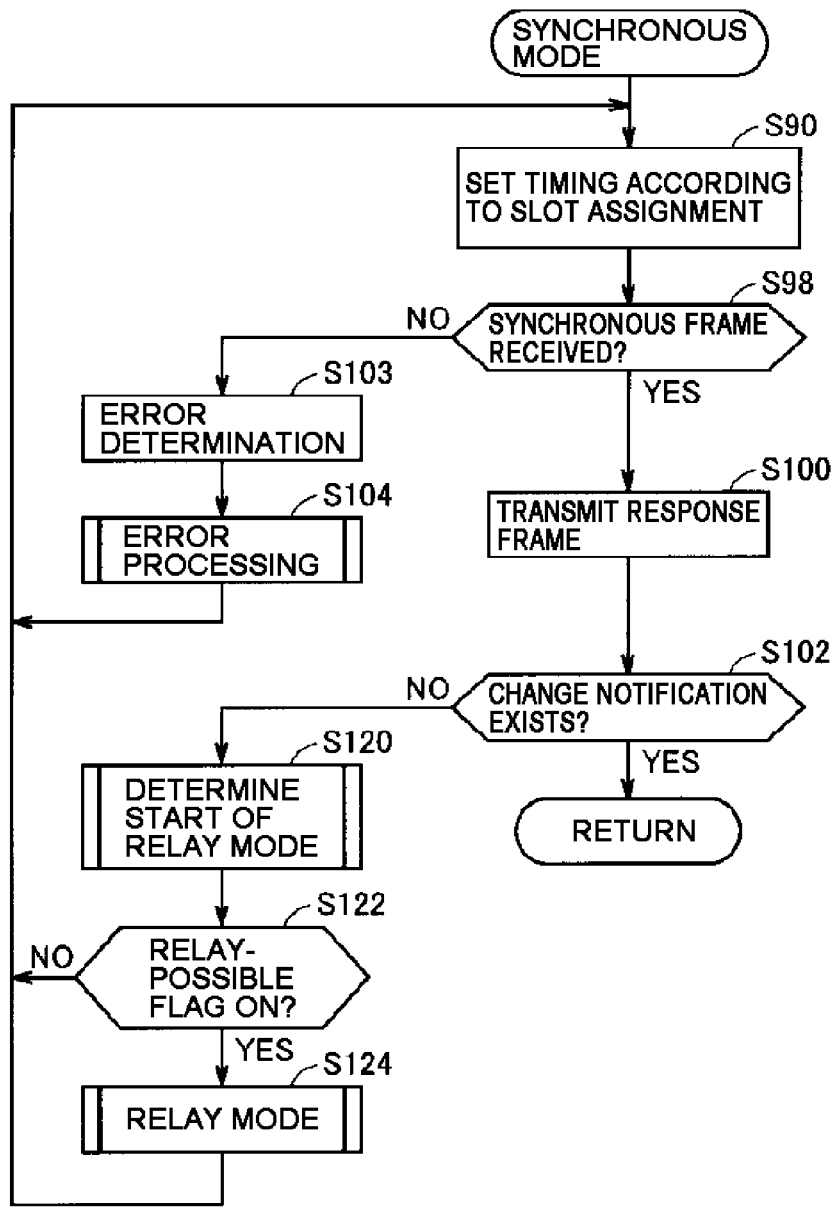
FIG. 27 is a flow chart illustrating a process of a synchronous mode in a relay node according to the embodiment 2 of the present invention.

FIG. 27 is a flow chart illustrating a process of a synchronous mode in a relay node according to the embodiment 2 of the present invention.

The CPU 11# performs the following process by reading a software program stored in the ROM 13.

Referring to FIG. 27, the CPU 11# sets the timing according to the assignment of the slot, based on the timing information, and the superframe structure information or the slot assignment information included in the broadcast information frame (step S90). Specifically, if the slot 2 is assigned in correspondence with its own ID, for example, the reception timing for receiving a synchronous frame corresponding to the slot assigned to itself (slot 2 in this case) is set, according to the number of slots of one superframe period included in the superframe structure information d1, the slot number assigned to itself included in the slot assignment information d5, or the length of a period of one slot, the length of the reception period, and the length of the wakeup period included in the timing information d2 of the received broadcast information frame. Specifically, the wakeup period start time for receiving a synchronous frame is calculated and the timer is set. It is similar when another slot is assigned.

For example, the wakeup period start time which is the timing for receiving a synchronous frame corresponding to the slot assigned to itself (slot 2 in this case) in the same superframe period which received the broadcast information frame is calculated as "number of slots (assigned slot number)*length of a period of one slot−wakeup time−length of the reception period".

In addition, the wakeup period start time which is the timing for receiving a synchronous frame corresponding to the slot assigned to itself in the next superframe period is calculated as "number of slots (number of slots in one superframe period)*length of the period of one slot−wakeup time−length of the reception period".

The CPU 11# then determines whether or not a synchronous frame is received according to the set reception timing (step S98).

At step S98, the CPU 11#, when receiving a synchronous frame according to the set reception timing (YES at step S98), transmits a response frame (step S100).

Next, the CPU 11# determines whether or not there exists a change notification in the synchronous frame (step S102). Specifically, it determines based on whether or not, as described above, the broadcast information frame update number of the superframe structure information has been updated. If it determines that the broadcast information frame update number has been updated, it determines that there exists a change notification. If, on the other hand, it determines that the broadcast information frame update number has not been updated, it determines that there exists no change notification.

If the CPU 11# determines at step S102 that there exists no change notification in the synchronous frame (NO at step S102), it next performs a process of determining the start of the relay mode (step S120).

The CPU 11# then determines whether or not a relay-possible flag has been turned on (step S122).

If the CPU 11# determines at step S122 that the relay-possible flag is not turned on (NO at step S122), the process flow returns to step S90 again without entering the relay mode. The CPU 11# then transmits a response frame in response to the reception of the synchronous frame, according to timing setting in accordance with the assignment of the slot.

Therefore, data communication is performed between the management node M and the relay node R using the assigned slot in the synchronous mode until there exists a change notification also when the relay mode is not entered.

On the other hand, the CPU 11#, if determines at step S122 that the relay-possible flag has been turned on (YES at step S122), transitions to the relay mode (step S124). After the relay mode is completed, the process flow returns to step S90 again where the CPU 111# transmits a response frame in response to the reception of the synchronous frame according to the timing setting in accordance with the assignment of the slot.

Therefore, data communication is also performed between the management node M and the relay node R using the assigned slot in the synchronous mode until there exists a change notification when the relay mode is entered after the relay mode is completed.

On the other hand, the CPU 11#, if determines at step S102 that there exists a change notification in the synchronous frame (YES at step S102), terminates the synchronous mode processing (return). In other words, the synchronous mode is terminated and the process flow returns to step S56 of FIG. 14 again. With regard to the following process, detailed description thereof will not be repeated because it is similar to that described in the embodiment 1. If a change notification is included in a synchronous frame from the management node M, it becomes impossible to perform data communication between the relay node R and an out-of-service node because one superframe period is changed. In other words, the out-of-service node is excluded from the network. However, the relay mode is started as the synchronous mode in the relay node is started again, and whereby data communication between the relay node R and the out-of-service node is performed to reestablish the network.

Figure 28:
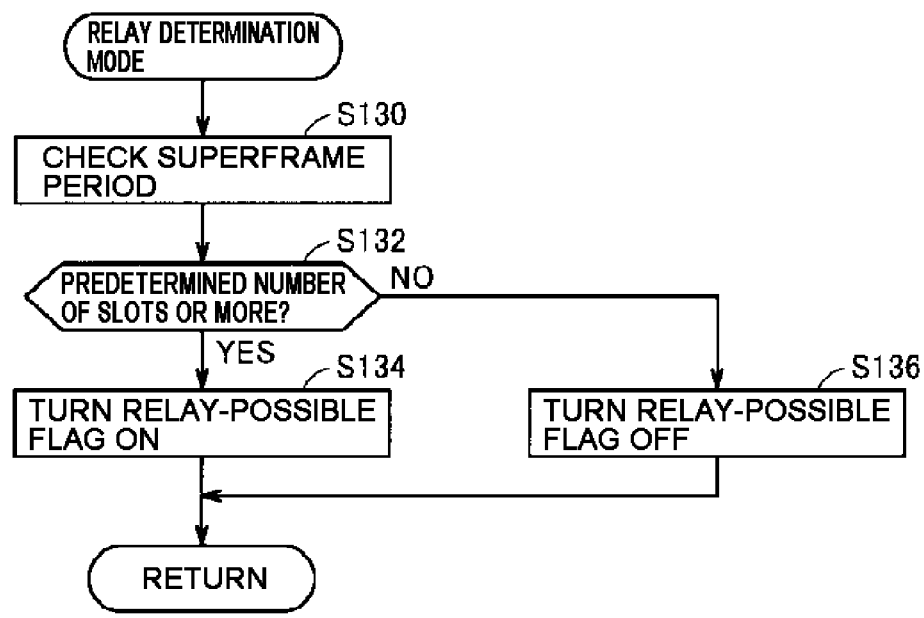
FIG. 28 is a flowchart illustrating a relay determination mode according to the embodiment 2 of the present invention.

The relay determination mode will be described next. FIG. 28 is a flow chart illustrating a relay determination mode according to the embodiment 2 of the present invention.

The CPU 11# performs the following process by reading a software program stored in the ROM 13.

Referring to FIG. 28, the CPU 11# checks the superframe period. The CPU 11# then determines whether or not there exist a predetermined number of slots or more in the superframe period (step S132). In this example, three is assumed to be the predetermined number of slots. This is because, if there are fewer than three, it is impossible to secure a slot in the sub-superframe period to perform data communication with out-of-service nodes.

If the CPU 11# determines at step S132 that there exist a predetermined number of slots or more in the superframe period (YES at step S132), the relay-possible flag indicating that a relay mode can be entered is turned on (step S134). The process is then terminated (return). If, on the other hand, the CPU 11# determines at step S132 that there are fewer than a predetermined number of slots in the superframe period (NO at step S132), the relay-possible flag indicating that a relay mode can be entered is turned off (step S134). The process is then terminated (return).

If the relay-possible flag is turned on, the relay mode is entered. In this example, a case is described where the relay mode is entered if the superframe period has a predetermined number of slots or more. On the other hand, because the relay mode is interrupted if there exists a change notification notifying a change in the network, it is desirable that the relay mode is started in a situation such that the superframe period is not changed. Therefore, it may be added as a condition for turning on the relay-possible flag that a predetermined period has elapsed so that the superframe period will not be changed.

Figure 29:
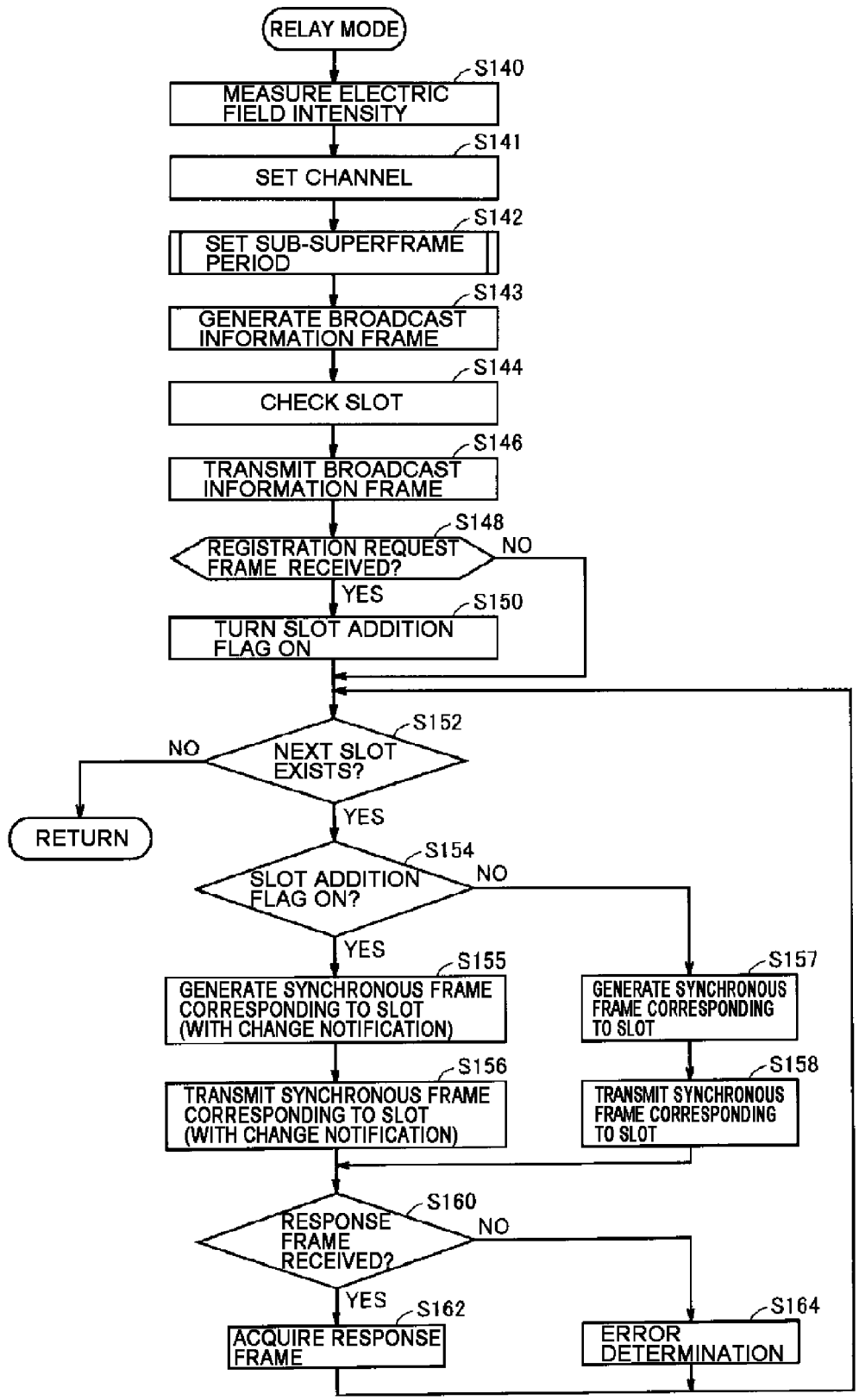
FIG. 29 is a flow chart illustrating a relay mode according to the embodiment 2 of the present invention.

FIG. 29 is a flow chart illustrating a relay mode according to the embodiment 2 of the present invention. The CPU 11# performs the following process by reading a software program stored in the ROM 13.

The relay node according to the embodiment 2 of the present invention operates as a management node in the relay mode. In other words, the channel setting unit 22 of the CPU 11# instructs the electric field intensity measurement unit 20 to measure the electric field intensity in the external environment (step S140).

The channel setting unit 22 then sets an appropriate channel in data transmission and reception for the communication unit 15 when performing data communication according to the measurement of electric field intensity by the electric field intensity measurement unit 20 (step S141). The channel setting unit 22 selects, among appropriate channels, a channel other than the channel used for data communication with the management node M. For example, it is assumed that the channel 2 is selected when the channel 1 is being used with the management node. By the above measures, it becomes possible to prevent interference and secure good data communication.

Next, the sub-superframe setting unit 24 performs a sub-superframe period setting process (step S142). Because the sub-superframe period setting process is similar to superframe period setting process described in FIG. 13, detailed description thereof will not be repeated.

In the initial setting, one sub-superframe period includes only the slot 0. Therefore, the process of step S142 can be skipped in the first one cycle.

Next, the data transmission/reception control unit 26 generates a broadcast information frame based on the sub-superframe period set by the sub-superframe setting unit (step S143). Specifically, the broadcast information frame described in FIG. 10A is generated. The parent node ID information d3 has the ID information of the relay node R stored therein, as described above. In addition, the number of slots in one sub-superframe period of the superframe structure information d1 is fixed as the same value as the number of slots in one superframe period.

Next, the data transmission/reception control unit 26 checks the slot in one sub-superframe period set by the sub-superframe setting unit 24 (step S144).

The data transmission/reception control unit 26 then transmits the broadcast information frame in the transmission period (T) of the slot 0 set in one sub-superframe period via the communication unit 15 (step S146).

Next, the data transmission/reception control unit 26 determines whether or not a registration request frame is received in the reception period (R) of the slot 0 set in one sub-superframe period via the communication unit 15 (step S148). Specifically, it is determined whether or not the registration request frame described in FIG. 11A is received.

If the data transmission/reception control unit 26 determines at step S148 that a registration request frame is received (YES at step S148), it turns on the slot addition flag (step S150). Because the number of child nodes which can be managed by the relay node is determined by the superframe period, it is assumed that the slot addition flag is not turned on when the number of slots in the sub-superframe period is already expanded to the maximum number, for example. For example, if the number of slots in a period of one superframe is four and two slots 1 and 2 are assigned to the slot assignment information other than the slot 0, it is assumed that the slot addition flag is not turned on because it is impossible to add a slot any more.

If, on the other hand, the data transmission/reception control unit 26 determines at step S148 that no registration request frame is received (NO at step S148), the process flow proceeds to the next step S152.

When the reception period (R) via the communication unit 15 is completed, the data transmission/reception control unit 26 instructs transition to the low power consumption state that instructs the power supply management unit 14 to terminate power supply to each unit. Accordingly, the relay node R transitions to the sleep period (S). Before entering the sleep period (S), the data transmission/reception control unit 26 calculates the wakeup period start time to start the next slot. Subsequently, the calculated time is set in the timer 17. The timer 17 then counts up until the calculated time is reached, and when the calculated time is reached, notifies the fact to the power supply management unit 14. Accordingly, the power supply management unit 14 resumes the normal power state from the low power consumption state according to the notification from the timer 17. After having returned from the low power consumption state to the normal power state, the data transmission/reception control unit 26 starts the next slot. The above process is repeatedly performed for each slot. This process enables the relay node R to transition to the low power consumption state in which power supply is stopped by operating it intermittently as the sleep period (S) except for the transmission period (T), the reception period (R), and the wakeup period (W), and thereby power consumption can be suppressed.

Next, at step S152, the data transmission/reception control unit 26 determines whether or not there exists a next slot in one sub-superframe period (step S152).

If the data transmission/reception control unit 26 determines at step S152 that there exists a next slot in one sub-superframe period (YES at step S152), the process flow proceeds to the next step S154.

If, on the other hand, the data transmission/reception control unit 26 determines at step S154 that there exists no next slot in one sub-superframe period (NO at step S152), the process is terminated (return). In other words, the relay mode is completed and data communication with the management node M is performed, as described above.

If the data transmission/reception control unit 26 determines that there exists a next slot in one sub-superframe period (YES at step S152), it next determines whether or not a slot addition flag is turned on (step S154).

The data transmission/reception control unit 26, if determines at step S154 that the slot addition flag is turned on (YES at step S154), generates a synchronous frame (with change notification) corresponding to the slot (step S155). Specifically, a broadcast information frame is generated with the broadcast information frame update number described in FIG. 10B having been updated.

Next, the data transmission/reception control unit 26 transmits, via the communication unit 15, a synchronous frame (with change notification) corresponding to the slot (step S156). By receiving the synchronous frame, a child node can determine that there exists a change in one sub-superframe period.

On the other hand, the data transmission/reception control unit 26, if determines at step S154 that the slot addition flag is not turned on (NO at step S154), generates a synchronous frame corresponding to the slot (step S157). Specifically, a broadcast information frame is generated with the broadcast information frame update number described in FIG. 10B not having been updated.

Next, the data transmission/reception control unit 26 transmits, via the communication unit 15, a synchronous frame corresponding to the slot (step S158).

Next, the data transmission/reception control unit 26 determines whether or not a response frame to the synchronous frame corresponding to the slot is received via the communication unit 15 (step S160). Specifically, it is determined whether or not a response frame described in FIG. 11B is received.

If the data transmission/reception control unit 26 determines at step S160 that a response frame is received (YES at step S160), it acquires the response frame (step S162). The acquired response frame is assumed to be stored in a memory area such as the RAM 12, for example, according to instruction of the data transmission/reception control unit 26.

If on the other hand, the data transmission/reception control unit 26 determines at step S160 that no response frame is received (NO at step S160), an error determination is performed (step S164). The result of error determination is assumed to be stored in a memory area such as the RAM 12, for example, according to the instruction of the data transmission/reception control unit 26. The result of error determination is used in the process of setting the sub-superframe period. In other words, a slot is deleted when the error determination has been made continuously for a predetermined number of times or more.

Then, the process flow returns to step S152 again. When the reception period R in each slot via the communication unit 15 is completed as described above, the data transmission/reception control unit 26 instructs transition to the low power consumption state that instructs the power supply management unit 14 to terminate power supply to each unit. Accordingly, the management node M transitions to the sleep period (S).

At step S152, the data transmission/reception control unit 26 determines whether or not there exists a next slot in one sub-superframe period (step S152), and repeats a process similar to that described above. In other words, if there exists a slot, a synchronous frame corresponding to the slot is transmitted via the communication unit 15.

After processing of all the slots has been completed, the processing in a relay mode is completed (return). The process flow returns to step S90 of FIG. 27 as described above, and performs data communication with the management node M. In this occasion, the content (data) of the data communication with the child node using the slot of one sub-superframe period is acquired from the RAM 12 or the like and transmitted to the management node M together with information of the relay node R as a response frame of the relay node R.

In the method according to the embodiment 2 of the present invention, after synchronization has been established between the relay node R and the management node M, it becomes possible to perform the relay process with the management node M by operating the relay node R as a management node. Therefore, the region in which the management node M can perform data communication can be expanded using the relay node R.

Therefore, it becomes possible for the management node M to manage the child node S by the entire network in a wide range by using the relay node R, even if the child node S is moving.

FIGS. 30A and 30B are explanatory diagrams of ID information of child nodes managed by the management node M and the relay node R.

Referring to FIG. 30A, a case is shown where the management node M has five slots in one superframe period. The ID information of the child nodes S is stored in association with the slots 1 to 4, respectively, excluding the slot 0.

Specifically, a case is shown where the slot 1 is assigned to the child node S (ID001), the slot 2 to the relay node R (ID002), the slot 3 to the child node S (ID003), and the slot 4 to the child node S (ID004).

In addition, the relay node R (ID002) further manages a plurality of child nodes S. Referring to FIG. 30B, a case is shown where the relay node R has four slots in one sub-superframe period. The ID information of the child nodes S is stored in association with the slots 1 to 3, respectively, excluding the slot 0.

Specifically, a case is shown where the slot 1 is assigned to the child node S (ID005), the slot 2 to the child node S (ID006), and the slot 3 to the child node S (ID007).

Therefore, because the data of the child nodes S managed by the relay node R is transmitted to the management node M, the slot 2 of the management node M has stored therein, together with the relay node R (ID002), information of the child node S (ID005), the child node S (ID006), and the child node S (ID007) managed by the relay node R, as shown in FIG. 30A.

In other words, data of the child node S (ID005), the child node S (ID006), and the child node S (ID007), together with the relay node R (ID002), are transmitted to the management node M using the slot 2.

On the contrary, when data is transmitted from the management node M to the child node (ID007), the data is transmitted to the child node (ID007) via the relay node R (ID002) using the slot 2.

Therefore, the management node M can collectively manage information of all nodes in the network. The management node M can manage the child node which directly performs data communication and, with regard to a relay node, also manage the child node performing data communication with the relay node according to the slot assignment information of the relay node.

For example, by attaching the child node S to a part on a production line or the like, the management node side can easily manage the position, state and the like of the part according to the response frame from the child node S.

In addition, when all child nodes S perform direct data communication with the management node M, the number of slots in one superframe period may increase and one cycle of data communication may be long. Therefore, in this example, the relay node is operated as a management node in a period other than the period of data communication between the management node M and the relay node R so that the relay node R performs data communication collectively with other child nodes instead of the management node M. Accordingly, it is not necessary to overly increase the number of slots in one superframe period, and whereby effective data communication can be performed in the entire network.

In addition, as the configuration of the network of the communication system according to the embodiments of the present invention, peer-to-peer type, star type, or tree type configuration can be supported.

It is also possible to provide a method or a program to realize the method which causes a computer to perform a control as described in the above flow. Such a program can also be recorded and provided as a program product on a non-temporary computer readable recording medium such as a flexible disk, a CD-ROM (Compact Disk-Read Only Memory), a ROM (Read Only Memory), a RAM (Random Access Memory), or a memory card associated with the computer. Alternatively, the program can be recorded and provided on a recording medium such as a hard disk built-in the computer. In addition, the program can be provided by downloading over the network.

The program may call a required one of the program modules provided as a part of the operation system (OS) of the computer in a predetermined arrangement at a predetermined timing to perform the processes. In such a case, the program itself does not include the above module and the processes are performed in conjunction with the OS. A program which does not include such a module can also be included in the program according to the present invention.

In addition, a program according to the present invention may be provided in a manner incorporated in a part of other programs. Also in that case, the program itself does not include the module included in the above-mentioned other programs and the processes are performed in conjunction with the other programs. Such a program which is incorporated in other programs can also be included in the program according to the present invention.

The provided program product is installed and executed in a program storage unit such as a hard disk. The program product includes the program itself and the recording medium having the program recorded thereon.

The disclosed embodiments are illustrative in all respects and should be considered that they are not limiting. The scope of the present invention is indicated by the appended claims, not by the above description, and it is intended that any modification is included within the scope of the appended claims or the equivalents thereof.

What is claimed is:

1. A communication system comprising a plurality of terminals and a management node which manages states of the terminals, wherein:
   the management node includes a communication unit which performs data transmission and reception with the terminals according to a structure of one superframe defining one cycle of data communication, and a control unit which controls the entire management node,
   the one superframe includes at least one broadcast period for broadcasting broadcast information indicating a structure of the one superframe,
   each of the terminals outputs a response signal to the broadcast information according to the content of the broadcast information,
   the control unit, upon receiving a response signal to the broadcast information transmitted via the communication unit, adds, to the structure of one superframe, a data communication period assigned for transmitting and receiving data to and from the terminal which received the response signal to the broadcast information, updates the broadcast information indicating the structure of one superframe, according to the addition of the data communication period,
   at least one of the terminals which received the updated broadcast information transmits and receives data to and from the management node in synchronization with the data communication period assigned for its own sake, according to the updated broadcast information,
   the communication unit transmits a data request signal requesting data to one of the assigned terminals in the data communication period,
   one of the assigned terminals which received the data request signal transmits a data response signal to the communication unit in response to the data request signal,
   when the broadcast information indicating the structure of one superframe is updated according to an instruction to add the data communication period, the communication unit transmits, together with the data request signal, a notification signal notifying that the structure of one superframe is changed in the data communication period, and
   one of the assigned terminals which received the notification signal together with the data request signal receives the updated broadcast information included in the subsequent one superframe.

2. The communication system according to claim 1, wherein
   when determining that there is no reception of the data response signal to the data request signal received from the corresponding terminal via the communication unit in the assigned data communication period included in the one superframe in a plurality of continuous cycles, the control unit erases, from the structure of one superframe, a data communication period in which there is no response to the data request signal.

3. The communication system according to claim 1, wherein
   each of the terminals is set to a sleep state for a period other than the data communication period assigned for its own sake.

4. The communication system according to claim 1, wherein
   the communication unit includes an electric field intensity measurement unit which measures electric field intensity when performing the data communication, and performs the data communication with the terminals using one of a plurality of communication channels, based on a measurement result of the electric field intensity measurement unit.

5. A communication system comprising a plurality of terminals and a management node which manages states of the terminals, wherein:
   the management node includes a communication unit which performs data transmission and reception with the terminals according to a structure of one superframe defining one cycle of data communication, and a control unit which controls the entire management node,
   the one superframe includes at least one broadcast period for broadcasting broadcast information indicating a structure of the one superframe,
   each of the terminals outputs a response signal to the broadcast information according to the content of the broadcast information,
   the control unit, upon receiving a response signal to the broadcast information transmitted via the communication unit adds to the structure of one superframe a data communication period assigned for transmitting and receiving data to and from the terminal which received the response signal to the broadcast information, updates the broadcast information indicating the structure of one superframe, according to the addition of the data communication period,
   at least one of the terminals which received the updated broadcast information transmits and receives data to and from the management node in synchronization with the data communication period assigned for its own sake, according to the updated broadcast information,
   at least one of the terminals is a relay terminal capable of relaying data for transmission and reception between at least another one of the terminals and the management node,
   the relay terminal transmits and receives data to and from the management node in synchronization with the data communication period assigned for its own sake according to the updated broadcast information,
   the relay terminal includes:
      a relay communication unit which transmits and receives data to and from the management node using the data communication period assigned for its own sake among periods constituting the one superframe and transmits and receives data to and from the another terminal according to a structure of one sub-superframe defining one relay cycle of data communication for relaying data using a period other than the data communication period, and a relay control unit which controls the entire relay terminal, the one sub-superframe includes at least one sub-broadcast period for broadcasting sub-broadcast information indicating the structure of the one sub-superframe, the another terminal outputs a response signal to the sub-broadcast information according to the content of the sub-broadcast information, the relay control unit, when having received a response signal to the sub-broadcast information transmitted via the relay communication unit, adds to the structure of the one sub-superframe, a data communication period assigned for transmitting and receiving data to and from a terminal which received a response signal to the broadcast information, and updates the sub-broadcast information indicating the structure of the one sub-superframe according to the addition of the data communication period, and the another terminal which received the updated sub-broadcast information transmits and receives data to and from the relay terminal in synchronization with the data communication period assigned for its own sake, according to the updated sub-broadcast information.

* * * * *